United States Patent
Nakagami

(10) Patent No.: US 12,413,772 B2
(45) Date of Patent: *Sep. 9, 2025

(54) IMAGE PROCESSING APPARATUS AND IMAGE PROCESSING METHOD

(71) Applicant: SONY CORPORATION, Tokyo (JP)

(72) Inventor: Ohji Nakagami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/738,814

(22) Filed: Jun. 10, 2024

(65) Prior Publication Data

US 2024/0333966 A1    Oct. 3, 2024

Related U.S. Application Data

(63) Continuation of application No. 17/217,513, filed on Mar. 30, 2021, now Pat. No. 12,047,597, which is a (Continued)

(30) Foreign Application Priority Data

Dec. 26, 2014 (JP) ................. 2014-265786

(51) Int. Cl.
*H04N 19/52* (2014.01)
*H04N 19/105* (2014.01)
(Continued)

(52) U.S. Cl.
CPC ........... *H04N 19/52* (2014.11); *H04N 19/105* (2014.11); *H04N 19/134* (2014.11);
(Continued)

(58) Field of Classification Search
CPC .... H04N 19/52; H04N 19/105; H04N 19/134; H04N 19/176; H04N 19/58; H04N 19/593; H04N 19/70
See application file for complete search history.

(56) References Cited

U.S. PATENT DOCUMENTS

| 9,374,598 | B2* | 6/2016 | Park ................. H04N 19/52 |
| 2009/0323801 | A1* | 12/2009 | Imajou .............. H04N 19/105 382/232 |

(Continued)

FOREIGN PATENT DOCUMENTS

| CN | 103004198 A | 3/2013 |
| CN | 103348679 A | 10/2013 |

(Continued)

OTHER PUBLICATIONS

Takahashi etal. "High-level Syntax: Motion vector prediction issue for Long-term reference picture" Joint Collaborative Team on Video Coding (JCT-VC) of ITU-T SG 16 WP3 and ISO/IEC JTC 1/SC 29/WG 11, tenth meeting: Stockholm, SE, Jul. 11-20, 2012 ( Year: 2012).*

(Continued)

*Primary Examiner* — Richard A Hansell, Jr.
(74) *Attorney, Agent, or Firm* — Paratus Law Group, PLLC

(57) ABSTRACT

The present disclosure relates to an image processing apparatus and an image processing method that are capable of improving coding efficiency at the time when a prediction using a correlation within a screen is performed. A predicted vector generation section sets, at a time of encoding of a current motion vector of a current block for a prediction using a correlation within a screen, a candidate block to not available and generates a predicted vector of the current motion vector by using a reference motion vector, the reference motion vector being referred to when the predicted vector of the current motion vector is generated. A difference vector generation section generates a difference vector between the current motion vector and the predicted vector generated by the predicted vector generation section. The (Continued)

| Reference picture of current block/ Reference picture of candidate block | STRP | LTRP | IntraBC |
|---|---|---|---|
| STRP | Available Scaling based on POC | Not available | Not available |
| LTRP | Not available | Available No scaling | Available No scaling |
| IntraBC | Not available | Available No scaling | Available No scaling | present disclosure can be applied to, for example, an encoding apparatus.

12 Claims, 39 Drawing Sheets

Related U.S. Application Data continuation of application No. 16/861,377, filed on Apr. 29, 2020, now abandoned, which is a continuation of application No. 15/516,992, filed as application No. PCT/JP2015/084763 on Dec. 11, 2015, now Pat. No. 10,735,762.

(51) Int. Cl.
  *H04N 19/134* (2014.01)
  *H04N 19/176* (2014.01)
  *H04N 19/58* (2014.01)
  *H04N 19/593* (2014.01)
  *H04N 19/70* (2014.01)

(52) U.S. Cl.
  CPC .......... *H04N 19/176* (2014.11); *H04N 19/58* (2014.11); *H04N 19/593* (2014.11); *H04N 19/70* (2014.11)

(56) References Cited

U.S. PATENT DOCUMENTS

| | | | |
|---|---|---|---|
| 2013/0107965 | A1 | 5/2013 | Wahadaniah et al. |
| 2014/0023144 | A1* | 1/2014 | Park ............... H04N 19/139 375/240.16 |
| 2014/0126642 | A1 | 5/2014 | Takahashi et al. |
| 2014/0211851 | A1* | 7/2014 | Miyoshi ............... H04N 19/91 375/240.15 |
| 2014/0307783 | A1* | 10/2014 | Kim ............... H04N 19/124 375/240.03 |
| 2015/0271515 | A1* | 9/2015 | Pang ............... H04N 19/70 375/240.16 |
| 2015/0350674 | A1* | 12/2015 | Laroche ............... H04N 19/52 375/240.16 |
| 2016/0100186 | A1* | 4/2016 | Gisquet ............... H04N 19/107 382/238 |
| 2017/0289566 | A1* | 10/2017 | He ............... H04N 19/147 |
| 2017/0302936 | A1* | 10/2017 | Li ............... H04N 19/14 |
| 2017/0302949 | A1* | 10/2017 | Malamal Vadakital ............... H04N 19/503 |

FOREIGN PATENT DOCUMENTS

| | | | | |
|---|---|---|---|---|
| CN | 103931192 | A | 7/2014 | |
| EP | 2717576 | A1 | 4/2014 | |
| JP | 2013059023 | A * | 3/2013 | ............ H04N 19/517 |
| WO | WO-2013024588 | A1 * | 2/2013 | ............ H04N 19/517 |
| WO | WO 2013/168407 | A1 | 11/2013 | |
| WO | WO 2014/007521 | A1 | 1/2014 | |
| WO | WO-2014065947 | A1 * | 5/2014 | ............ H04N 19/573 |
| WO | WO 2014/097912 | A1 | 6/2014 | |
| WO | WO-2016048834 | A1 * | 3/2016 | ............ H04N 19/105 |

OTHER PUBLICATIONS

Li B. "Non-SCCEI: Unification of Intra BC and inter modes" Joint Collaborative Team on Video Coding (JCT-VC) of ITU-T SG 16 WP 3 and ISO/IEC JTC 1/SC 29/WG 11 18th Meeting: Sappora, JP, Jun. 30-Jul. 9, 2014 (Year: 2014).*

Rajan Joshi, et al., High Efficiency Video Coding (HEVC) Screen Content Coding: Draft 1, Joint Collaborative Team on Video Coding (JTC-VC) of ITU-T SG 16 WP 3 and ISO/IEC JTC 1/SC 29/WG 11, Jun. 30-Jul. 9, 2014, pp. 1-344, 18$^{th}$ Meeting: Sapporo, JP.

Jill Boyce, et al., Draft high efficiency video coding (HEVC) version 2, combined format range extensions (RExt), scalability (SHVC), and multi-view (MV-HEVC) extensions, Joint Collaborative Team on Video Coding (JTC-VC) of ITU-T SG 16 WP 3 and ISO/IEC JTC 1/SC 29/WG 11, Jun. 30-Jul. 9, 2014, pp. 1-514, 18$^{th}$ Meeting: Sapporo, JP.

Yoshitomo Takahashi, et al., High-level Syntax: Motion vector prediction issue for long-term reference picture, Joint Collaborative Team on Video Coding (JTC-VC) of ITU-T SG 16 WP 3 and ISO/IEC JTC 1/SC 29/WG 11, Jul. 11-20, 2012, pp. 1-6, 10$^{th}$ Meeting: Stockholm, SE.

Chao Pang, et al., Non-CE2: Intra block copy with Inter signaling, Joint Collaborative Team on Video Coding (JTC-VC) of ITU-T SG 16 WP 3 and ISO/IEC JTC 1/SC 29/WG 11, Oct. 17-24, 2014, pp. 1-4, 19$^{th}$ Meeting: Strasbourg, FR.

Rajan Joshi, et al., Screen content coding test model 3 (SCM 3), Joint Collaborative Team on Video Coding (JTC-VC) of ITU-T SG 16 WP 3 and ISO/IEC JTC 1/SC 29/WG 11, Oct. 17-24, 2014, pp. 1-12, 19$^{th}$ Meeting: Strasbourg, FR.

May 25, 2018, European Search Report issued for related EP Application No. 15872748.7.

Li et al., Non-SCCE1: Unification of intra BC and inter modes, Joint Collaborative Team on Video Coding (JCT-VC) of ITU-T SG 16 WP 3 and ISO/IEC JTC 1/SC 29/WG 11, 18$^{th}$ Meeting, Jun. 30-Jul. 9, 2014, pp. 1-28, Sapporo, JP.

Flynn et al., High Efficiency Video Coding (HEVC) Range Extensions text specification: Draft 6, Joint Collaborative Team on Video Coding (JCT-VC) of ITU-T SG 16 WP 3 and ISO/IEC JTC 1/SC 29/WG 11, 16$^{th}$ Meeting, Jan. 9-17, 2014, pp. 1-341, San Jose, US.

He et al., Non-CE2: Unification of IntraBC mode with inter mode, Joint Collaborative Team on Video Coding (JCT-VC) of ITU-T SG 16 WP 3 and ISO/IEC JTC 1/SC 29/WG 11, 19$^{th}$ Meeting, Oct. 17-24, 2014, pp. 1-8, Strasbourg, FR.

Chen et al., AHG10: Motion related hooks for HEVC multiview/3DV extension based on long-term reference pictures, Joint Collaborative Team on Video Coding (JCT-VC) of ITU-T SG16 WP3 and ISO/IEC JTC1/SC29/WG11, 10$^{th}$ Meeting, Jul. 11-20, 2012, pp. 1-8, Stockholm, SE.

Pang et al., Block vector prediction method for Intra block copy, Joint Collaborative Team on Video Coding (JCT-VC) of ITU-T SG 16 WP 3 and ISO/IEC JTC 1/SC 29/WG 11, 17$^{th}$ Meeting, Mar. 27-Apr. 4, 2014, pp. 1-3, Valencia, ES.

Jun. 20, 2019, Chinese Office Action issued for related CN Application No. 201580069490.3.

Aug. 15, 2019, Japanese Office Action issued for related JP Application No. 2016-566104.

Dec. 10, 2019, Japanese Office Action issued for related JP Application No. 2016-566104.

Feb. 27, 2020, Japanese Office Action issued for related JP Application No. 2016-566104.

Feb. 27, 2020, Japanese Decision to Dismiss an Amendment issued for related JP Application No. 2016-566104.

Guionnet et al., CE5.h: Reducing the coding cost of merge index by dynamic merge index re-allocation, Joint Collaborative Team on 3D Video Coding Extension Development of ITU-T SG 16 WP 3 and ISO/IEC JTC 1/SC 29/WG 11, Oct. 13-19, 2012, pp. 1-5, 2nd Meeting: Shanghai, CN.

Davies, BBC's Response to the Call for Proposals on Video Compression Technology, Joint Collaborative Team on Video Coding (JCT-VC) of ITU-T SG16 WP3 and ISO/IEC JTC1/SC29/WG11, Apr. 15-23, 2010, pp. 1-31, 1st Meeting: Dresden, DE.

* cited by examiner

|  | Intra BC | Inter coding |
|---|---|---|
| Precision of motion vector | Integer pixel | 1/4 pixel |
| Length of motion vector | Longitudinal or lateral length is longer (because encoded block within same screen is set as reference block) | Depend on motion between screens |
| Reference picture | Before filter processing (cache is generally used) | After filter processing (DRAM is generally used) |

FIG.2

| Reference picture of current block | Reference picture of candidate block | Setting of candidate block |
|---|---|---|
| STRP | STRP | "available" |
| STRP | LTRP | "not available" |
| LTRP | STRP | "not available" |
| LTRP | LTRP | "available" but not scaled |

FIG.4

| Reference picture of current block/ Reference picture of candidate block | STRP | LTRP | IntraBC |
|---|---|---|---|
| STRP | Available Scaling based on POC | Not available | — |
| LTRP | Not available | Available No scaling | — |
| IntraBC | — | — | — |

FIG.5

| Reference picture of current block | Reference picture of candidate block | Setting of candidate block |
|---|---|---|
| STRP | STRP | "available" |
| STRP | IntraBC(LTRP) | "not available" |
| IntraBC(LTRP) | STRP | "not available" |
| IntraBC(LTRP) | IntraBC(LTRP) | "available" but not scaled |

FIG.7

| Reference picture of current block/ Reference picture of candidate block | STRP | LTRP | IntraBC |
|---|---|---|---|
| STRP | Available Scaling based on POC | Not available | Not available |
| LTRP | Not available | Available No scaling | Available No scaling |
| IntraBC | Not available | Available No scaling | Available No scaling |

FIG.8

7. When availableFlagLXA is equal to 0, the following applies for ( xNbA$_k$, yNbA$_k$ ) from ( xNbA$_0$, yNbA$_0$ ) to ( xNbA$_1$, yNbA$_1$ ) or until availableFlagLXA is equal to 1:
— When availableA$_k$ is equal to TRUE and availableFlagLXA is equal to 0, the following applies:
— If PredFlagLX[ xNbA$_k$ ][ yNbA$_k$ ] is equal to 1 and LongTermRefPic( currPic, currPb, RefIdxLX[ xNbA$_k$ ][ yNbA$_k$ ], RefPicListX ) is equal to LongTermRefPic( currPic, currPb, RefIdxLX[ xNbA$_k$ ][ yNbA$_k$ ], RefPicListX ) and ( DiffPicOrderCnt( RefPicListX[refIdxLX], CurrPic ) is equal to 0 && DiffPicOrderCnt( RefPicListX[RefIdxLX[ xNbA$_k$ ][ yNbA$_k$ ]], CurrPic ) is equal to DiffPicOrderCnt( RefPicListX[ RefIdxLX[ xNbA$_k$ ][ yNbA$_k$ ]], CurrPic ) ), availableFlagLXA is set equal to 1 and the following assignments are made:
  - mvLXA = MvLX[ xNbA$_k$ ][ yNbA$_k$ ]  (8-143)
  - refIdxA = RefIdxLX[ xNbA$_k$ ][ yNbA$_k$ ]  (8-144)
  - refPicListA = RefPicListX  (8-155)
— Otherwise, when PredFlagLY[ xNbA$_k$ ][ yNbA$_k$ ] (with Y = !X) is equal to 1 and LongTermRefPic( currPic, currPb, RefIdxLY[ xNbA$_k$ ][ yNbA$_k$ ], RefPicListY ) is equal to LongTermRefPic( currPic, currPb, RefIdxLX[ xNbA$_k$ ][ yNbA$_k$ ], RefPicListX ) and ( DiffPicOrderCnt( RefPicListX[refIdxLX], CurrPic ) and ( DiffPicOrderCnt( RefPicListX[refIdxLX], CurrPic ) is equal to 0 && DiffPicOrderCnt( RefPicListY[ RefIdxLY[ xNbA$_k$ ][ yNbA$_k$ ]], CurrPic ) is equal to DiffPicOrderCnt( RefPicListX[ RefIdxLX[ xNbA$_k$ ][ yNbA$_k$ ]], CurrPic ) ), availableFlagLXA is set equal to 1 and the following assignments are made:
  - mvLXA = MvLY[ xNbA$_k$ ][ yNbA$_k$ ]  (8-146)
  - refIdxA = RefIdxLY[ xNbA$_k$ ][ yNbA$_k$ ]  (8-147)
  - refPicListA = RefPicListY  (8-148)

FIG.24

5 When isScaledFlagLX is equal to 0, availableFlagLXB is set equal to 0 and the following applies for ( xNbB$_k$, yNbB$_k$ ) from ( xNbB$_0$, yNbB$_0$ ) to ( xNbB$_2$, yNbB$_2$ ) or until availableFlagLXB is equal to 1:

— The availability derivation process for a prediction block as specified in subclause is invoked with the luma location ( xCb, yCb ), the current luma coding block size nCbS, the luma location ( xPb, yPb ), the luma prediction block width nPbW, the luma prediction block height nPbH, the luma location ( xNbY, yNbY ) set equal to ( xNbB$_k$, yNbB$_k$ ), and the partition index partIdx as inputs, and the output is assigned to the prediction block availability flag availableB$_k$.

— When availableB$_k$ is equal to TRUE and availableFlagLXB is equal to 0, the following applies:

— If PredFlagLX[ xNbB$_k$ ][ yNbB$_k$ ] is equal to 1 and LongTermRefPic( currPic, currPb, RefIdxLX[ xNbB$_k$ ][ yNbB$_k$ ], RefPicListX ) is equal to LongTermRefPic( currPic, currPb, RefIdxLX[ xNbB$_k$ ][ yNbB$_k$ ], RefPicListX ) and ( DiffPicOrderCnt( RefPicListX[refIdxLX], CurrPic) is equal to 0 && DiffPicOrderCnt( RefPicListX [ RefIdxLX[ xNbB$_k$ ][ yNbB$_k$ ]], CurrPic ) ), availableFlagLXB is set equal to 1 and the following assignments are made:

- mvLXB = MvLX[ xNbB$_k$ ][ yNbB$_k$ ]    (8-159)
  - refIdxB = RefIdxLX[ xNbB$_k$ ][ yNbB$_k$ ]    (8-160)
  - refPicListB = RefPicListX    (8-161)

— Otherwise, when PredFlagLY[ xNbB$_k$ ][ yNbB$_k$ ] (with Y = !X ) is equal to 1 and LongTermRefPic( currPic, currPb, refIdxLX, RefPicListX ) is equal to LongTermRefPic( currPic, currPb, RefIdxLY [ xNbB$_k$ ][ yNbB$_k$ ], RefPicListY ) and ( DiffPicOrderCnt( RefPicListX[refIdxLX], CurrPic ) is equal to 0 && DiffPicOrderCnt( RefPicListY[ RefIdxLY[ xNbB$_k$ ][ yNbB$_k$ ]], CurrPic ) ), availableFlagLXB is set equal to 1 and the following assignments are made:

- mvLXB = MvLY[ xNbB$_k$ ][ yNbB$_k$ ]    (8-162)
  - refIdxB = RefIdxLY[ xNbB$_k$ ][ yNbB$_k$ ]    (8-163)
  - refPicListB = RefPicListY    (8-164)

FIG.25 and mvLXCol and availableFlagLXCol are derived as follows:
- If LongTermRefPic( currPic, currPb, refIdxLX, LX ) is not equal to LongTermRefPic( ColPic, colPb, refIdxCol, listCol ), both components of mvLXCol are set equal to 0 and availableFlagLXCol is set equal to 0.
- Else if ( DiffPicOrderCnt( LX[refIdxLX], CurrPic) is equal to 0 && ( DiffPicOrderCnt(LX[refIdxLX],CurrPic ) is equal to DiffPicOrderCnt( listCol [ refIdxCol ], ColPic) for colPb), both components of mvLXCol are set equal to 0 and availableFlagLXCol is set equal to 0.
- Otherwise, the variable availableFlagLXCol is set equal to 1, refPicListCol[ refIdxCol ] is set to be the picture with reference index refIdxCol in the reference picture list listCol of the slice containing prediction block currPb in the collocated picture specified by ColPic, and the following applies:
  - colPocDiff = DiffPicOrderCnt( ColPic, refPicListCol[ refIdxCol ] )          (8-174)
  - currPocDiff = DiffPicOrderCnt( currPic, RefPicListX[ refIdxLX ] )          (8-175)

FIG.26

| Reference picture of current block/ Reference picture of candidate block | STRP | LTRP | IntraBC |
|---|---|---|---|
| STRP | Available Scaling based on POC | Not available | Not available |
| LTRP | Not available | Available No scaling | Not available |
| IntraBC | Not available | Not available | Available No scaling |

FIG.27

IMAGE PROCESSING APPARATUS AND IMAGE PROCESSING METHOD

CROSS REFERENCE TO PRIOR APPLICATION

This application is a continuation of U.S. patent application Ser. No. 17/217,513 (filed on Mar. 30, 2021), which is a continuation of U.S. patent application Ser. No. 16/861,377 (filed on Apr. 29, 2020), which is a continuation of U.S. patent application Ser. No. 15/516,992 (filed on Apr. 5, 2017 and issued as U.S. Pat. No. 10,735,762 on Aug. 4, 2020), which is a National Stage Patent Application of PCT International Patent Application No. PCT/JP2015/084763 (filed on Dec. 11, 2015) under 35 U.S.C. § 371, which claims priority to Japanese Patent Application No. 2014-265786 (filed on Dec. 26, 2014), which are all hereby incorporated by reference in their entirety.

TECHNICAL FIELD

The present disclosure relates to an image processing apparatus and an image processing method, and more particularly to, an image processing apparatus and an image processing method that are capable of improving coding efficiency at the time when a prediction using a correlation within a screen is performed.

BACKGROUND ART

There have been recently diffused apparatuses that handle image information as digital and, at that time, for the purpose of highly-efficient information transmission and accumulation, employ a coding system for compression by orthogonal transformation and motion compensation such as discrete cosine transform with use of redundancy peculiar to the image information, to perform compression coding on images. Examples of this coding system include MPEG (Moving Picture Experts Group), H.264, and MPEG-4 Part 10 (Advanced Video Coding, hereinafter described as AVC).

Now, for the purpose of higher improvement in coding efficiency than H.264/AVC, standardization of a coding system called HEVC (High Efficiency Video Coding) is being advanced by JCTVC (Joint Collaboration Team-Video Coding), which is a joint standardization organization formed by ITU-T (International Telecommunication Union Telecommunication Standardization Sector) and ISO/IEC (International Organization for Standardization/International Electrotechnical Commission).

Further, in HEVC, range extension (HEVC Range Extension) has been studied so as to support high-end formats, such as images in color difference signal formats like 4:2:2 and 4:4:4, profiles for screen content (see, for example, Non-Patent Literature 1).

Incidentally, Intra Block Copy (Intra BC) is a coding tool of performing a prediction by using a correlation within a screen and performing motion compensation within the screen. Intra BC is known as a tool that contributes to improvement in coding efficiency for artificial images such as computer screens and CG images.

However, the technique of Intra BC is not employed in the above-mentioned HEVC Range Extension extension and is continued to be studied for standardization of Screen Content Coding (SCC) extension (see, for example, Non-Patent Literature 2).

As of December 2014, in the standardization of the HEVC SCC extension, commonalizing Intra BC and inter coding is in discussion. In the case where Intra BC and inter coding are commonalized, it is necessary to communalize selection of a predicted vector (MV Predictor), transmission of an index (RefIdx) of a reference picture, transmission of a difference vector (MVD) between a current motion vector and a predicted vector, and the like.

CITATION LIST

Non-Patent Literature

Non-Patent Literature 1: Jill Boyce, et al. "Draft high efficiency video coding (HEVC) version 2, combined format range extensions (RExt), scalability (SHVC), and multi-view (MV-HEVC) extensions", JCTVC-R1013_v6, 2014.10.1

Non-Patent Literature 2: Rajan Joshi, et al. "High Efficiency Video Coding (HEVC) Screen Content Coding: Draft 1", JCTVC-R1005-v3, 2014.9.27

DISCLOSURE OF INVENTION

Technical Problem

However, in the case where a predicted vector generated with reference to a motion vector used in inter coding is used at the time of encoding of a motion vector used in Intra BC, a difference vector becomes large, and coding efficiency is reduced.

The present disclosure has been made in view of the circumstances as described above and is capable of improving coding efficiency at the time when a prediction using a correlation within a screen is performed.

Solution to Problem

An image processing apparatus according to a first aspect of the present disclosure is an image processing apparatus including: a predicted vector generation section that sets, at a time of encoding of a current motion vector of a current block for a prediction using a correlation within a screen, in a case where a type of a reference picture of the current block and a type of a reference picture of a candidate block corresponding to a candidate of a reference motion vector are different from each other, the candidate block to not available and generates a predicted vector of the current motion vector by using the reference motion vector, the reference motion vector being referred to when the predicted vector of the current motion vector is generated; and a difference vector generation section that generates a difference vector between the current motion vector and the predicted vector generated by the predicted vector generation section.

An image processing method according to the first aspect of the present disclosure corresponds to the image processing apparatus according to the first aspect of the present disclosure.

In the first aspect of the present disclosure, at the time of encoding of a current motion vector of a current block for a prediction using a correlation within a screen, in a case where a type of a reference picture of the current block and a type of a reference picture of a candidate block corresponding to a candidate of a reference motion vector are different from each other, the reference motion vector being referred to when a predicted vector of the current motion vector is generated, the candidate block is set to not available, the predicted vector of the current motion vector is generated by using the reference motion vector, and a difference vector between the current motion vector and the predicted vector is generated.

An image processing apparatus according to a second aspect of the present disclosure is an image processing apparatus including: a predicted vector generation section that sets, at a time of decoding of a current motion vector of a current block for a prediction using a correlation within a screen, in a case where a type of a reference picture of the current block and a type of a reference picture of a candidate block corresponding to a candidate of a reference motion vector are different from each other, the candidate block to not available and generates a predicted vector of the current motion vector by using the reference motion vector, the reference motion vector being referred to when the predicted vector of the current motion vector is generated; and a motion vector generation section that adds a difference vector between the current motion vector and the predicted vector to the predicted vector generated by the predicted vector generation section and generates the current motion vector.

An image processing method according to the second aspect of the present disclosure corresponds to the image processing apparatus according to the second aspect of the present disclosure.

In the second aspect of the present disclosure, at the time of decoding of a current motion vector of a current block for a prediction using a correlation within a screen, in a case where a type of a reference picture of the current block and a type of a reference picture of a candidate block corresponding to a candidate of a reference motion vector are different from each other, the reference motion vector being referred to when a predicted vector of the current motion vector is generated, the candidate block is set to not available, the predicted vector of the current motion vector is generated by using the reference motion vector, a difference vector between the current motion vector and the predicted vector is added to the predicted vector, and the current motion vector is generated.

It should be noted that the image processing apparatuses according to the first and second aspects can be achieved by causing a computer to execute a program.

Further, the program executed by the computer in order to achieve the image processing apparatuses according to the first and second aspects can be provided by transmission via a transmission medium or recording on a recording medium.

The image processing apparatuses according to the first and second aspects may be independent apparatuses or may be internal blocks that configure one apparatus.

Advantageous Effects of Invention

According to the first aspect of the present disclosure, an image can be encoded. Further, according to the first aspect of the present disclosure, it is possible to improve coding efficiency at the time when a prediction using a correlation within a screen is performed.

According to the second aspect of the present disclosure, an encoded stream can be decoded. Further, according to the second aspect of the present disclosure, it is possible to decode an encoded stream having improved coding efficiency at the time when a prediction using a correlation within a screen is performed.

It should be noted that the effects described herein are not necessarily limited and any one of the effects described herein may be produced.

BRIEF DESCRIPTION OF DRAWINGS

FIG. 2 is a diagram for describing a difference between Intra BC and inter coding.

FIG. 4 is a diagram showing an example of setting of a candidate block in HEVC.

FIG. 5 is a diagram showing an example of setting of a candidate block in HEVC.

FIG. 7 is a diagram showing an example of setting of a candidate block in a first embodiment.

FIG. 8 is a diagram showing an example of setting of a candidate block in the first embodiment.

FIG. 24 is a diagram for describing a predicted vector list generation method in a second embodiment.

FIG. 25 is a diagram for describing the predicted vector list generation method in the second embodiment.

FIG. 26 is a diagram for describing the predicted vector list generation method in the second embodiment.

FIG. 27 is a diagram showing an example of setting of a candidate block in the second embodiment.

MODE(S) FOR CARRYING OUT THE INVENTION

Figure 37:
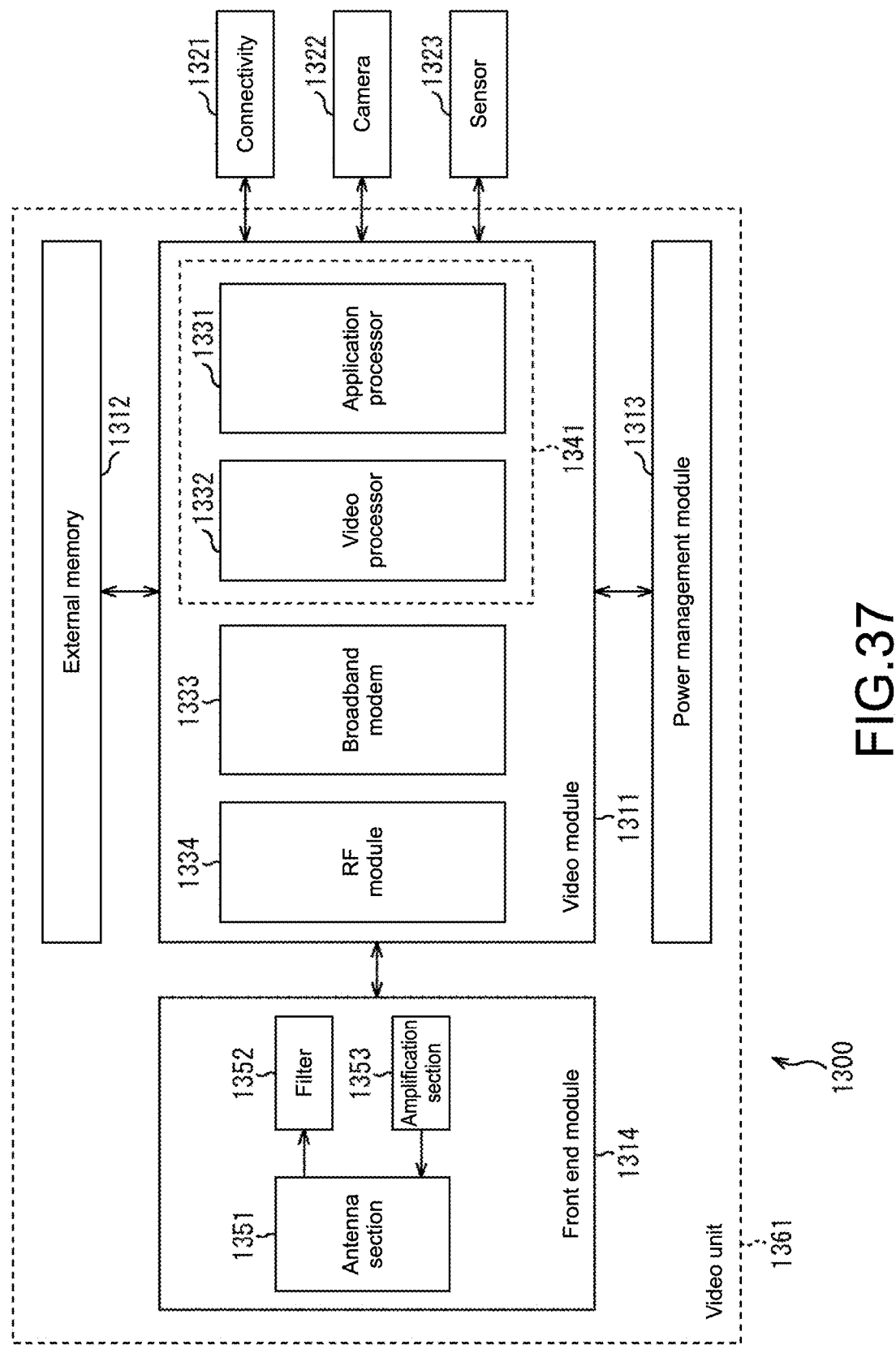
FIG. 37 shows a schematic configuration example of a video set to which the present disclosure is applied.
Figure 38:
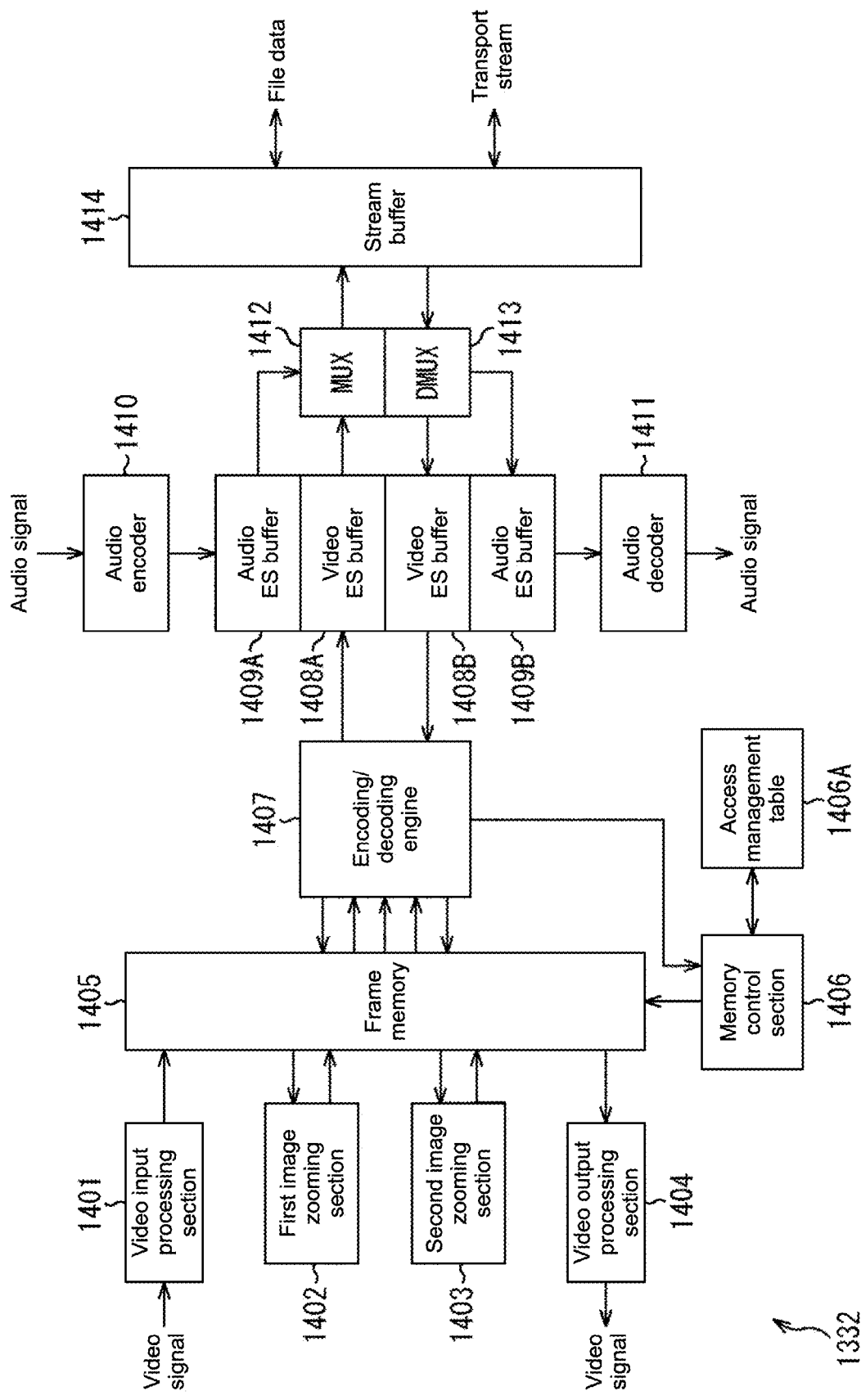
FIG. 38 shows a schematic configuration example of a video processor to which the present disclosure is applied.
Figure 39:
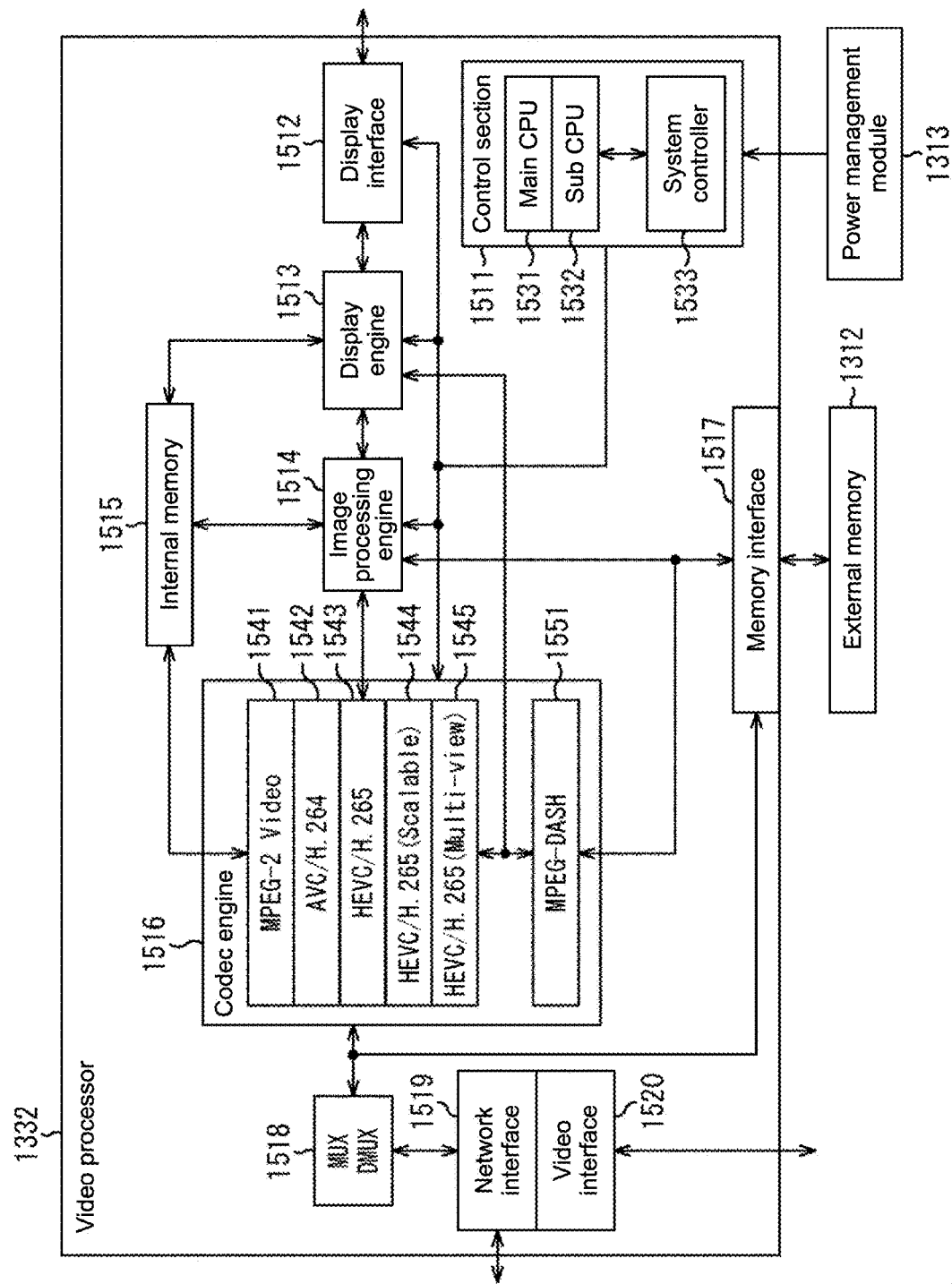
FIG. 39 shows another schematic configuration example of the video processor to which the present disclosure is applied.

Hereinafter, the premise of the present disclosure and modes for carrying out the present disclosure (hereinafter, called embodiments) will be described. It should be noted that description will be given in the following order.
0. Premise of the Present Disclosure (FIGS. 1 and 2)
1. First Embodiment: Encoding Apparatus and Decoding Apparatus (FIGS. 3 to 23)
2. Second Embodiment: Encoding Apparatus and Decoding Apparatus (FIGS. 24 to 29)
3. Third Embodiment: Encoding Apparatus and Decoding Apparatus (FIGS. 30 and 31)
4. Fourth Embodiment: Computer (FIG. 32)
5. Fifth Embodiment: Television Apparatus (FIG. 33)
6. Sixth Embodiment: Mobile Phone (FIG. 34)
7. Seventh Embodiment: Recording/reproduction apparatus (FIG. 35)
8. Eighth Embodiment: Imaging Apparatus (FIG. 36)
9. Ninth Embodiment: Video Set (FIGS. 37 to 39)

Premise of the Present Disclosure (Description on Intra BC)

Figure 1:
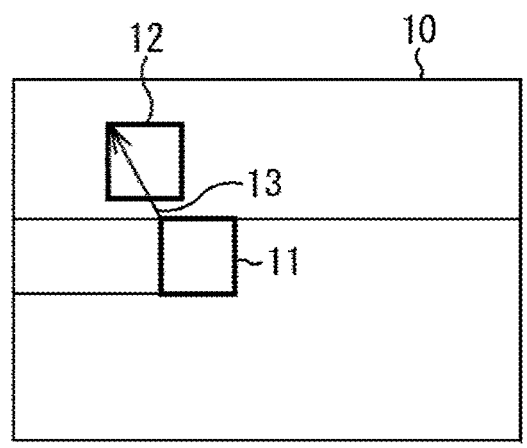
FIG. 1 is a diagram for describing Intra BC.

FIG. 1 is a diagram for describing Intra Block Copy (Intra BC).

As shown in FIG. 1, in Intra BC, a reference picture used for predicting a PU (Prediction Unit) 11 within a picture 10 is the picture 10. Therefore, a block 12, which is included within the same picture 10 as the PU 11 and has a high correlation with the PU 11, is set as a reference block of the PU 11, and a vector 13 between the PU 11 and the PU 12 is detected as a motion vector.

(Description on Difference Between Intra BC and Inter Coding)

FIG. 2 is a diagram for describing a difference between Intra BC and inter coding.

As shown in FIG. 2, the precision of a motion vector in Intra BC is integer-pixel precision, and the precision of a motion vector in inter coding is ¼ pixel precision. Further, in Intra BC, since an encoded block within the same screen is set as a reference block, at least one of a length in a longitudinal direction and a length in a lateral direction of the motion vector is longer. In inter coding, however, since an encoded block within a different screen is set as a reference block, the length of the motion vector depends on a motion between the screens.

Further, in Intra BC, a picture before subjected to filter processing is used as a reference picture, but in inter coding, a picture after subjected to filter processing is used as a reference picture. In general, the picture before subjected to filter processing is stored in a cache, and the picture after subjected to filter processing is stored in a DRAM (Dynamic Random Access Memory).

As described above, the precision and the length of the motion vector are different between Intra BC and inter coding. Therefore, if Intra BC and inter coding are communalized and a predicted vector generated with reference to the motion vector of inter coding is used at the time of encoding of the motion vector of Intra BC, a difference vector becomes large and coding efficiency is reduced. It should be noted that the motion vector referred to when the predicted vector is generated is hereinafter called a reference motion vector.

Further, a destination to save the reference picture is different between Intra BC and inter coding. Therefore, in the case where Intra BC and inter coding are commonalized, the cache and the DRAM are mixed as the destinations to save the reference picture. However, since a decoding apparatus does not recognize its destination to save the reference picture, the decoding apparatus uselessly accesses the DRAM. As a result, the access bandwidth of the DRAM is increased.

First Embodiment

General Outline of First Embodiment

First, the general outline of a first embodiment will be described with reference to FIGS. 3 to 12.

Figure 3:
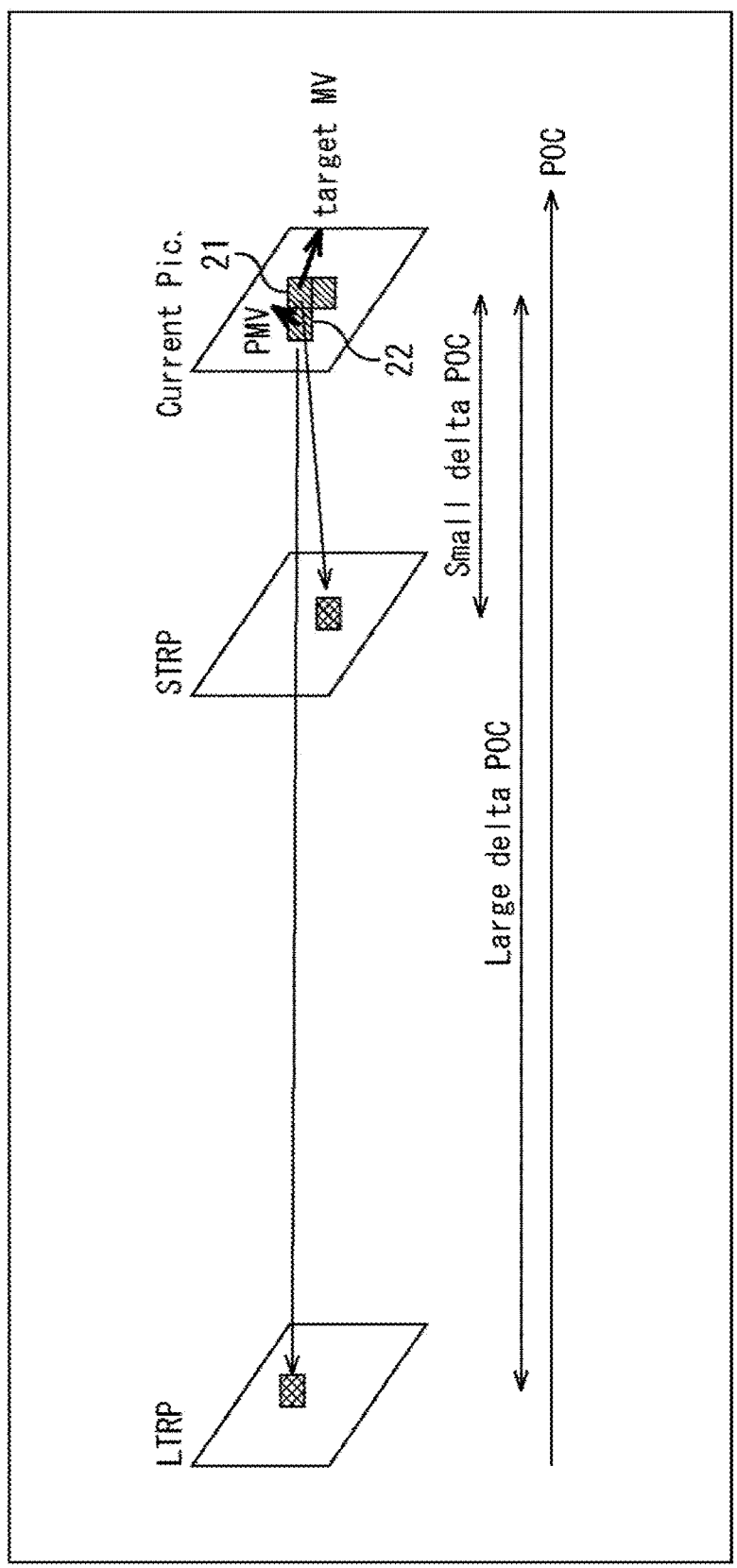
FIG. 3 is a diagram for describing a type of a reference picture in HEVC.

FIG. 3 is a diagram for describing a type of a reference picture in HEVC (High Efficiency Video Coding).

As shown in FIG. 3, in HEVC, a type of a reference picture that has a small difference in POC (Picture Order Count) from a picture to be currently processed (hereinafter, called current picture) is set as STRP (Short-Term Reference Picture). Further, a type of a reference picture that has a large difference in POC from the current picture (Current Pic) is set as LTRP (Long-Term Reference Picture).

As shown in FIGS. 4 and 5, in the case where a reference picture of a PU to be currently processed (hereinafter, called current block) within the current picture and a reference picture of a PU (hereinafter, candidate block) corresponding to a candidate of a reference motion vector are different in type from each other, the candidate block is set to not available.

For example, as shown in FIG. 3, in the case where the type of a reference picture of a current block 21 is STRP, and the type of a reference picture of a candidate block 22 corresponding to a candidate (PMV) of a reference motion vector of a current motion vector (target MV) is LTRP, the candidate block 22 is set to not available. Thus, the motion vector of the candidate block 22 is excluded from the candidates of the reference motion vector and is not used for generation of the predicted vector.

It should be noted that candidate blocks are PUs that are adjacent to the current block on the left, the upper left, the lower left, the top, and the upper right at the same time of day, and are PUs that are located at the same position as the current block and adjacent thereto on the lower right at a different time of day. Hereinafter, in the case where a candidate block at the same time of day as the current block is especially distinguished from the other candidate blocks, the candidate block is called a spatial-direction candidate block, and in the case where a candidate block at a time of day different from that of the current block is especially distinguished from the other candidate blocks, the candidate block is called a temporal-direction candidate block.

Further, as shown in FIGS. 4 and 5, in the case where the type of the reference picture of the current block and the type of the reference picture of the candidate block are identical to each other, the candidate block is set to available. Thus, the motion vector of the candidate block is set to a candidate of the reference motion vector. In the case where the motion vector of the candidate block when both the type of the reference picture of the current block and the type of the reference picture of the candidate block are STRP is selected as a reference motion vector, the predicted vector is generated by scaling of the reference motion vector on the basis of a difference in POC between the reference picture of the current block and the reference picture of the candidate block.

Meanwhile, in the case where the motion vector of the candidate block when both the type of the reference picture of the current block and the type of the reference picture of the candidate block are LTRP is selected as a reference motion vector, the reference motion vector is set to a predicted vector without change (not scaled).

It should be noted that Intra BC and inter coding are not commonalized in the present HEVC, and thus the type of a reference picture other than LTRP and STRP is not assumed as shown in FIG. 5. Therefore, in the case where the type of a reference picture is "Intra BC", which is the type of a reference picture used in Intra BC, setting of a candidate block is undetermined.

Figure 6:
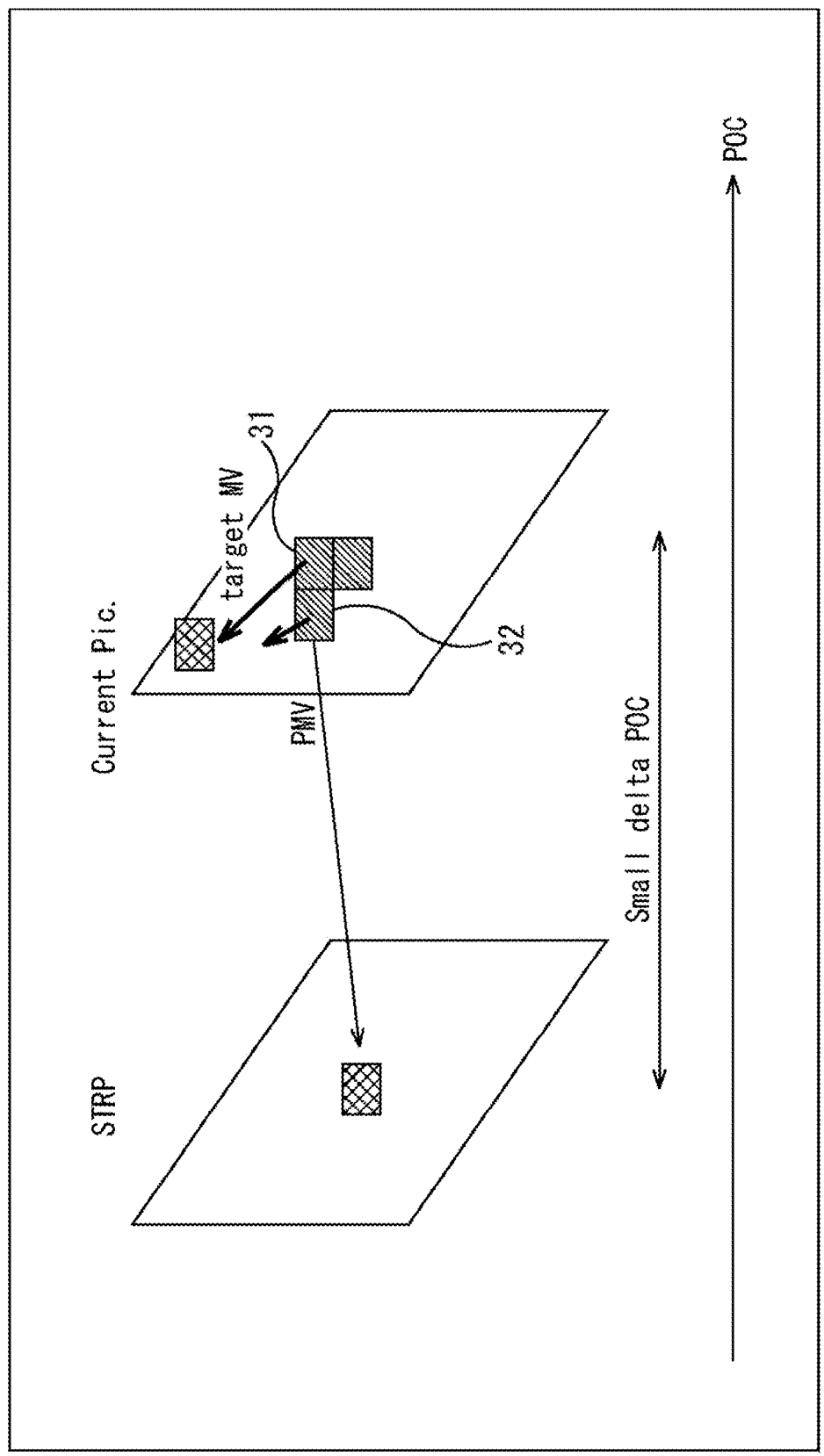
FIG. 6 is a diagram for describing a candidate of a reference motion vector.

In the case where Intra BC and inter coding are simply communalized, the type of a reference picture used in Intra BC is different from an actual one and is set to STRP. Therefore, as shown in FIG. 6, a motion vector (PMV) of a candidate block 32, the actual type of a reference picture of which is STRP, is included in candidates of a reference motion vector of a current motion vector (target MV) used in Intra BC for a current block 31.

As shown in FIG. 2, however, the precision and the length of the motion vector are different between Intra BC and inter coding. Therefore, if the motion vector of the candidate block 32 is selected as the reference motion vector of the current motion vector of the current block 31, a difference vector between the current motion vector and a predicted vector becomes large. As a result, coding efficiency is reduced.

In this regard, in the first embodiment, the type of the reference picture used in Intra BC, i.e., the type of the reference picture the actual type of which is "Intra BC", is set to LTRP. Specifically, a current picture is newly defined as a candidate of the reference picture, (If intra_block_copy_enabled_flag is equal to 1, the following applies. RefPicCurr=CurrPic). The current picture newly defined is then added as a candidate of the reference picture, the type of which is set to LTRP (All reference pictures that are included in RefPicCurr, RefPicSetLtCurr and RefPicSetLtFoll are marked as "used for long-term reference".).

Thus, the current picture is added to a reference picture list, which is a list of candidates of the reference picture, and is marked as "used for long-term reference". As a result, setting of a candidate block with respect to the current block the actual type of the reference picture of which is "Intra BC" is performed similarly to setting of a candidate block with respect to the current block the actual type of the reference picture of which is LTRP.

Specifically, as shown in FIGS. 7 and 8, in the case where any one of the actual type of the reference picture of the current block and the actual type of the reference picture of the candidate block is "Intra BC" and the other one is STRP, the candidate block is set to not available. Thus, the motion vector of the candidate block is excluded from the candidates of the reference motion vector and is not used for generation of the predicted vector.

Further, as shown in FIGS. 7 and 8, in the case where both the actual type of the reference picture of the current block and the actual type of the reference picture of the candidate block are "Intra BC" or LTRP, the candidate block is set to available. Thus, the motion vector of the candidate block is set to a candidate of the reference motion vector.

As described above, in the case where any one of the actual type of the reference picture of the current block and the actual type of the reference picture of the candidate block is "Intra BC" and the other one is STRP, the motion vector of the candidate block is not used for generation of the predicted vector and coding efficiency is improved.

Figure 9:
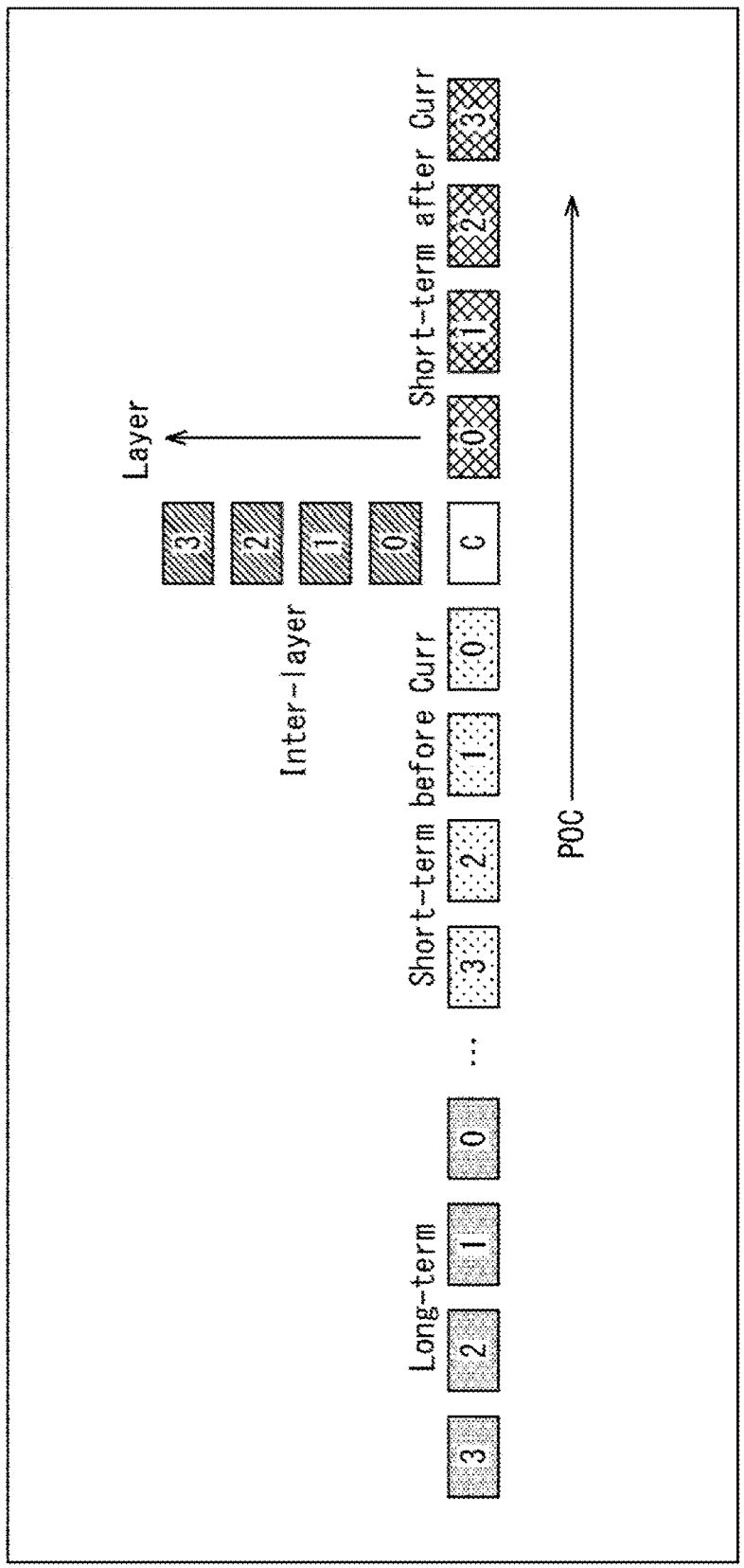
FIG. 9 is a diagram showing an example of a candidate of a reference picture in HEVC.

FIG. 9 is a diagram showing an example of a candidate of the reference picture in HEVC.

As shown in FIG. 9, in HEVC, pictures (Short-term before Curr) that are previous to a current picture (C) in display order and have a small difference in POC from the current picture are candidates of the reference picture. Further, pictures (Short-term after Curr) that are subsequent to the current picture (C) in display order and have a small difference in POC from the current picture are candidates of the reference picture.

Moreover, pictures (Long-term) that are previous to the current picture (C) in display order and have a large difference in POC from the current picture are candidates of the reference picture. Further, pictures (Inter-layer) that are the same as the current picture (C) in display order but different in perspective, bit count, spatial resolution, S/N, frame rate, color difference signal format, and the like are candidates of the reference picture.

Figure 10:
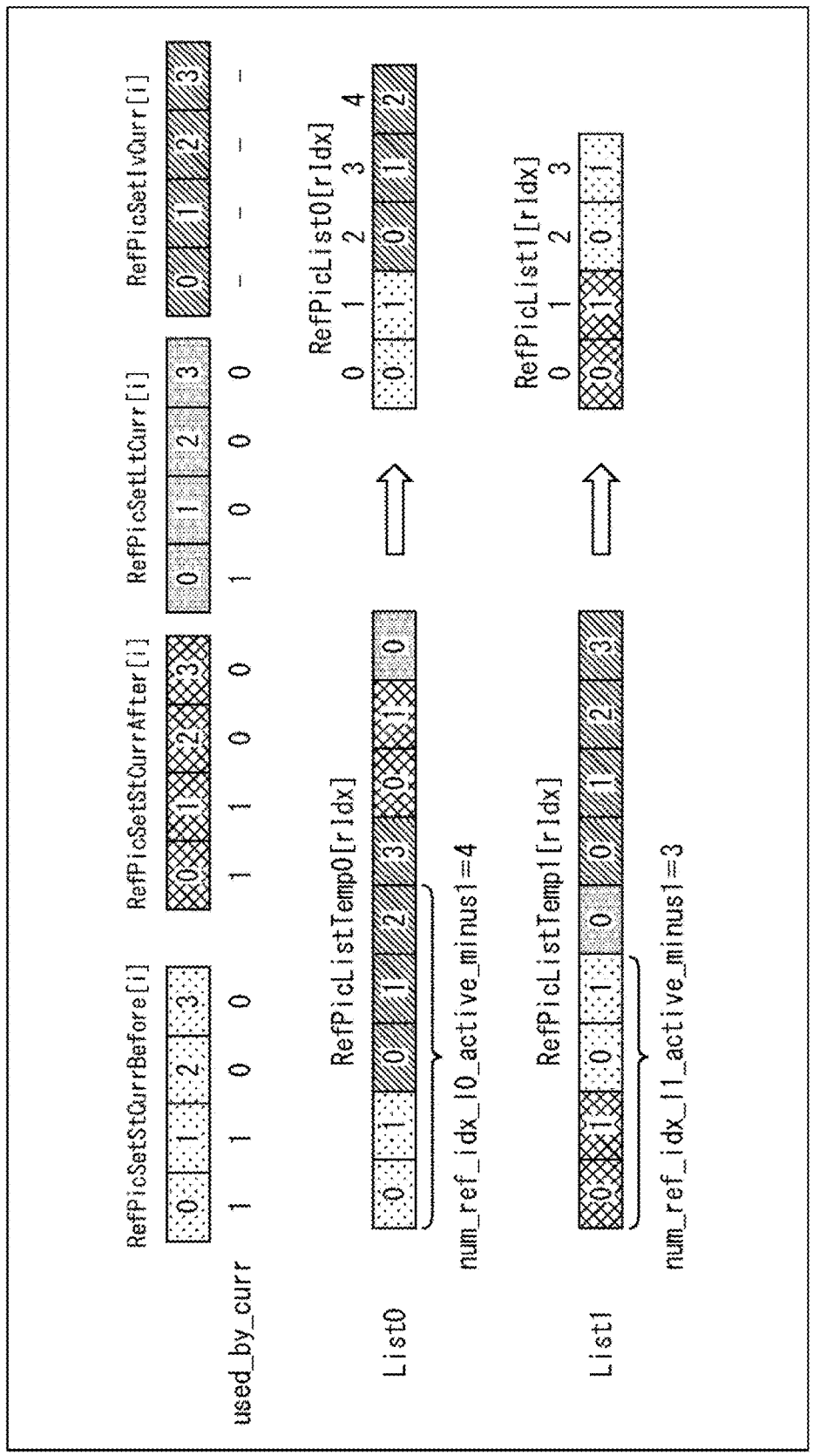
FIG. 10 is a diagram for describing reference picture list creation processing in HEVC.

FIG. 10 is a diagram for describing reference picture list creation processing for registering the candidates of the reference picture of FIG. 9.

As shown in FIG. 10, in the reference picture list creation processing, first, an individual list in which information for identifying a candidate picture of the reference picture (hereinafter, called picture identifying information) is registered is created for each kind of candidates of the reference picture. In other words, a RefPicSetStCurrBefore list is created, in which the picture identifying information of each of the pictures (Short-term before Curr) is registered in ascending order of the difference in POC from the current picture.

Similarly, a RefPicSetStCurrAfter list of the pictures (Short-term after Curr) and a RefPicSetLtCurr list of the pictures (Long-term) are created. Further, a RefPicSetIvCurr list is created, in which the picture identifying information of each of the pictures (Inter-layer) is registered in predetermined order.

For each piece of the picture identifying information registered in the RefPicSetStCurrBefore list, the RefPicSetStCurrAfter list, and the RefPicSetLtCurr list, used_by_curr can be set. The used_by_curr indicates whether a picture identified by that picture identifying information is used as a candidate of the reference picture of the current picture. The used_by_curr is 1 when indicating that the picture is used as a candidate of the reference picture of the current picture, and is 0 when indicating that the picture is not used.

In the example of FIG. 10, the used_by_curr of the head and second pieces of the picture identifying information of the RefPicSetStCurrBefore list and the RefPicSetStCurrAfter list and the head piece of the picture identifying information of the RefPicSetLtCurr list are set to 1.

Next, on the basis of the individual lists, two temporal lists, i.e., a RefPicListTemp0 list that preferentially registers the candidates of the reference picture that are previous to the current picture in display order and a RefPicListTemp1 list that preferentially registers the candidates of the reference picture that are subsequent to the current picture in display order, are created.

Specifically, the RefPicListTemp0 list is created, which registers in order the pieces of the picture identifying information of the RefPicSetStCurrBefore list, for which the used_by_curr is set to 1, the pieces of the picture identifying information registered in the RefPicSetIvCurr list, the pieces of the picture identifying information of the RefPicSetStCurrAfter list, for which the used_by_curr is set to 1, and the piece of the picture identifying information of the RefPicSetLtCurr list, for which the used_by_curr is set to 1.

Further, the RefPicListTemp1 list is created, which registers in order the pieces of the picture identifying information of the RefPicSetStCurrAfter list, for which the used_by_curr is set to 1, the pieces of the picture identifying information of the RefPicSetStCurrBefore list, for which the used_by_curr is set to 1, the piece of the picture identifying information of the RefPicSetLtCurr list, for which the used_by_curr is set to 1, and the pieces of the picture identifying information registered in the RefPicSetIvCurr list.

Next, the order of the pieces of the picture identifying information registered in the RefPicListTemp0 list and RefPicListTemp1 list is changed as needed (Reference reordering).

Lastly, a reference picture list RefPicList0 is created, in which a predetermined number (five in the example of FIG. 10) of pieces of the picture identifying information from the head, which are registered in the RefpicListTemp0 list, are registered in order from the head.

Further, a reference picture list RefPicList1 is created, in which a predetermined number (four in the example of FIG. 10) of pieces of the picture identifying information from the head, which are registered in the RefpicListTemp1 list, are registered in order from the head.

It should be noted that a value obtained by subtracting 1 from the number of pieces of the picture identifying information registered in the reference picture list RefPicList0 (RefPicList1) is disposed at a slice header or the like as num_ref_idx_l0_active minus1 (num_ref_idx_l1_active_minus1).

Figure 11:
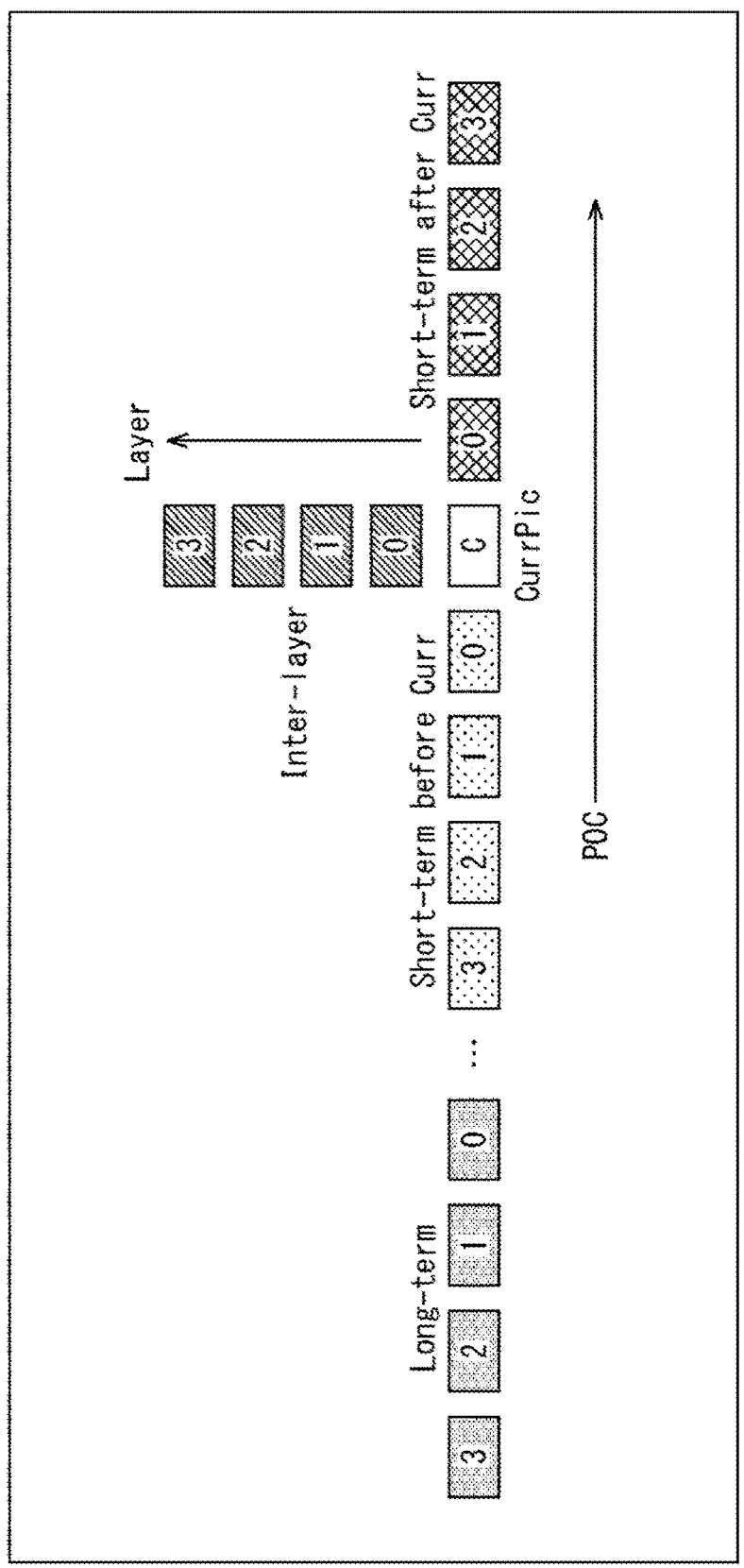
FIG. 11 is a diagram showing an example of a candidate of a reference picture in the first embodiment.

In the case where Intra BC and inter coding are commonalized, as shown in FIG. 11, it is necessary to add a current picture (CurrPic), which is the reference picture in Intra BC, as a candidate of the reference picture.

In the first embodiment, as described above, since the current picture is defined as a candidate of the reference picture, a current picture list (RefPicCurr) in which the picture identifying information of the current picture is registered can be created in the reference picture list creation processing. As a result, the picture identifying information of the current picture is registered in the reference picture list.

In the case where Intra BC and inter coding are simply communalized, however, it is unknown in which position of the reference picture list the picture identifying information of the current picture is registered.

Meanwhile, as shown in FIG. 2, the destination to save the reference picture is different between Intra BC and inter coding. Therefore, in order not to uselessly access the DRAM, when a decoding apparatus acquires an index of the picture identifying information of the reference picture within the reference picture list from an encoding apparatus, the decoding apparatus needs to recognize that the reference picture is a reference picture in any of Intra BC and inter coding. In other words, the decoding apparatus needs to recognize that the reference picture is any of the current picture and a picture different from the current picture.

Figure 12:
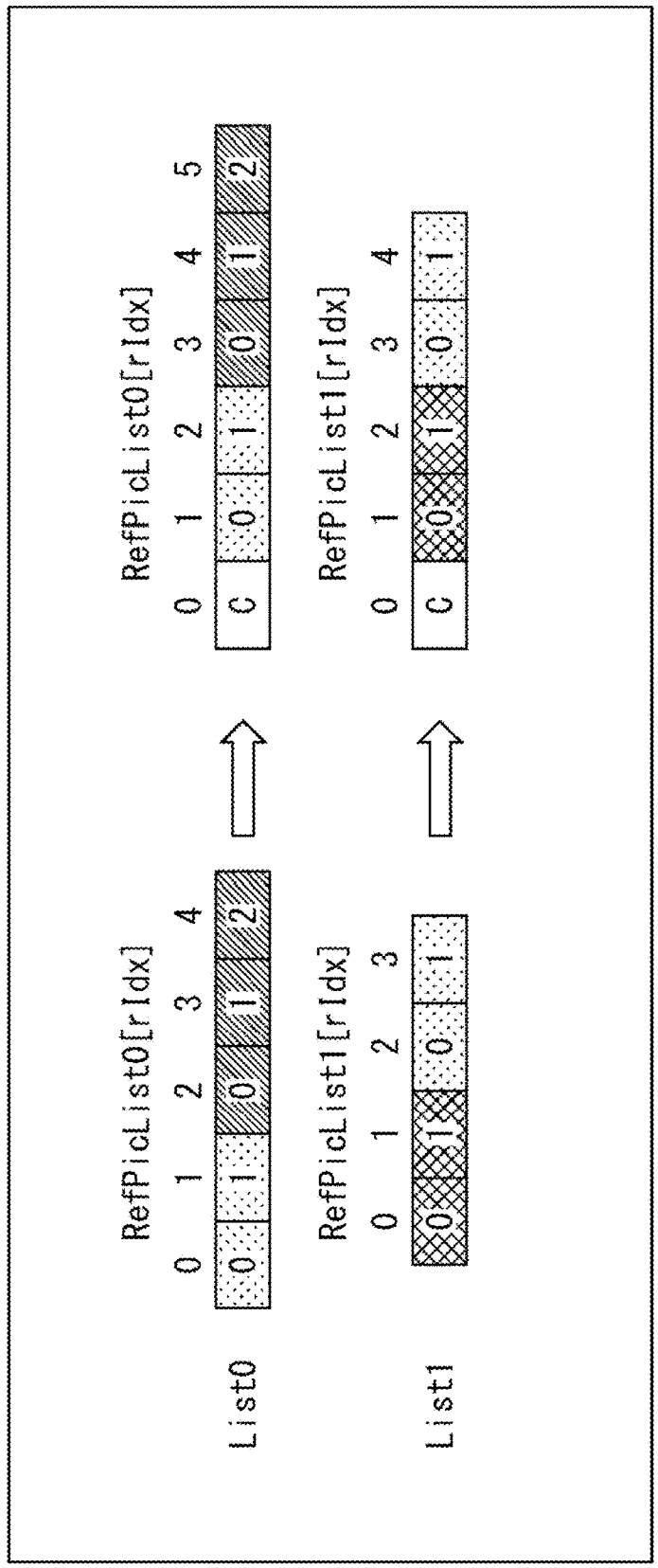
FIG. 12 is a diagram for describing reference picture list creation processing in the first embodiment.

In this regard, in the first embodiment, as shown in FIG. 12, the picture identifying information of the current picture, which is registered in the current picture list, is registered in the heads of the two reference picture lists, the RefPicList0 list and the RefPicList1 list.

Thus, in the case where the decoding apparatus acquires the index in the head of the reference picture list from the encoding apparatus, the decoding apparatus can recognize that the reference picture is the current picture, i.e., the reference picture in Intra BC. As a result, the decoding apparatus can read the current picture, as a reference picture, from the cache without accessing the DRAM.

It should be noted that the picture identifying information of the current picture may be registered in the RefPicList0 list only. Further, the position at which the picture identifying information of the current picture is registered can be set to an arbitrary predetermined position determined in advance, such as the tail end, in addition to the head.

(Configuration Example of First Embodiment of Encoding Apparatus)

Figure 13:
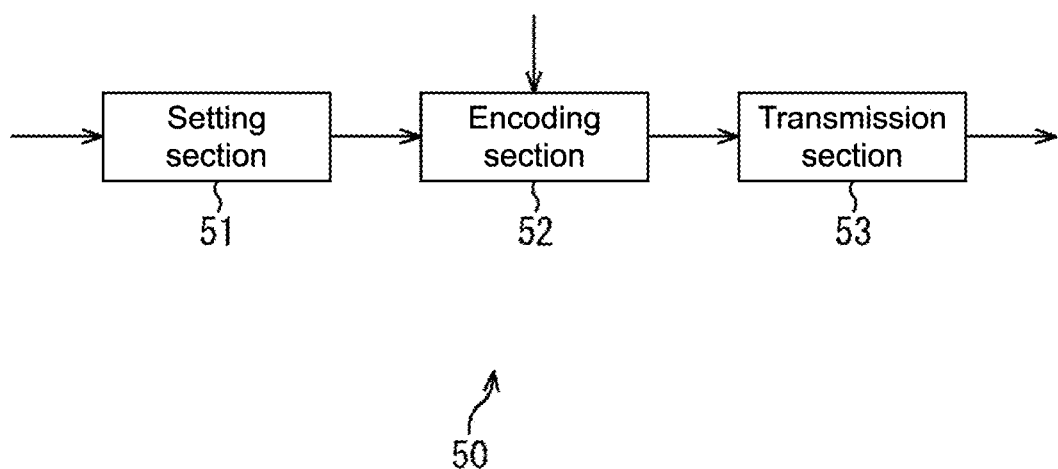
FIG. 13 is a block diagram showing a configuration example of a first embodiment of an encoding apparatus to which the present disclosure is applied.

FIG. 13 is a block diagram showing a configuration example of a first embodiment of an encoding apparatus as an image processing apparatus to which the present disclosure is applied.

An encoding apparatus 50 of FIG. 13 includes a setting section 51, an encoding section 52, and a transmission section 53 and encodes a picture by a system according to HEVC.

A unit of the encoding is a Coding UNIT (CU) having a recursive hierarchical structure. Specifically, the CU is set by dividing a picture into CTUs (Coding Tree Units) having a fixed size and dividing the CTU into two by arbitrary times in the horizontal direction and vertical direction. The maximum size of the CU is an LCU (Largest Coding Unit), and the minimum size thereof is an SCU (Smallest Coding Unit). Further, the CU is divided into PUs or TUs (transform units).

The setting section 51 of the encoding apparatus 50 sets a parameter set such as an SPS (Sequence Parameter Set), a PPS (Picture Parameter Set), VUI (Video Usability Information), and SEI (Supplemental Enhancement Information). The SPS includes information specifying the size of the LCU and the SCU, reference picture list information for creating a reference picture list, and the like.

The reference picture list information is constituted of, for example, information specifying the picture identifying information registered in the individual lists and the current picture list, used_by_curr, and the like. The setting section 51 supplies the set parameter set to the encoding section 52.

Pictures in units of frame are input to the encoding section 52. The encoding section 52 encodes the input pictures by a system according to HEVC. At that time, the parameter set supplied from the setting section 51 is used as needed. The encoding section 52 generates an encoded stream from encoded data obtained as a result of encoding and the parameter set supplied from the setting section 51 and supplies the encoded stream to the transmission section 53.

The transmission section 53 transmits the encoded stream, which is supplied from the encoding section 52, to a decoding apparatus that will be described later.

(Configuration Example of Encoding Section)

Figure 14:
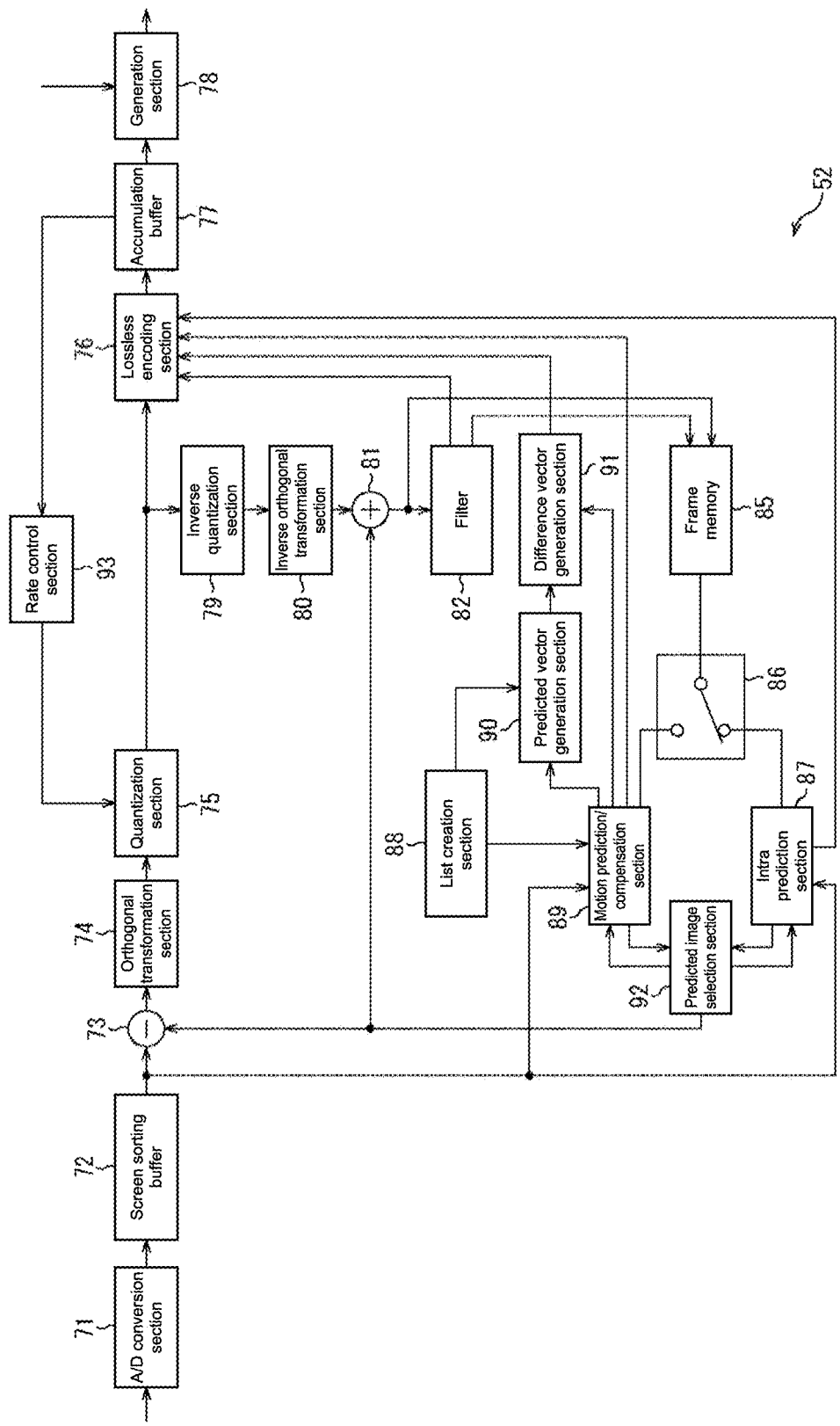
FIG. 14 is a block diagram showing a configuration example of a coding section of FIG. 13.

FIG. 14 is a block diagram showing a configuration example of the encoding section 52 of FIG. 13.

The encoding section 52 of FIG. 14 includes an A/D conversion section 71, a screen sorting buffer 72, a computing section 73, an orthogonal transformation section 74, a quantization section 75, a lossless encoding section 76, an accumulation buffer 77, a generation section 78, an inverse quantization section 79, an inverse orthogonal transformation section 80, and an adder section 81. Further, the encoding section 52 includes a filter 82, a frame memory 85, a switch 86, an intra prediction section 87, a list creation section 88, a motion prediction/compensation section 89, a predicted vector generation section 90, a difference vector generation section 91, a predicted image selection section 92, and a rate control section 93.

The A/D conversion section 71 of the encoding section 52 performs A/D conversion on pictures in unit of frame, which are input as encoding targets. The A/D conversion section 71 outputs the pictures, as digital signals after conversion, to the screen sorting buffer 72 to be stored therein.

The screen sorting buffer 72 sorts the pictures in unit of frame, which are stored in display order, in encoding order in accordance with the GOP (Group of Picture) structure. The screen sorting buffer 72 outputs each of the sorted pictures, as a current picture, to the computing section 73, the intra prediction section 87, and the motion prediction/compensation section 89.

The computing section 73 performs encoding by subtracting a predicted image, which is supplied from the predicted image selection section 92, from the current picture supplied from the screen sorting buffer 72. The computing section 73 outputs the resultant picture, as residual information, to the orthogonal transformation section 74. It should be noted that in the case where the predicted image is not supplied from the predicted image selection section 92, the computing section 73 outputs the current picture read from the screen sorting buffer 72, as residual information, to the orthogonal transformation section 74 without change.

The orthogonal transformation section 74 performs orthogonal transformation on the residual information from the computing section 73 in units of TU. The orthogonal transformation section 74 supplies an orthogonal transformation coefficient obtained as a result of the orthogonal transformation to the quantization section 75.

The quantization section 75 quantizes the orthogonal transformation coefficient supplied from the orthogonal transformation section 74. The quantization section 75 supplies the quantized orthogonal transformation coefficient to the lossless encoding section 76.

The lossless encoding section 76 acquires intra prediction mode information, which indicates an optimal intra prediction mode, from the intra prediction section 87. Further, the lossless encoding section 76 acquires inter prediction mode information, which indicates an optimal inter prediction mode, an index of the reference picture, and the like from the motion prediction/compensation section 89, and acquires motion vector information from the difference vector generation section 91. Moreover, the lossless encoding section 76 acquires offset filter information on adaptive offset filter processing from the filter 82.

The lossless encoding section 76 performs lossless encoding, such as variable-length encoding (for example, CAVLC (Context-Adaptive Variable Length Coding) etc.) and arithmetic encoding (for example, CABAC (Context-Adaptive Binary Arithmetic Coding) etc.), on the quantized orthogonal transformation coefficient supplied from the quantization section 75.

Further, the lossless encoding section 76 performs lossless encoding on the intra prediction mode information or the inter prediction mode information, the motion vector information, the index of the reference picture, the offset filter information, and the like, as encoding information on encoding. The lossless encoding section 76 disposes the lossless-encoded encoding information, a predetermined number (num_ref_idx_lo_minus1, num_ref_idx_lo_minus1) obtained by subtracting 1 from a registration number of the reference picture list, and the like in the slice header or the like.

The lossless encoding section 76 adds the slice header to the orthogonal transformation coefficient supplied from the quantization section 75 and then supplies the resultant data, as encoded data, to the accumulation buffer 77.

The accumulation buffer 77 temporarily stores the encoded data supplied from the lossless encoding section 76. Further, the accumulation buffer 77 supplies the stored encoded data to the generation section 78.

The generation section 78 generates an encoded stream from the parameter set supplied from the setting section 51 of FIG. 13 and the encoded data supplied from the accumulation buffer 77 and supplies the encoded stream to the transmission section 53 of FIG. 13.

Further, the quantized orthogonal transformation coefficient output from the quantization section 75 is also input to the inverse quantization section 79. The inverse quantization section 79 inversely quantizes the orthogonal transformation coefficient, which is quantized by the quantization section 75, by a method corresponding to a quantization method of the quantization section 75. The inverse quantization section 79 supplies the orthogonal transformation coefficient obtained as a result of inverse quantization to the inverse orthogonal transformation section 80.

The inverse orthogonal transformation section 80 performs inverse orthogonal transformation on the orthogonal transformation coefficient, which is supplied from the inverse quantization section 79, in units of TU by a method corresponding to an orthogonal transformation method of the orthogonal transformation section 74. The inverse orthogonal transformation section 80 supplies the resultant residual information to the adder section 81.

The adder section 81 adds the residual information supplied from the inverse orthogonal transformation section 80 and the predicted image supplied from the predicted image selection section 92, to locally decode the current picture. It should be noted that in the case where the predicted image is not supplied from the predicted image selection section 92, the adder section 81 sets the residual information, which is supplied from the inverse orthogonal transformation section 80, to a decoding result. The adder section 81 supplies the locally-decoded current picture to the frame memory 85. Further, the adder section 81 supplies the current picture, all regions of which are decoded, as an encoded picture, to the filter 82.

The filter 82 performs filter processing on the encoded picture supplied from the adder section 81. Specifically, the filter 82 performs deblocking filter processing and adaptive offset filter (SAO (Sample adaptive offset)) processing in sequence. The filter 82 supplies the encoded picture after subjected to the filter processing to the frame memory 85. Further, the filter 82 supplies information indicating an offset and a kind of the adaptive offset filter processing performed, as offset filter information, to the lossless encoding section 76.

The frame memory 85 is constituted of, for example, a cache and a DRAM. The frame memory 85 stores the current picture, which is supplied from the adder section 81, in the cache and stores the encoded picture, which is supplied from the filter 82, in the DRAM. Pixels adjacent to a current block in the current picture stored in the cache are set as peripheral pixels and supplied to the intra prediction section 87 via the switch 86.

Further, the current picture stored in the cache and the encoded picture stored in the DRAM are set as reference pictures and output to the motion prediction/compensation section 89 via the switch 86.

The intra prediction section 87 performs intra prediction processing on the current block in all candidate intra prediction modes by using the peripheral pixels read from the frame memory 85 via the switch 86.

Further, the intra prediction section 87 calculates a cost function value (details thereof will be described later) for all candidate intra prediction modes on the basis of the current picture read from the screen sorting buffer 72 and a predicted image generated as a result of the intra prediction processing. The intra prediction section 87 then determines an intra prediction mode, the cost function value of which is the smallest, to be the optimal intra prediction mode.

The intra prediction section 87 supplies the predicted image, which is generated in the optimal intra prediction mode, and a corresponding cost function value to the predicted image selection section 92. In the case where the intra prediction section 87 is notified of a selection of the predicted image generated in the optimal intra prediction mode by the predicted image selection section 92, the intra prediction section 87 supplies the intra prediction mode information to the lossless encoding section 76.

It should be noted that the cost function value is also called an RD (Rate Distortion) cost and is calculated on the basis of, for example, a technique of a High Complexity mode or Low Complexity mode as determined in JM (Joint Model), which is reference software in the H. 264/AVC system. It should be noted that the reference software in the H.264/AVC system is publicly available in http://iphome.hhi.de/suehring/tml/index.htm.

Specifically, in the case where the High Complexity mode is employed as a technique of calculating the cost function value, all candidate prediction modes are temporarily subjected to processing to decoding, and a cost function value expressed by the following expression (1) is calculated for each prediction mode.

[Mathematical Expression 1]

$$\text{Cost (Mode)} = D + \lambda \cdot R \quad (1)$$

D represents a difference (distortion) between a raw image and a decoded image, R represents the amount of generated codes including a coefficient of orthogonal transformation as well, and λ represents a Lagrange multiplier given as a function of a quantization parameter QP.

Meanwhile, in the case where the Low Complexity mode is employed as a technique of calculating the cost function value, generation of a predicted image and calculation of the amount of codes of encoding information are performed for all candidate prediction modes, and a cost function Cost (Mode) expressed by the following expression (2) is calculated for each prediction mode.

[Mathematical Expression 2]

$$\text{Cost (Mode)} = D + QPtoQuant(QP) \cdot \text{Header\_Bit} \quad (2)$$

D represents a difference (distortion) between a raw image and a predicted image, Header_Bit represents the amount of codes of encoding information, and QPtoQuant represents a function given as a function of a quantization parameter QP.

In the Low Complexity mode, it is only necessary to generate the predicted images for all the prediction modes and unnecessary to generate a decoded image. This leads to a smaller amount of computation.

The list creation section 88 performs the above-mentioned reference picture list creation processing, for example, in units of slice, on the basis of the reference picture list information included in the SPS set by the setting section 51 of FIG. 13, the information disposed in the slice header, and the like.

In other words, the list creation section 88 performs in sequence creation of the individual lists, creation of the temporal lists, rearrangement of the order of the pieces of the picture identifying information registered in the temporal lists, on the basis of the reference picture list information, the information disposed in the slice header, and the like, to create the reference picture list. The list creation section 88 then registers the picture identifying information of the current picture in the head of the reference picture list.

Further, the list creation section 88 sets SRTP or LTRP for each piece of the picture identifying information registered in the reference picture list, as a type of a reference picture of a picture identified by that picture identifying information. For example, the list creation section 88 (setting section) sets LTRP (used for long-term reference), as a type of the current picture, for the picture identifying information of the current picture. The list creation section 88 holds the reference picture list and also supplies the reference picture list to the motion prediction/compensation section 89.

The motion prediction/compensation section 89 performs motion prediction/compensation processing on the current block in all candidate inter prediction modes. Specifically, on the basis of the reference picture list supplied from the list creation section 88, the motion prediction/compensation section 89 reads a picture, which is identified by picture identifying information registered in that reference picture list, as a candidate of the reference picture, from the frame memory 85 via the switch 86.

On the basis of the current picture from the screen sorting buffer 72 and the current picture read as a candidate of the reference picture, the motion prediction/compensation section 89 detects in integer-pixel precision a motion vector of Intra BC of the current block in all candidate inter prediction modes. Further, on the basis of the current picture from the screen sorting buffer 72 and a picture other than the current picture read as a candidate of the reference picture, the motion prediction/compensation section 89 detects in a fraction-pixel precision a motion vector of inter coding of the current block in all candidate inter prediction modes.

On the basis of the detected motion vectors, the motion prediction/compensation section 89 then performs compensation processing on the candidates of the reference picture and generates a predicted image. It should be noted that the inter prediction mode is a mode indicating the size of the current block and the like.

Further, the motion prediction/compensation section 89 calculates a cost function value for all candidate inter prediction modes and the candidates of the reference picture on the basis of the current picture supplied from the screen sorting buffer 72 and the predicted image. The motion prediction/compensation section 89 determines an inter prediction mode, the cost function value of which is the smallest, to be the optimal inter prediction mode. The motion prediction/compensation section 89 then supplies the smallest cost function value and a corresponding predicted image to the predicted image selection section 92.

In the case where the motion prediction/compensation section 89 is notified of a selection of the predicted image generated in the optimal inter prediction mode by the predicted image selection section 92, the motion prediction/compensation section 89 determines a motion vector of the current block corresponding to that predicted image to be a current motion vector and supplies the motion vector to the difference vector generation section 91. Further, the motion prediction/compensation section 89 determines a candidate of the reference picture corresponding to that predicted image to be a reference picture, and supplies an index corresponding to a position, in the reference picture list, of picture identifying information of that reference picture to the predicted vector generation section 90 and the lossless encoding section 76. Moreover, the motion prediction/compensation section 89 supplies the inter prediction mode information to the lossless encoding section 76.

The predicted vector generation section 90 generates a predicted vector list of the current motion vector for each reference picture list in which the reference picture is registered, on the basis of the index supplied from the motion prediction/compensation section 89.

Specifically, on the basis of the index, the predicted vector generation section 90 reads a type of the reference picture corresponding to that index from the reference picture list held in the list creation section 88, and holds the type. The predicted vector generation section 90 sets the spatial-direction candidate block to a candidate block to be processed, in predetermined order, and sets the temporal-direction candidate block to a candidate block to be processed, in predetermined order.

The predicted vector generation section 90 compares the type of the reference picture of the candidate block to be processed, which is held therein, and the type of the reference picture of the current block read from the list creation section 88. In the case where those types are matched with each other, the predicted vector generation section 90 sets the candidate block to be processed to be available. In the case where those types are not matched with each other, the predicted vector generation section 90 sets the candidate block to be processed to not available.

In the case where the candidate block to be processed is set to available, the predicted vector generation section 90 generates a predicted vector of the current motion vector by using a candidate of the reference motion vector that is a motion vector of the candidate block to be processed. The predicted vector generation section 90 then generates a predicted vector list that resisters a predetermined number of generated predicted vectors of the spatial-direction candidate blocks and temporal-direction candidate blocks. It should be noted that the number of generated predicted vectors does not reach a predetermined number, a zero vector or the like is registered in the predicted vector list. The predicted vector generation section 90 supplies the predicted vector list to the difference vector generation section 91.

The difference vector generation section 91 generates a difference vector between each of a predetermined number of predicted vectors, which are registered in the predicted vector list supplied from the predicted vector generation section 90, and the current motion vector, to perform prediction encoding on the current motion vector. The difference vector generation section 91 supplies, the smallest value of the difference vector and an index corresponding to a position, in the predicted vector list, of a corresponding predicted vector, to the lossless encoding section 76.

On the basis of the cost function values supplied from the intra prediction section 87 and the motion prediction/compensation section 89, the predicted image selection section 92 determines a mode having a smaller corresponding cost function value, in the optimal intra prediction mode and the optimal inter prediction mode, to be the optimal prediction mode. The predicted image selection section 92 then supplies the predicted image of the optimal prediction mode to the computing section 73 and the adder section 81. Further, the predicted image selection section 92 notifies the intra prediction section 87 or the motion prediction/compensation section 89 of a selection of the predicted image of the optimal prediction mode.

The rate control section 93 controls the rate of a quantization operation of the quantization section 75 on the basis of the encoded data accumulated in the accumulation buffer 77 such that an overflow or underflow does not occur.

(Description on Processing of Encoding Apparatus)

Figure 15:
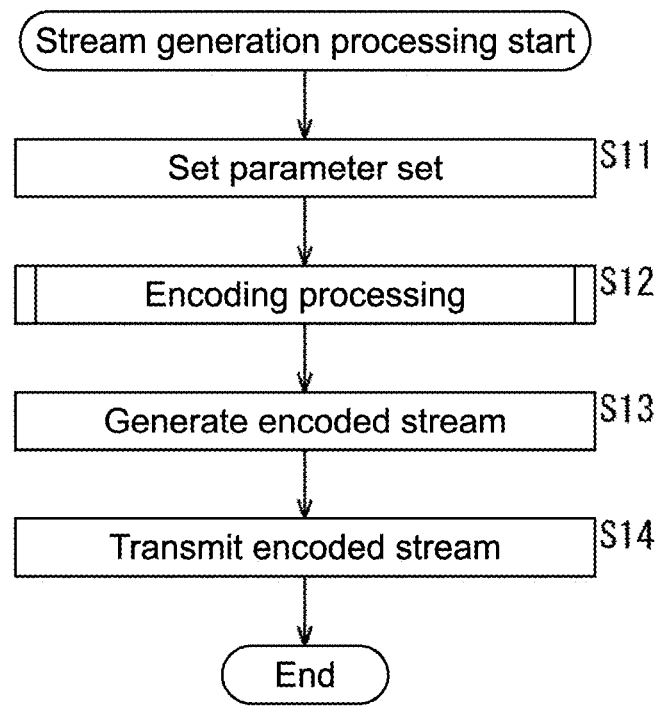
FIG. 15 is a flowchart for describing stream generation processing of the encoding apparatus of FIG. 13.

FIG. 15 is a flowchart for describing stream generation processing of the encoding apparatus 50 of FIG. 13.

In Step S11 of FIG. 15, the setting section 51 of the encoding apparatus 50 sets a parameter set. The setting section 51 supplies the set parameter set to the encoding section 52.

In Step S12, the encoding section 52 performs encoding processing of encoding pictures in units of frame, which are input from the outside, by a system according to HEVC. Details of the encoding processing will be described with reference to FIGS. 16 and 17 that will be described later.

In Step S13, the generation section 78 (FIG. 14) of the encoding section 52 generates an encoded stream from the parameter set supplied from the setting section 51 and accumulated encoded data and supplies the encoded stream to the transmission section 53.

In Step S14, the transmission section 53 transmits the encoded stream, which is supplied from the setting section 51, to a decoding apparatus that will be described later, and then terminates the processing.

Figure 16:
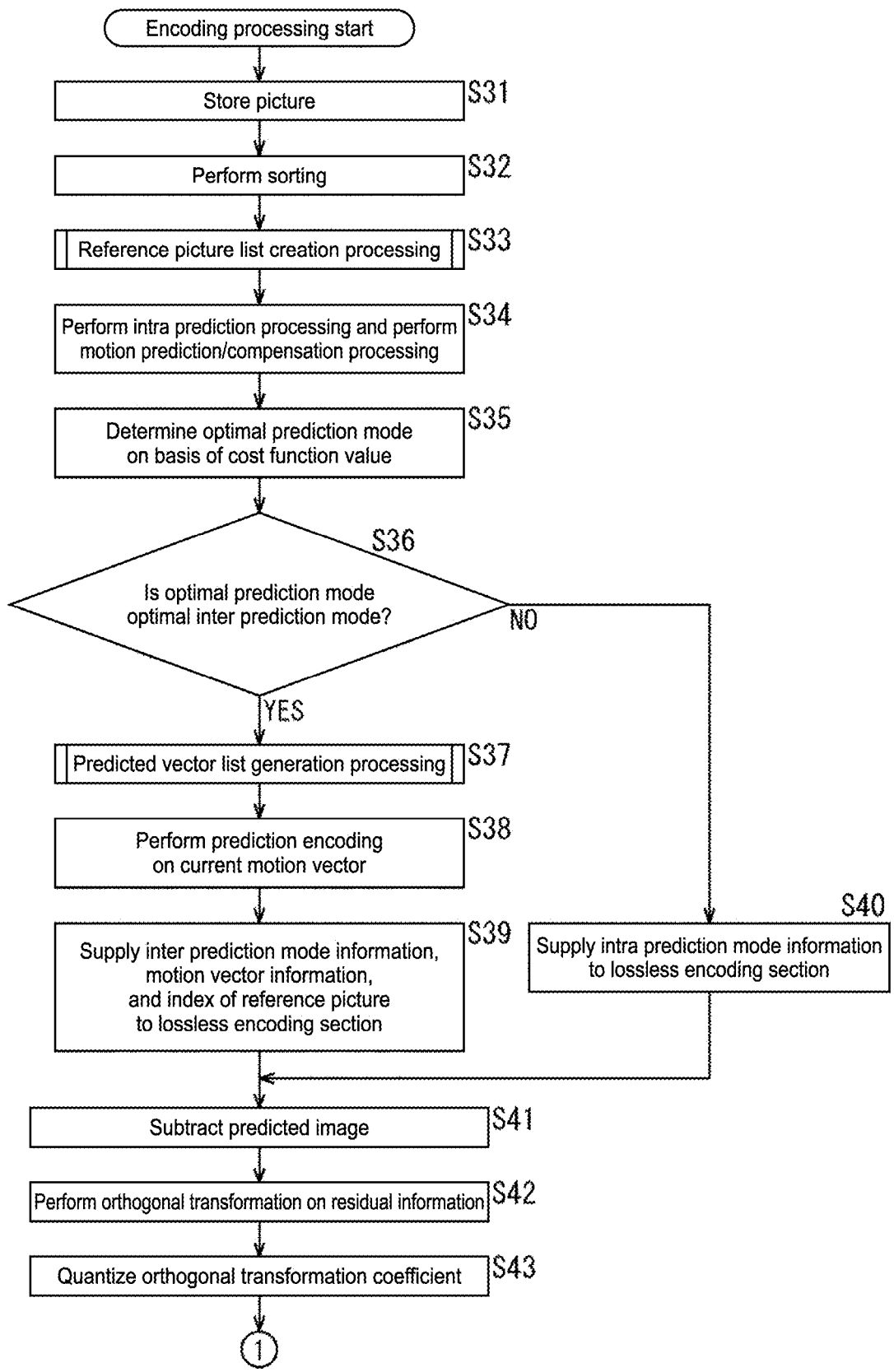
FIG. 16 is a flowchart for describing details of encoding processing of FIG. 15.
Figure 17:
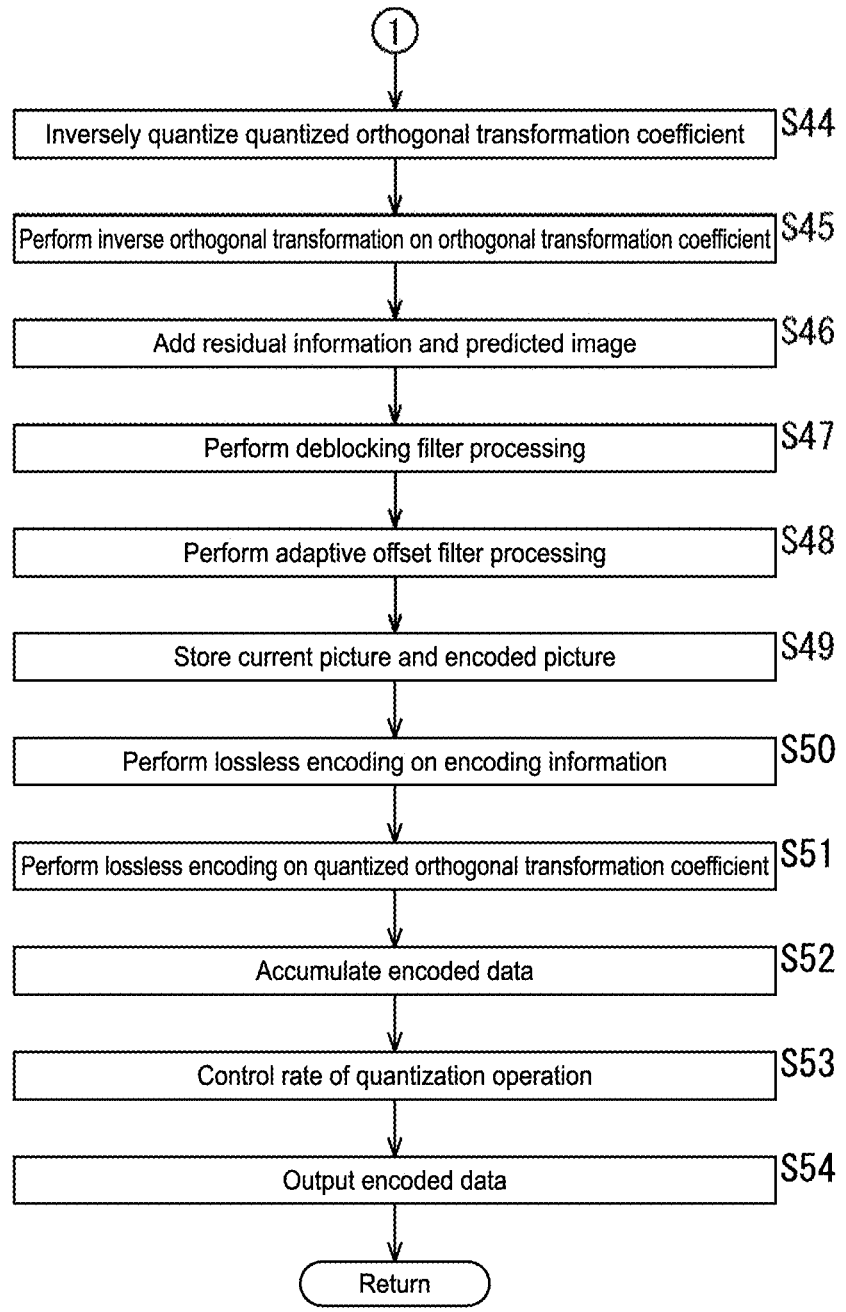
FIG. 17 is a flowchart for describing details of the encoding processing of FIG. 15.

FIGS. 16 and 17 are flowcharts for describing details of the encoding processing in Step S12 of FIG. 15.

In Step S31 of FIG. 16, the A/D conversion section 71 of the encoding section 52 performs A/D conversion on pictures in units of frame, which are input as encoding targets, and outputs the pictures, as digital signal after conversion, to the screen sorting buffer 72 to be stored therein.

In Step S32, the screen sorting buffer 72 sorts the pictures of frames, which are stored in display order, in encoding order in accordance with the GOP structure. The screen sorting buffer 72 supplies each of the pictures in units of frame after the sorting, as a current picture, to the computing section 73, the intra prediction section 87, and the motion prediction/compensation section 89.

In Step S33, the list creation section 88 performs reference picture list creation processing, for example, in units of slice, on the basis of reference picture list information included in an SPS, information disposed in the slice header, and the like. Details of the reference picture list creation processing will be described with reference to FIG. 18.

In Step S34, the intra prediction section 87 performs intra prediction processing on a current block in all candidate intra prediction modes by using peripheral pixels read from the frame memory 85 via the switch 86. Further, the intra prediction section 87 calculates a cost function value for all candidate intra prediction modes on the basis of the current picture from the screen sorting buffer 72 and a predicted image generated as a result of the intra prediction processing. The intra prediction section 87 then determines an intra prediction mode, the cost function value of which is the smallest, to be the optimal intra prediction mode. The intra prediction section 87 supplies the predicted image, which is generated in the optimal intra prediction mode, and a corresponding cost function value to the predicted image selection section 92.

Further, the motion prediction/compensation section 89 performs motion prediction/compensation processing on the current block in all candidate inter prediction modes on the basis of a reference picture list supplied from the list creation section 88. Further, the motion prediction/compensation section 89 calculates a cost function value for all candidate inter prediction modes and the reference picture on the basis of the current picture supplied from the screen sorting buffer 72 and a predicted image generated as a result of the motion prediction/compensation processing. The motion prediction/compensation section 89 determines an inter prediction mode, the cost function value of which is the smallest, to be the optimal inter prediction mode. The motion prediction/compensation section 89 then supplies the smallest cost function value and a corresponding predicted image to the predicted image selection section 92.

In Step S35, the predicted image selection section 92 determines a mode having the smallest cost function value, in the optimal intra prediction mode and the optimal inter prediction mode, to be the optimal prediction mode on the basis of the cost function values supplied from the intra prediction section 87 and the motion prediction/compensation section 89. The predicted image selection section 92 then supplies the predicted image of the optimal prediction mode to the computing section 73 and the adder section 81.

In Step S36, the predicted image selection section 92 determines whether the optimal prediction mode is the optimal inter prediction mode or not. In the case where it is determined in Step S36 that the optimal prediction mode is the optimal inter prediction mode, the predicted image selection section 92 notifies the motion prediction/compensation section 89 of a selection of the predicted image generated in the optimal inter prediction mode.

In accordance with this notification, the motion prediction/compensation section 89 determines a motion vector of the current block corresponding to the predicted image to be a current motion vector and supplies the current motion vector to the difference vector generation section 91. Further, the motion prediction/compensation section 89 determines a candidate of the reference picture corresponding to the predicted image to be a reference picture and supplies an index corresponding to a position, in the reference picture list, of picture identifying information of that reference picture to the predicted vector generation section 90.

In Step S37, the predicted vector generation section 90 performs predicted vector list generation processing of generating a predicted vector list of the current motion vector, on the basis of the index supplied from the motion prediction/compensation section 89. Details of the predicted vector list generation processing will be described later with reference to FIG. 19.

In Step S38, the difference vector generation section 91 generates a difference vector between each of a predetermined number of predicted vectors, which are registered in the predicted vector list supplied from the predicted vector generation section 90, and the current motion vector, to perform prediction encoding on the current motion vector. The difference vector generation section 91 then generates the smallest value of the difference vector and an index corresponding to a position, in the predicted vector list, of a corresponding predicted vector, as motion vector information.

In Step S39, the motion prediction/compensation section 89 supplies the inter prediction mode information and the index of the reference picture to the lossless encoding section 76, and the difference vector generation section 91 supplies the motion vector information to the lossless encoding section 76. The processing then proceeds to Step S41.

Meanwhile, in the case where it is determined in Step S36 that the optimal prediction mode is not the optimal inter prediction mode, that is, in the case where the optimal prediction mode is the optimal intra prediction mode, the predicted image selection section 92 notifies the intra prediction section 87 of a selection of the predicted image generated in the optimal intra prediction mode. In Step S40, the intra prediction section 87 supplies the intra prediction mode information to the lossless encoding section 76, and advances the processing to Step S41.

In Step S41, the computing section 73 performs encoding by subtracting the predicted image, which is supplied from the predicted image selection section 92, from the current picture supplied from the screen sorting buffer 72. The computing section 73 outputs the resultant picture, as residual information, to the orthogonal transformation section 74.

In Step S42, the orthogonal transformation section 74 performs orthogonal transformation on the residual information from the computing section 73 in units of TU, and supplies a resultant orthogonal transformation coefficient to the quantization section 75.

In Step S43, the quantization section 75 quantizes the orthogonal transformation coefficient supplied from the orthogonal transformation section 74 and supplies the quantized orthogonal transformation coefficient to the lossless encoding section 76 and the inverse quantization section 79.

In Step S44 of FIG. 17, the inverse quantization section 79 inversely quantizes the quantized coefficient supplied the quantization section 75 and supplies the resultant orthogonal transformation coefficient to the inverse orthogonal transformation section 80.

In Step S45, the inverse orthogonal transformation section 80 performs inverse orthogonal transformation on the orthogonal transformation coefficient supplied from the inverse quantization section 79 in units of TU and supplies the resultant residual information to the adder section 81.

In Step S46, the adder section 81 adds the residual information supplied from the inverse orthogonal transformation section 80 and the predicted image supplied from the predicted image selection section 92, to locally decode the current picture. The adder section 81 supplies the locally-decoded current picture to the frame memory 85. Further, the adder section 81 supplies the current picture, all regions of which are decoded, as an encoded picture, to the filter 82.

In Step S47, the filter 82 performs deblocking filter processing on the encoded picture supplied from the adder section 81.

In Step S48, the filter 82 performs adaptive offset filter processing on the encoded picture after subjected to the deblocking filter processing for each of the LCUs. The filter 82 supplies the resultant encoded picture to the frame memory 85. Further, the filter 82 supplies offset filter information to the lossless encoding section 76 for each of the LCUs.

In Step S49, the frame memory 85 stores the current picture, which is supplied from the adder section 81, in the cache and stores the encoded picture, which is supplied from the filter 82, in the DRAM. Pixels adjacent to the current block in the current picture stored in the cache are set as peripheral pixels and supplied to the intra prediction section 87 via the switch 86. Further, the current picture stored in the cache and the encoded picture stored in the DRAM are set as reference pictures and output to the motion prediction/compensation section 89 via the switch 86.

In Step S50, the lossless encoding section 76 performs lossless encoding on the intra prediction mode information or the inter prediction mode information, the motion vector information, the index of the reference picture, and the offset filter information, as encoding information.

In Step S51, the lossless encoding section 76 performs lossless encoding on the quantized orthogonal transformation coefficient supplied from the quantization section 75. The lossless encoding section 76 then generates encoded data from the encoding information lossless-encoded by the processing of Step S50 and the lossless-encoded orthogonal transformation coefficient, and supplies the encoded data to the accumulation buffer 77.

In Step S52, the accumulation buffer 77 temporarily accumulates the encoded data supplied from the lossless encoding section 76.

In Step S53, the rate control section 93 controls the rate of a quantization operation of the quantization section 75 on the basis of the encoded data accumulated in the accumulation buffer 77 such that an overflow or underflow does not occur.

In Step S54, the accumulation buffer 77 outputs the stored encoded data to the generation section 78. The processing then returns to Step S12 of FIG. 15 and proceeds to Step S13.

It should be noted that, for the purpose of simplifying description, the intra prediction processing and the motion prediction/compensation processing are constantly performed in the encoding processing of FIGS. 16 and 17, but actually, any one of the processing is performed depending on a picture type or the like in some cases.

Figure 18:
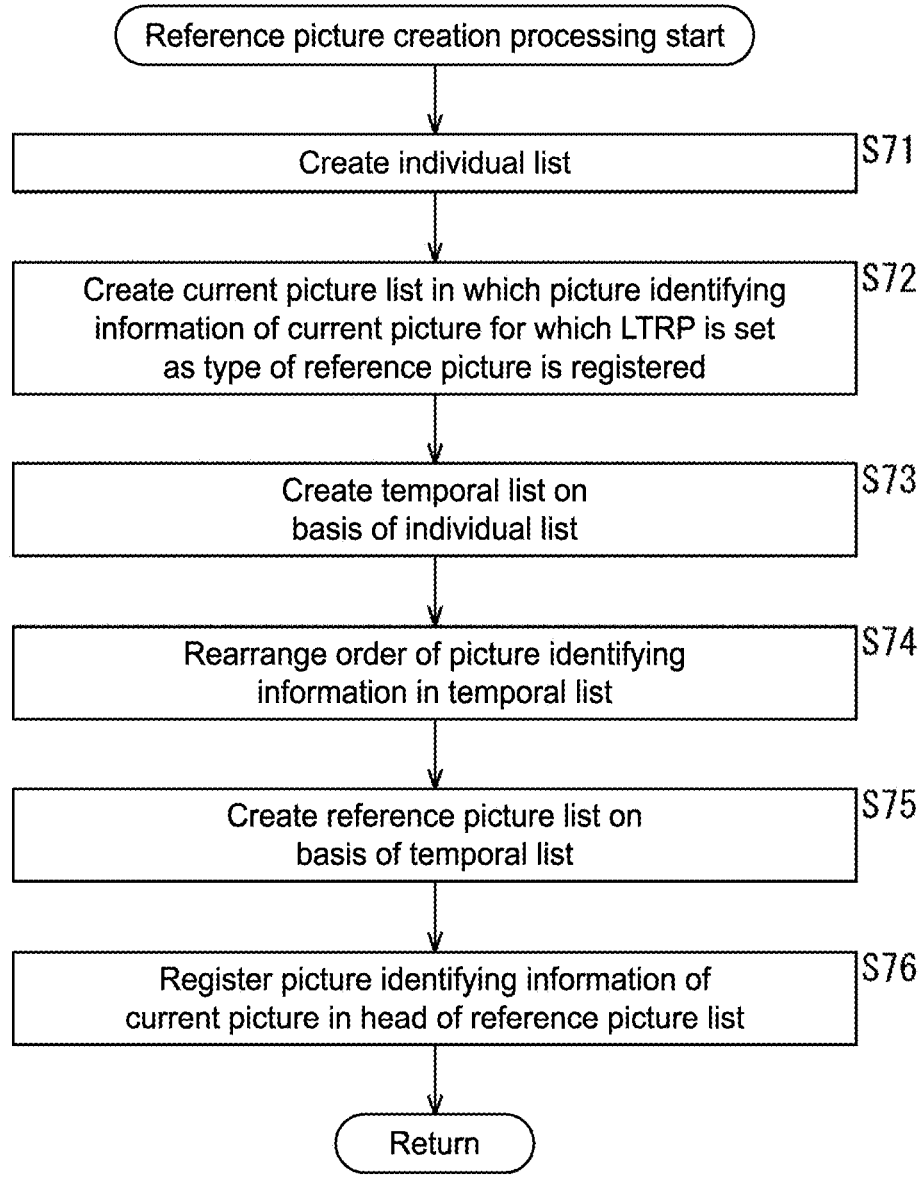
FIG. 18 is a flowchart for describing details of reference picture creation processing of FIG. 16.

FIG. 18 is a flowchart for describing details of the reference picture list creation processing in Step S33 of FIG. 16.

In Step S71 of FIG. 18, the list creation section 88 creates four individual lists, i.e., a RefPicSetStCurrBefore list, a RefPicSetStCurrAfter list, a RefPicSetLtCurr list, and a RefPicSetIvCurr list for each kind of candidates of the reference picture. In picture identifying information of each individual list, a type of a reference picture of a picture identified by that picture identifying information is set. Further, used_by_curr is set for each piece of the picture identifying information of the RefPicSetStCurrBefore list, the RefPicSetStCurrAfter list, and the RefPicSetLtCurr list.

In Step S72, the list creation section 88 creates a current picture list in which the picture identifying information of the current picture for which the LTRP is set as a type of the reference picture is registered.

In Step S73, the list creation section 88 creates two temporal lists, i.e., a RefpicListTemp0 list and a RefpicListTemp1 list on the basis of the picture identifying information of the individual list and the used_by_curr.

In Step S74, the list creation section 88 rearranges the order of the pieces of picture identifying information in the temporal lists, on the basis of ref pic list modification that is disposed in the slice header and specifies the order of the pieces of picture identifying information in the temporal lists.

In Step S75, on the basis of each of the temporal lists, the list creation section 88 creates a reference picture list in which a predetermined number of pieces of picture identifying information from the head, which are registered in the temporal list, are registered in order from the head.

In Step S76, the list creation section 88 registers the picture identifying information of the current picture, which is registered in the current picture list, in the head of the reference picture list. The processing then returns to Step S33 of FIG. 16 and proceeds to Step S34.

Figure 19:
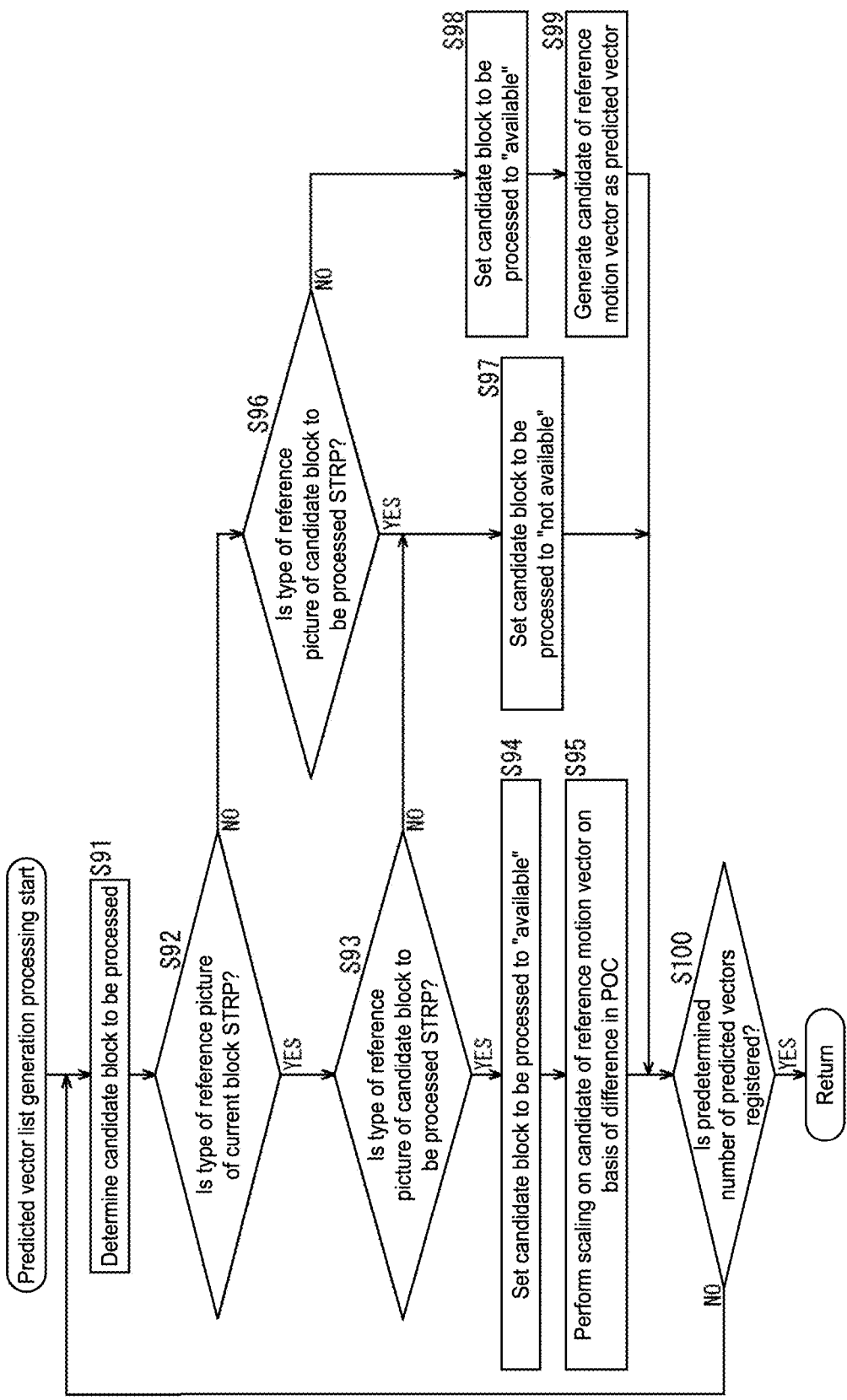
FIG. 19 is a flowchart for describing details of predicted vector list generation processing of FIG. 16.

FIG. 19 is a flowchart for describing details of the predicted vector list generation processing in Step S37 of FIG. 16. The predicted vector list generation processing is performed for each of the reference picture lists in which the reference picture is registered.

In Step S91 of FIG. 19, the predicted vector generation section 90 determines a predetermined candidate block to be a candidate block to be processed. In the first processing of Step S91, a predetermined spatial-direction candidate block is determined to be a candidate block to be processed.

In Step S92, on the basis of the index supplied from the motion prediction/compensation section 89, the predicted vector generation section 90 reads a type of the reference picture of the current block corresponding to that index from the reference picture list and holds the type. The predicted vector generation section 90 then determines whether the read type of the reference picture of the current block is the STRP or not.

In the case where it is determined in Step S92 that the type of the reference picture of the current block is the STRP, the processing proceeds to Step S93. In Step S93, the predicted vector generation section 90 determines whether the type of the reference picture of the candidate block to be processed, which is held therein, is the STRP or not.

In the case where it is determined in Step S93 that the type of the reference picture of the candidate block to be processed is the STRP, that is, in the case where the type of the reference picture of the current block and the type of the reference picture of the candidate block are both the STRP, the processing proceeds to Step S94.

In Step S94, the predicted vector generation section 90 sets the candidate block to be processed to available. In Step S95, on the basis of a difference in POC between the reference picture of the current block and the reference picture of the candidate block, the predicted vector generation section 90 performs scaling on the candidate of the reference motion vector, which is the motion vector of the candidate block to be processed, and generates a predicted vector. The predicted vector generation section 90 then registers that predicted vector in the predicted vector list and advances the processing to Step S100.

Meanwhile, in the case where it is determined in Step S92 that the type of the reference picture of the current block is not the STRP, that is, in the case where the type of the reference picture of the current block is the LTRP, the processing proceeds to Step S96.

In Step S96, similarly to the processing in Step S93, the predicted vector generation section 90 determines whether the type of the reference picture of the candidate block to be processed is the STRP or not. In the case where it is determined in Step S96 that the type of the reference picture of the candidate block to be processed is the STRP, that is, in the case where the type of the reference picture of the current block is the LTRP and the type of the reference picture of the candidate block is the STRP, the processing proceeds to Step S97.

In Step S97, the predicted vector generation section 90 sets the candidate block to be processed to not available and advances the processing to Step S100.

Meanwhile, in the case where it is determined in Step S93 that the type of the reference picture of the candidate block to be processed is not the STRP, that is, in the case where the type of the reference picture of the current block is the STRP and the type of the reference picture of the candidate block is the LTRP, the processing proceeds to Step S97. Thus, the candidate block to be processed is set to not available.

Further, in the case where it is determined in Step S96 that the type of the reference picture of the candidate block to be processed is not the STRP, that is, in the case where the type of the reference picture of the current block and the type of the reference picture of the candidate block are both the LTRP, the processing proceeds to Step S98.

In Step S98, the predicted vector generation section 90 sets the candidate block to be processed to available. In Step S99, the predicted vector generation section 90 generates a candidate of the reference motion vector, which is the motion vector of the candidate block to be processed, to be a predicted vector without change. The predicted vector generation section 90 then registers that predicted vector in the predicted vector list and advances the processing to Step S100.

In Step S100, the predicted vector generation section 90 determines whether a predetermined number of predicted vectors are registered in the predicted vector list or not. In the case where it is determined in Step S100 that a predetermined number of predicted vectors are not yet registered, the processing returns to Step S91. A predetermined spatial-direction candidate block or temporal-direction candidate block, which is not yet determined to be a candidate block to be processed, is determined to be a candidate block to be processed, and the subsequent processing is performed.

Meanwhile, in the case where it is determined in Step S100 that a predetermined number of predicted vectors are registered, the predicted vector generation section 90 supplies the predicted vector list to the difference vector generation section 91. The processing then returns to Step S37 of FIG. 16 and proceeds to Step S38.

As described above, at the time of encoding of a current motion vector used in Intra BC, in the case where the actual type of the reference picture of the current block and the actual type of the reference picture of the candidate block are different from each other, the encoding apparatus 50 sets the candidate block to not available. Thus, the motion vector of the candidate block, the actual type of the reference picture of which is different from the actual type of the reference picture of the current block, is not used for generation of the predicted vector. Therefore, the difference vector becomes small, and coding efficiency is improved.

Further, the encoding apparatus 50 sets the type of the reference picture of the current block, the actual type of which is "Intra BC", to the LTRP. Thus, in the case where the actual type of the reference picture of the candidate block is the STRP, the encoding apparatus 50 sets the candidate block to not available. Therefore, it is possible to improve coding efficiency in the case where Intra BC and inter coding are communalized, without largely changing HEVC in the case where Intra BC and inter coding are not communalized.

Moreover, the encoding apparatus 50 registers the picture identifying information of the current picture in a predetermined position of the reference picture list of the current block. Therefore, a decoding apparatus that will be described later can know whether the reference picture is a current picture or not on the basis of an index corresponding to a position, in the reference picture list, of the picture identifying information of the reference picture. As a result, it is possible to prevent useless access to the DRAM from occurring in the case where the reference picture is the current picture.

(Configuration Example of First Embodiment of Decoding Apparatus)

Figure 20:
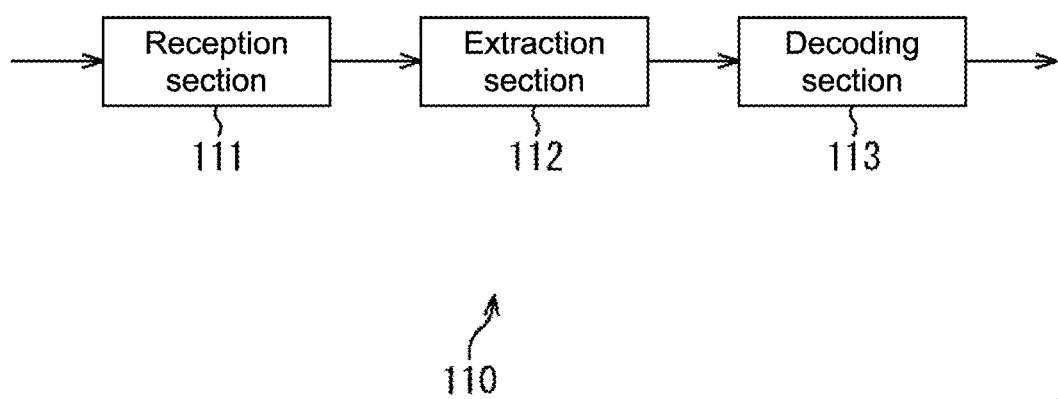
FIG. 20 is a block diagram showing a configuration example of a first embodiment of a decoding apparatus to which the present disclosure is applied.

FIG. 20 is a block diagram showing a configuration example of a first embodiment of a decoding apparatus as an image processing apparatus to which the present disclosure is applied, the decoding apparatus decoding the encoded stream transmitted from the encoding apparatus 50 of FIG. 13.

The decoding apparatus 110 of FIG. 20 is constituted of a reception section 111, an extraction section 112, and a decoding section 113.

The reception section 111 of the decoding apparatus 110 receives the encoded stream transmitted from the encoding apparatus 50 of FIG. 13 and supplies the encoded stream to the extraction section 112.

The extraction section 112 extracts the parameter set and the encoded data from the encoded stream supplied from the reception section 111 and supplies the parameter set and the encoded data to the decoding section 113.

The decoding section 113 decodes the encoded data, which is supplied from the extraction section 112, by a system according to HEVC. At that time, the decoding section 113 also refers to the parameter set supplied from the extraction section 112, as needed. The decoding section 113 outputs a picture obtained as a result of the decoding.

(Configuration Example of Decoding Section)

Figure 21:
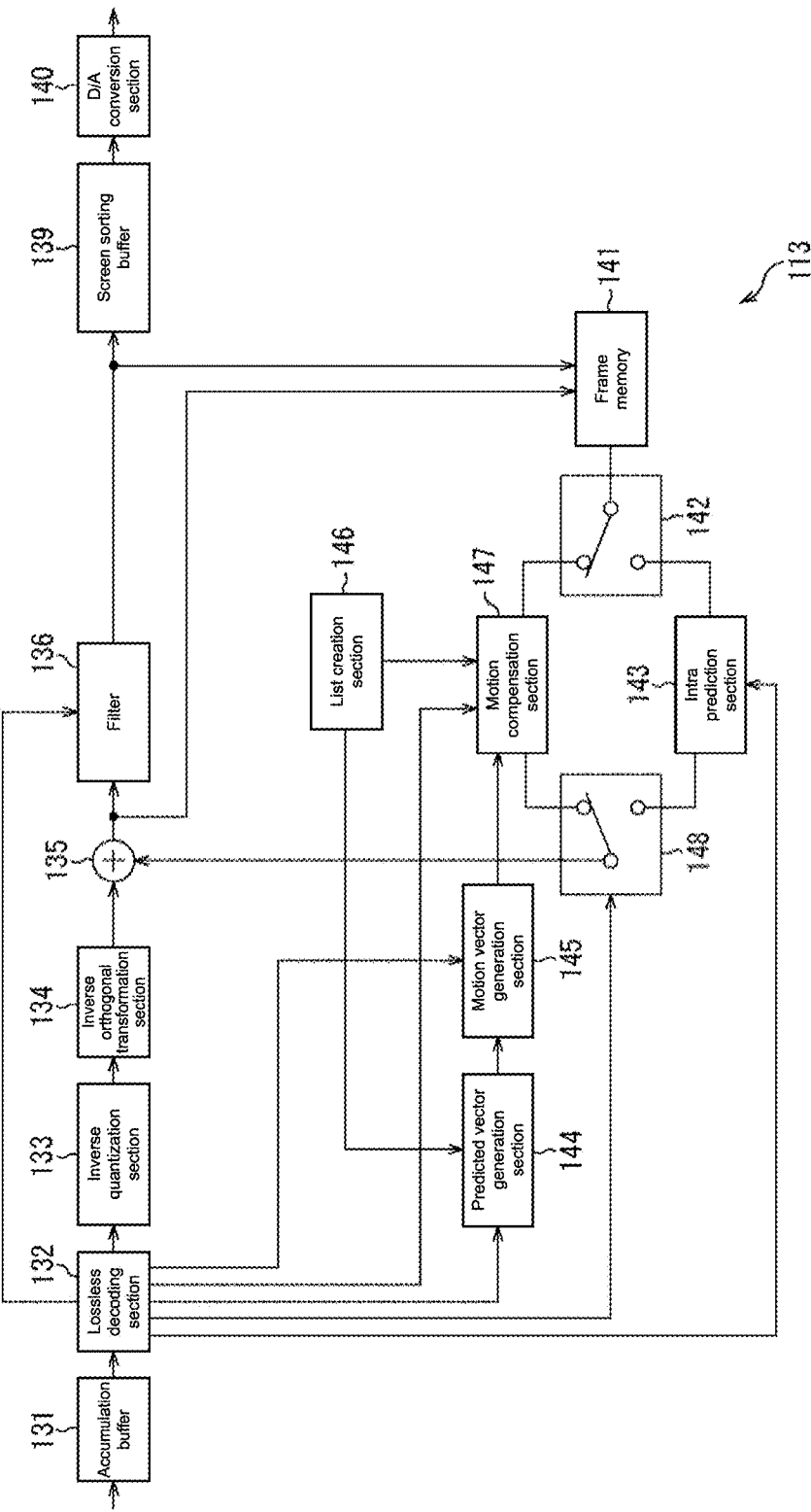
FIG. 21 is a block diagram showing a configuration example of a decoding section of FIG. 20.

FIG. 21 is a block diagram showing a configuration example of the decoding section 113 of FIG. 20.

The decoding section 113 of FIG. 21 includes an accumulation buffer 131, a lossless decoding section 132, an inverse quantization section 133, an inverse orthogonal transformation section 134, an adder section 135, a filter 136, and a screen sorting buffer 139. Further, the decoding section 113 includes a D/A conversion section 140, a frame memory 141, a switch 142, an intra prediction section 143, a predicted vector generation section 144, a motion vector generation section 145, a list creation section 146, a motion compensation section 147, and a switch 148.

The accumulation buffer 131 of the decoding section 113 receives the encoded data from the extraction section 112 of FIG. 20 and accumulates the encoded data. The accumulation buffer 131 supplies the accumulated encoded data, as the encoded data of the current picture, to the lossless decoding section 132.

The lossless decoding section 132 performs lossless decoding, such as variable-length decoding and arithmetic decoding, which corresponds to the lossless encoding of the lossless encoding section 76 of FIG. 14, on the encoded data from the accumulation buffer 131, to acquire the quantized orthogonal transformation coefficient and the encoding information. The lossless decoding section 132 supplies the quantized orthogonal transformation coefficient to the inverse quantization section 133. Further, the lossless decoding section 132 supplies the intra prediction mode information and the like, as the encoding information, to the intra prediction section 143. The lossless decoding section 132 supplies the index of the reference picture to the predicted vector generation section 144, supplies the motion vector information to the motion vector generation section 145, and supplies the inter prediction mode information and the index of the reference picture to the motion compensation section 147.

Moreover, the lossless decoding section 132 supplies the intra prediction mode information or inter prediction mode information, as the encoding information, to the switch 148. The lossless decoding section 132 supplies the offset filter information, as the encoding information, to the filter 136.

The inverse quantization section 133, the inverse orthogonal transformation section 134, the adder section 135, the filter 136, the frame memory 141, the switch 142, the intra prediction section 143, the predicted vector generation section 144, the list creation section 146, and the motion compensation section 147 respectively perform processing similar to the inverse quantization section 79, the inverse orthogonal transformation section 80, the adder section 81, the filter 82, the frame memory 85, the switch 86, the intra prediction section 87, the predicted vector generation section 90, the list creation section 88, and the motion prediction/compensation section 89. Thus, the picture is decoded.

Specifically, the inverse quantization section 133 inversely quantizes the quantized orthogonal transformation coefficient supplied from the lossless decoding section 132 and supplies the resultant orthogonal transformation coefficient to the inverse orthogonal transformation section 134.

The inverse orthogonal transformation section 134 performs inverse orthogonal transformation on the orthogonal transformation coefficient supplied from the inverse quantization section 133 in units of TU. The inverse orthogonal transformation section 134 supplies residual information, which is obtained as a result of the inverse orthogonal transformation, to the adder section 135.

The adder section 135 adds the residual information supplied from the inverse orthogonal transformation section 134 and a predicted image supplied from the switch 148, to locally decode the current picture. It should be noted that in the case where the predicted image is not supplied from the switch 148, the adder section 135 sets the residual information, which is supplied from the inverse orthogonal transformation section 134, to a decoding result. The adder section 135 supplies the locally-decoded current picture, which is obtained as a result of the decoding, to the frame memory 141. Further, the adder section 135 supplies the current picture, all regions of which are decoded, as a decoded picture, to the filter 136.

The filter 136 performs filter processing on the decoded picture supplied from the adder section 135. Specifically, the filter 136 first performs deblocking filter processing on the decoded picture. Next, the filter 136 performs adaptive offset filter processing, a kind of which is indicated by the offset filter information, on the decoded picture after subjected to the deblocking filter processing for each of the LCUs by using an offset indicated by the offset filter information from the lossless decoding section 132. The filter 136 supplies the decoded picture after subjected to the adaptive offset filter processing to the frame memory 141 and the screen sorting buffer 139.

The screen sorting buffer 139 stores, in units of frame, the decoded pictures supplied from the filter 136. The screen sorting buffer 139 sorts the decoded pictures in units of frame, which are stored in encoding order, in the original display order, and supplies those pictures to the D/A conversion section 140.

The D/A conversion section 140 performs D/A conversion on the decoded pictures in units of frame, which are supplied from the screen sorting buffer 139, and outputs those pictures.

The frame memory 141 is constituted of, for example, a cache and a DRAM. The frame memory 141 stores the current picture, which is supplied from the adder section 135, in the cache and stores the decoded picture, which is supplied from the filter 136, in the DRAM. Pixels adjacent to the current block in the current picture stored in the cache are set as peripheral pixels and supplied to the intra prediction section 143 via the switch 142.

Further, the current picture stored in the cache or the decoded picture stored in the DRAM is set as a reference picture and output to the motion compensation section 147 via the switch 142.

The intra prediction section 143 performs the intra prediction processing of the optimal intra prediction mode, which is indicated by the intra prediction mode information supplied from the lossless decoding section 132, on the current block by using the peripheral pixels read from the frame memory 141 via the switch 142. The intra prediction section 143 supplies the resultant predicted image to the switch 148.

The predicted vector generation section 144 generates a predicted vector list of the current motion vector on the basis of the index supplied from the lossless decoding section 132 and the reference picture list held in the list creation section 146, similarly to the predicted vector generation section 90 of FIG. 14. The predicted vector generation section 144 supplies the predicted vector list to the motion vector generation section 145.

On the basis of the index in the motion vector information supplied from the lossless decoding section 132, the motion vector generation section 145 reads a predicted vector corresponding to that index from the predicted vector list supplied from the predicted vector generation section 144. The motion vector generation section 145 adds the predicted vector and a difference vector in the motion vector information, to perform prediction decoding on the current motion vector. The motion vector generation section 145 supplies the resultant current motion vector to the motion compensation section 147.

Similarly to the list creation section 88 of FIG. 14, the list creation section 146 performs the reference picture list creation processing on the basis of the reference picture list information included in the SPS extracted by the extraction section 112 of FIG. 20, the information disposed in the slice header, and the like. The list creation section 146 holds and supplies the resultant reference picture list to the motion compensation section 147.

The motion compensation section 147 performs motion compensation processing on the current block on the basis of the inter prediction mode information from the lossless decoding section 132, the index of the reference picture, and the current motion vector from the motion vector generation section 145.

Specifically, the motion compensation section 147 reads the picture identifying information of the index of the reference picture, in the pieces of the picture identifying information registered in the picture list held in the list creation section 146. The motion compensation section 147 reads a reference picture identified by the read picture identifying information from the frame memory 141 via the switch 142. The motion compensation section 147 performs motion compensation processing on the current block in the optimal inter prediction mode indicated by the inter prediction mode information, by using the reference picture and the current motion vector. The motion compensation section 147 supplies the resultant predicted image to the switch 148.

In the case where the intra prediction mode information is supplied from the lossless decoding section 132, the switch 148 supplies the predicted image, which is supplied from the intra prediction section 143, to the adder section 135. Meanwhile, in the case where the inter prediction mode information is supplied from the lossless decoding section 132, the switch 148 supplies the predicted image, which is supplied from the motion compensation section 147, to the adder section 135.

(Description on Processing of Decoding Apparatus)

Figure 22:
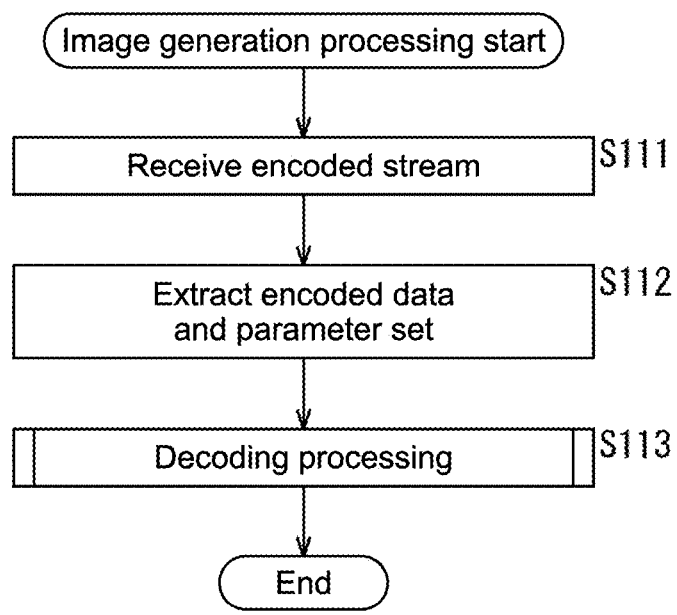
FIG. 22 is a flowchart for describing image generation processing of the decoding apparatus of FIG. 20.

FIG. 22 is a flowchart for describing image generation processing of the decoding apparatus 110 of FIG. 20.

In Step S111 of FIG. 22, the reception section 111 of the decoding apparatus 110 receives the encoded stream transmitted from the encoding apparatus 50 of FIG. 13 and supplies the encoded stream to the extraction section 112.

In Step S112, the extraction section 112 extracts the encoded data and the parameter set from the encoded stream supplied from the reception section 111 and supplies the encoded data and the parameter set to the decoding section 113.

In Step S113, the decoding section 113 performs decoding processing of decoding the encoded data, which is supplied from the extraction section 112, by a system according to HEVC by using as needed the parameter set supplied from the extraction section 112. Details of the decoding processing will be described with reference to FIG. 23 that will be described later. The processing is thus terminated.

Figure 23:
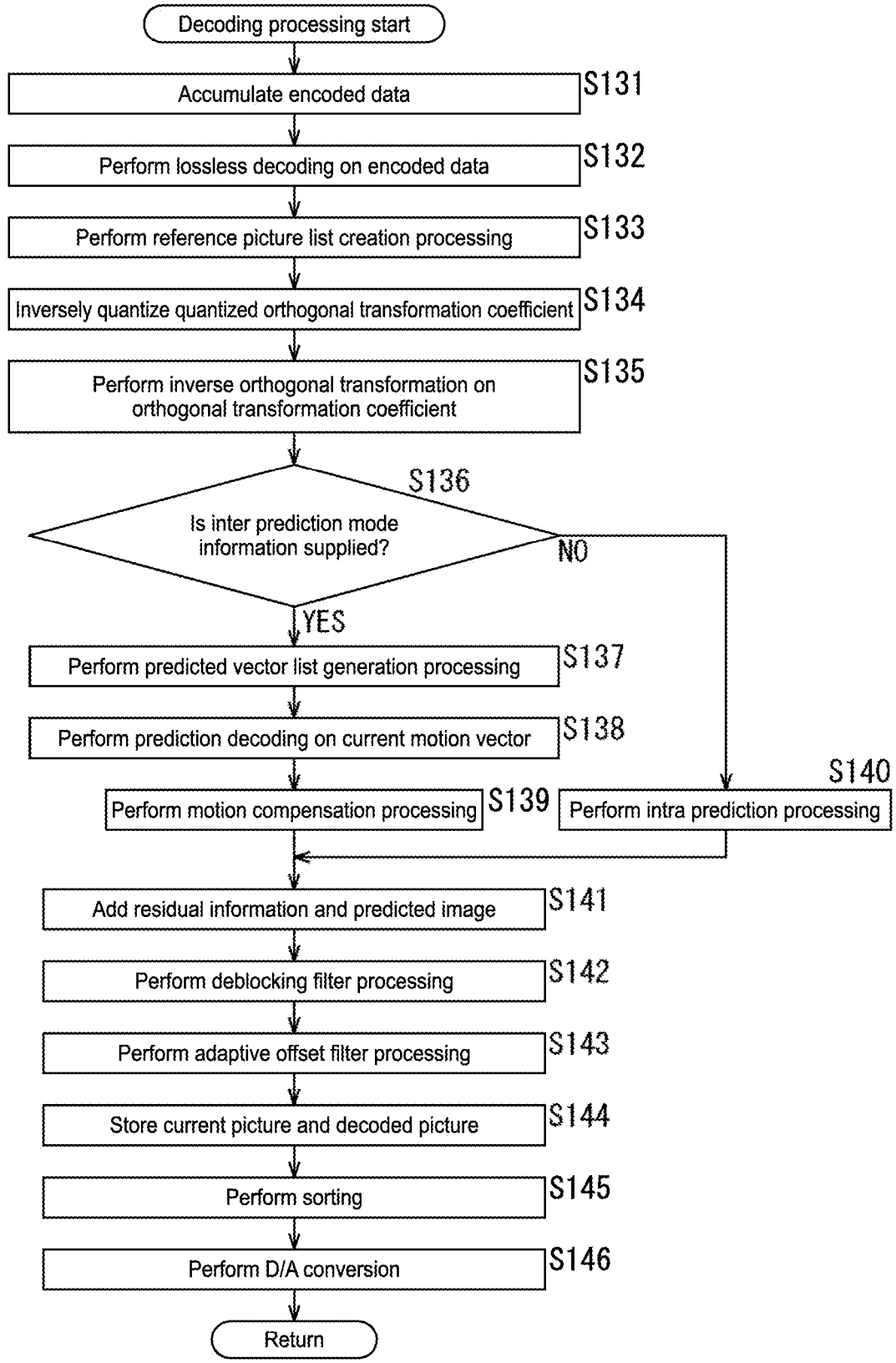
FIG. 23 is a flowchart for describing details of decoding processing of FIG. 22.

FIG. 23 is a flowchart for describing details of the decoding processing in Step S113 of FIG. 22.

In Step S131 of FIG. 23, the accumulation buffer 131 (FIG. 21) of the decoding section 113 receives the encoded data in units of frame from the extraction section 112 and accumulates the encoded data. The accumulation buffer 131 supplies the accumulated encoded data, as the encoded data of the current picture, to the lossless decoding section 132.

In Step S132, the lossless decoding section 132 performs lossless decoding on the encoded data from the accumulation buffer 131 and acquires the quantized orthogonal transformation coefficient and the encoding information. The lossless decoding section 132 supplies the quantized orthogonal transformation coefficient to the inverse quantization section 133.

Further, the lossless decoding section 132 supplies the intra prediction mode information and the like, as the encoding information, to the intra prediction section 143. The lossless decoding section 132 supplies the index of the reference picture to the predicted vector generation section 144, supplies the motion vector information to the motion vector generation section 145, and supplies the inter prediction mode information and the index of the reference picture to the motion compensation section 147.

Moreover, the lossless decoding section 132 supplies the intra prediction mode information or inter prediction mode information, as the encoding information, to the switch 148. The lossless decoding section 132 supplies the offset filter information, as the encoding information, to the filter 136.

In Step S133, the list creation section 146 performs the reference picture list creation processing, which is similar to the reference picture creation processing of FIG. 18, on the basis of the reference picture list information included in the SPS extracted by the extraction section 112, the information disposed in the slice header, and the like.

In Step S134, the inverse quantization section 133 inversely quantizes the quantized orthogonal transformation coefficient supplied from the lossless decoding section 132 and supplies the resultant orthogonal transformation coefficient to the inverse orthogonal transformation section 134.

In Step S135, the inverse orthogonal transformation section 134 performs inverse orthogonal transformation on the orthogonal transformation coefficient supplied from the inverse quantization section 133 and supplies the resultant residual information to the adder section 135.

In Step S136, the motion compensation section 147 determines whether the inter prediction mode information is supplied from the lossless decoding section 132 or not. In the case where it is determined in Step S136 that the inter prediction mode information is supplied, the processing proceeds to Step S137.

In Step S137, the predicted vector generation section 144 performs the predicted vector list generation processing, which is similar to the predicted vector list generation processing of FIG. 19, on the basis of the index supplied from the lossless decoding section 132 and the reference picture list held in the list creation section 146.

In Step S138, on the basis of the index in the motion vector information, the motion vector generation section 145 reads a predicted vector corresponding to that index from the predicted vector list. The motion vector generation section 145 adds the predicted vector and a difference vector in the motion vector information, to perform prediction decoding on the current motion vector. The motion vector generation section 145 supplies the resultant current motion vector to the motion compensation section 147.

In Step S139, the motion compensation section 147 performs the motion compensation processing on the current block on the basis of the inter prediction mode information and the index of the reference picture from the lossless decoding section 132, and the current motion vector from the motion vector generation section 145. The motion compensation section 147 supplies the resultant predicted image to the switch 148 and advances the processing to Step S141.

Meanwhile, in the case where it is determined in Step S136 that the inter prediction mode information is not supplied, that is, in the case where the intra prediction mode information is supplied to the intra prediction section 143, the processing proceeds to Step S140.

In Step S140, the intra prediction section 143 performs the intra prediction processing of the optimal intra prediction mode, which is indicated by the intra prediction mode information, on the current block by using the peripheral pixels read from the frame memory 141 via the switch 142. The intra prediction section 143 supplies a predicted image generated as a result of the intra prediction processing to the adder section 135 via the switch 148 and advances the processing to Step S141.

In Step S141, the adder section 135 adds the residual information supplied from the inverse orthogonal transformation section 134 and the predicted image supplied from the switch 148, to locally decode the current picture. The adder section 135 supplies the locally-decoded current picture, which is obtained as a result of the decoding, to the frame memory 141. Further, the adder section 135 supplies the current picture, all regions of which are decoded, as a decoded picture, to the filter 136.

In Step S142, the filter 136 performs deblocking filter processing on the decoded picture supplied from the adder section 135, to remove block distortion.

In Step S143, the filter 136 performs adaptive offset filter processing on the decoded picture after subjected to the deblocking filter processing for each of the LCUs, on the basis of the offset filter information supplied from the lossless decoding section 132. The filter 136 supplies the picture after subjected to the adaptive offset filter processing to the screen sorting buffer 139 and the frame memory 141.

In Step S144, the frame memory 141 stores the current picture, which is supplied from the adder section 81, in the cache and stores the decoded picture, which is supplied from the filter 136, in the DRAM. Pixels adjacent to the current block in the current picture stored in the cache are set as peripheral pixels and supplied to the intra prediction section 143 via the switch 142. Further, the current picture stored in the cache or the decoded picture stored in the DRAM is set as a reference picture and output to the motion compensation section 147 via the switch 142.

In Step S145, the screen sorting buffer 139 stores, in units of frame, the decoded pictures supplied from the filter 136, sorts the pictures in units of frame, which are stored in encoding order, in the original display order, and supplies those pictures to the D/A conversion section 140.

In Step S146, the D/A conversion section 140 performs D/A conversion on the pictures in units of frame, which are supplied from the screen sorting buffer 139, and outputs the pictures. The processing then returns to Step S113 of FIG. 22 and is terminated.

As described above, at the time of decoding of a current motion vector used in Intra BC, in the case where the actual type of the reference picture of the current block and the actual type of the reference picture of the candidate block are different from each other, the decoding apparatus 110 sets the candidate block to not available. Thus, the motion vector of the candidate block, the actual type of the reference picture of which is different from the actual type of the reference picture of the current block, is not used for generation of the predicted vector.

Therefore, the reference motion vector of the candidate block, the actual type of the reference picture of which is different from the actual type of the reference picture of the current block, is not used for generation of the predicted vector, and thus an encoded stream having improved coding efficiency can be decoded.

Further, the decoding apparatus 110 sets the type of the reference picture of the current block, the actual type of which is "Intra BC", to the LTRP. Thus, in the case where the actual type of the reference picture of the candidate block is the STRP, the decoding apparatus 110 sets the candidate block to not available. Therefore, it is possible to decode an encoded stream having improved coding efficiency in the case where Intra BC and inter coding are communalized, without largely changing HEVC in the case where Intra BC and inter coding are not communalized.

Moreover, the decoding apparatus 110 registers the picture identifying information of the current picture in a predetermined position of the reference picture list of the current block. Therefore, the decoding apparatus 110 can know whether the reference picture is a current picture or not on the basis of an index corresponding to a position, in the reference picture list, of the picture identifying information of the reference picture. As a result, it is possible to prevent useless access to the DRAM from occurring in the case where the reference picture is the current picture.

Second Embodiment

General Outline of Second Embodiment

The general outline of a second embodiment will first be described with reference to FIGS. 24 to 27.

In the second embodiment, the coding efficiency in the case where Intra BC and inter coding are commonalized is improved not by setting the type of the current picture, which is the reference picture in Intra BC, to the LTRP but by changing a method of generating a predicted vector list in the case where the actual type of the reference picture is "Intra BC".

FIGS. 24 to 26 are diagrams for describing a method of generating a predicted vector list in the case where the actual type of the reference picture is "Intra BC" in the second embodiment.

It should be noted that DiffPicOrderCnt (X,Y) represents a difference (X−Y) in POC between a picture X and a picture Y. Further, RefPicListX[refIdxLX] and LX[refIdxLX] (X=0 or X=1) each represent a reference picture identified by picture identifying information of an index refIdxLX of a reference picture of a current block, in picture identifying information registered in a reference picture list RefPicListX used for encoding of a slice including the current block.

Further, CurrPic represents a current picture, and ColPic represents a picture of a temporal-direction candidate block. Moreover, xNbAK and yNbAK respectively represent a position in an x direction and a position in a y direction of a spatial-direction candidate block (hereinafter, called left candidate block) adjacent to the current block on the left, the upper left, or the lower left. $xNbB_K$ and $yNbB_K$ respectively represent a position in the x direction and a position in the y direction of a spatial-direction candidate block (hereinafter, upper candidate block) adjacent to the current block on the upper or the upper right.

listCol[refIdxCol] represents a reference picture identified by picture identifying information of an index refIdxCol of a reference picture of a temporal-direction candidate block, in picture identifying information registered in a reference picture list RefPicListX used for encoding of a slice including the temporal-direction candidate block.

As shown in FIG. 24, in the second embodiment, in the case where the candidate block to be processed is the left candidate block, when DiffPicOrderCnt (RefPicListX[refIdxLX], CurrPic)=0 and when DiffPicOrderCnt (RefPicListX[refIdxLX], CurrPic) and DiffPicOrderCnt (RefPicListX[RefIdxLX[xNbAx] [yNbAK]], CurrPic) are equal to each other, the candidate block to be processed is set to available.

In other words, in the case where the reference picture of the current picture and the reference picture of the left candidate block are each the current picture, that is, in the case where the actual type of the reference picture of the current picture and the actual type of the reference picture of the left candidate block are "Intra BC", the left candidate block is set to available. A candidate of a reference motion vector, which is a motion vector of the left candidate block, is then generated as a predicted vector without change.

Similarly, in the second embodiment, as shown in FIG. 25, in the case where the candidate block to be processed is the upper candidate block, when DiffPicOrderCnt (RefPicListX[refIdxLX], CurrPic)=0 and when DiffPicOrderCnt (RefPicListX[refIdxLX], CurrPic) and DiffPicOrderCnt (RefPicListX[RefIdxLX[xNbB$_K$] [yNbB$_K$]], CurrPic) are equal to each other, the candidate block to be processed is set to available.

In other words, in the case where the actual type of the reference picture of the current picture and the actual type of the reference picture of the upper candidate block are "Intra BC", the upper candidate block is set to available. A candidate of a reference motion vector, which is a motion vector of the upper candidate block, is then generated as a predicted vector without change. The generation of the predicted vector is performed for each of the reference picture lists in which the reference picture is registered.

Further, in the second embodiment, as shown in FIG. 26, in the case where the candidate block to be processed is the temporal-direction candidate block, when DiffPicOrderCnt (LX[refIdxLX], CurrPic)=0 and when DiffPicOrderCnt (LX [refIdxLX], CurrPic) and DiffPicOrderCnt (listCol[refIdxCol], ColPic) for colPb are equal to each other, the candidate block to be processed is set to available.

In other words, in the case where the actual type of the reference picture of the current picture and the actual type of the reference picture of the temporal-direction candidate block are "Intra BC", the temporal-direction candidate block is set to available. A candidate of a reference motion vector, which is a motion vector of the temporal-direction candidate block, is then generated as a predicted vector without change.

As a result, as shown in FIG. 27, in the case where the actual type of the reference picture of the current picture is "Intra BC", and only in the case where the actual type of the reference picture of the candidate block is "Intra BC", the motion vector of the candidate block is generated as a predicted vector without change. Meanwhile, in the cases other than above, the candidate block is set to not available. It should be noted that the type of the candidate of the reference picture, the actual type of which is "Intra BC", is set to STRP.

Configurations of an encoding apparatus and a decoding apparatus in the second embodiment are similar to those of the encoding apparatus 50 of FIG. 13 and the decoding apparatus 110 of FIG. 20, except for the reference picture list creation processing performed in the list creation section 88 and the list creation section 146 and the predicted vector list generation processing performed in the predicted vector generation section 90 and the predicted vector generation section 144. Therefore, hereinafter, the sections of the encoding apparatus 50 of FIG. 13 and the decoding apparatus 110 of FIG. 20 will be used as the sections of the encoding apparatus and the decoding apparatus in the second embodiment, and only the reference picture list creation processing and the predicted vector generation processing will be described.

(Description on Processing of Encoding Apparatus)

Figure 28:
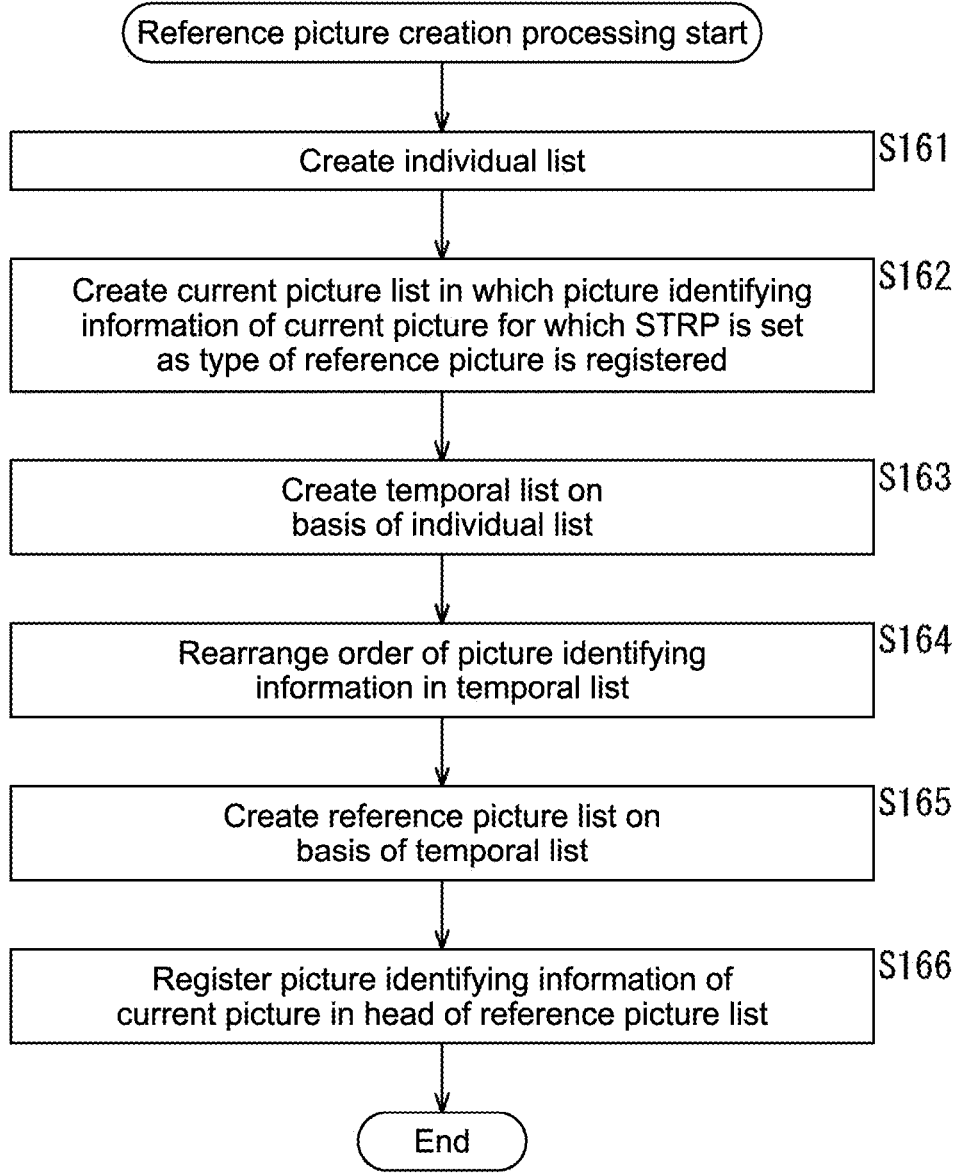
FIG. 28 is a flowchart for describing details of reference picture creation processing in the second embodiment.

FIG. 28 is a flowchart for describing the reference picture list creation processing of the list creation section 88 of the encoding apparatus 50 in the second embodiment.

In Step S161 of FIG. 28, the list creation section 88 creates four individual lists similarly to the processing of Step S71 in FIG. 18. STRP or LTRP is set for picture identifying information of each of the individual lists.

In Step S162, the list creation section 88 creates a current picture list in which the picture identifying information of the current picture for which the STRP is set as a type of the reference picture is registered.

Processing in Steps S163 to S166 are similar to the processing in Steps S73 to S76 of FIG. 18, and description thereof will thus be omitted.

It should be noted that, although not shown in the figures, the reference picture list creation processing of the list creation section 146 of the decoding apparatus 110 in the second embodiment is also performed similarly to the reference picture list creation processing of FIG. 28.

Figure 29:
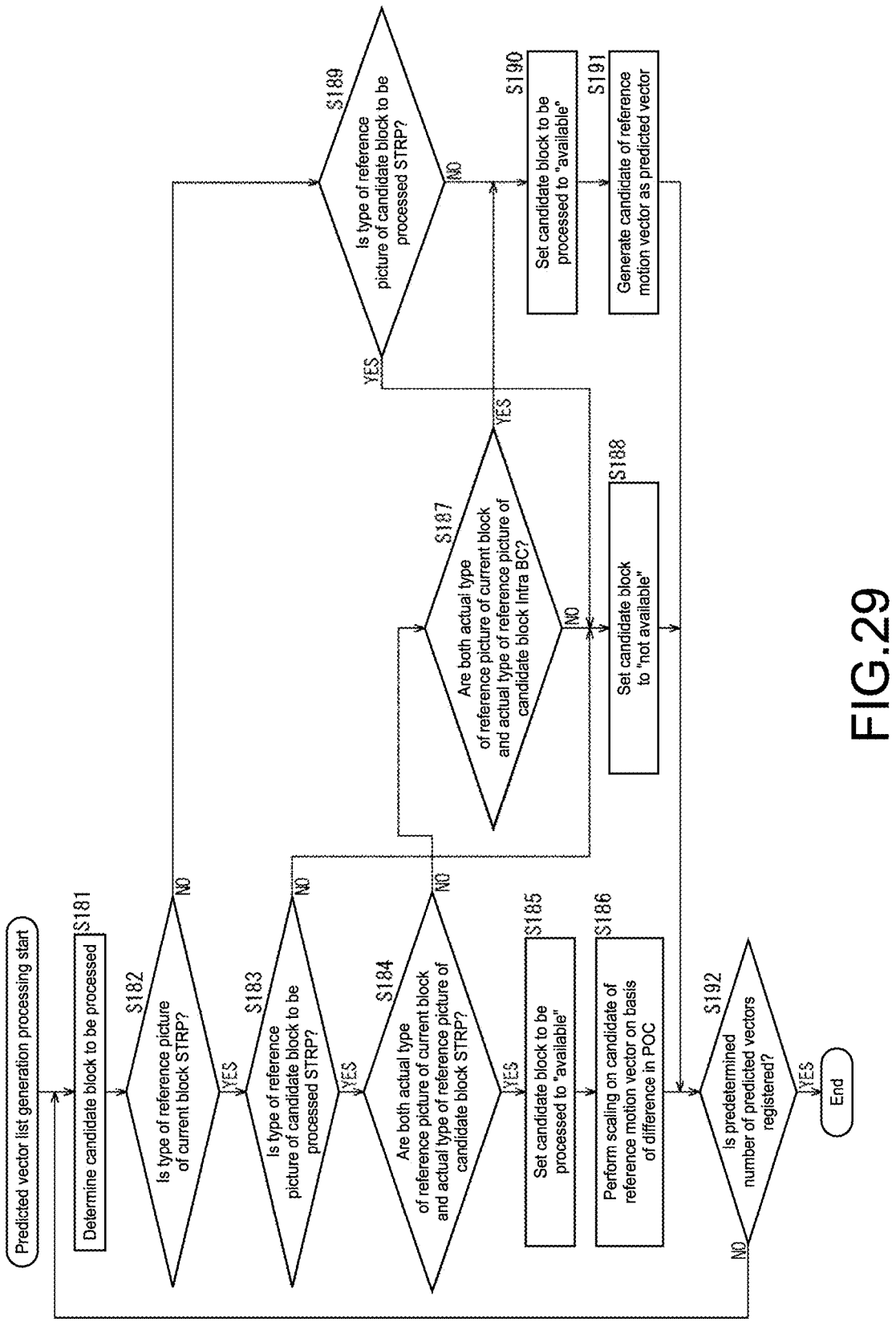
FIG. 29 is a flowchart for describing details of predicted vector list generation processing in the second embodiment.

FIG. 29 is a flowchart for describing details of the predicted vector list generation processing of the predicted vector generation section 90 of the encoding apparatus 50 in the second embodiment. The predicted vector list generation processing is performed for each of the reference picture lists in which the reference picture is registered.

Processing in Steps S181 to S183 of FIG. 29 are similar to the processing in Steps S91 to S93 of FIG. 19, and description thereof will thus be omitted. In the case where it is determined in Step S183 that the type of the reference picture of the candidate block to be processed is the STRP, the processing proceeds to Step S184. In Step S184, the predicted vector generation section 90 determines whether both the actual type of the reference picture of the current block and the actual type of the reference picture of the candidate block are the STRP or not. Specifically, for example, the predicted vector generation section 90 determines whether a difference in POC between the reference picture of the current block and the current picture and a difference in POC between the reference picture of the candidate block and the picture of the candidate block are both 1 or more.

In the case where the predicted vector generation section 90 determines that the difference in POC between the reference picture of the current block and the current picture and the difference in POC between the reference picture of the candidate block and the picture of the candidate block are both 1 or more, the predicted vector generation section 90 determines that both the actual type of the reference picture of the current block and the actual type of the reference picture of the candidate block are the STRP, and advances the processing to Step S185.

Processing in Steps S185 and S186 are similar to the processing in Steps S94 and S95 of FIG. 19, and description thereof will thus be omitted.

Meanwhile, in the case where at least one of the difference in POC between the reference picture of the current block and the current picture and the difference in POC between the reference picture of the candidate block and the picture of the candidate block is 0, the predicted vector generation section 90 determines in Step S184 that at least one of the actual type of the reference picture of the current block and the actual type of the reference picture of the candidate block is not the STRP.

In Step S187, the predicted vector generation section 90 determines whether both the actual type of the reference picture of the current block and the actual type of the reference picture of the candidate block are "Intra BC" or not. Specifically, the predicted vector generation section 90 determines whether the difference in POC between the reference picture of the current block and the current picture and the POC between the reference picture of the candidate block and the picture of the candidate block are 0 or not.

In the case where the predicted vector generation section 90 determines that the difference in POC between the reference picture of the current block and the current picture and or the POC between the reference picture of the candidate block and the picture of the candidate block is not 0, the predicted vector generation section 90 determines that any one of the actual type of the reference picture of the current block and the actual type of the reference picture of the candidate block is not "Intra BC", and advances the processing to Step S188.

In other words, in the case where the reference picture of the current block is the current picture but the picture of the candidate block and the reference picture of the candidate block are different from each other, and in the case where the picture of the candidate block and the reference picture of the candidate block are the same but the reference picture of the current block is not the current picture, the predicted vector generation section 90 determines that the actual type of the reference picture of the current block and the actual type of the reference picture of the candidate block are different from each other, and advances the processing to Step S188.

In Step S188, the predicted vector generation section 90 sets the candidate block to be processed to not available.

Further, in the case where it is determined in Step S182 that the type of the reference picture of the current block is not the STRP, that is, in the case where the type of the reference picture of the current block is the LTRP, the processing proceeds to Step S189.

In Step S189, similarly to the processing of Step S183, the predicted vector generation section 90 determines whether the type of the reference picture of the candidate block to be processed is the STRP or not. In the case where it is determined in Step S189 that the type of the reference picture of the candidate block to be processed is the STRP, that is, in the case where the type of the reference picture of the current block is the LTRP and the type of the reference picture of the candidate block is the STRP, the processing proceeds to Step S188. Thus, the candidate block to be processed is set to not available.

Meanwhile, in the case where it is determined in Step S189 that the type of the reference picture of the candidate block to be processed is not the STRP, that is, in the case where both the type of the reference picture of the current block and the type of the reference picture of the candidate block are the LTRP, the processing proceeds to Step S190. Processing in Steps S190 and S191 are similar to the processing in Steps S98 and S99 of FIG. 19, and description thereof will thus be omitted.

Meanwhile, in the case where the predicted vector generation section 90 determines that the difference in POC between the reference picture of the current block and the current picture and the difference in POC between the reference picture of the candidate block and the picture of the candidate block are both 0, the predicted vector generation section 90 determines in Step S187 that both the actual type of the reference picture of the current block and the actual type of the reference picture of the candidate block are "Intra BC".

The predicted vector generation section 90 then advances the processing to Step S190. Thus, the candidate block to be processed is set to available, and the candidate of the reference motion vector of the candidate block to be processed is generated as a predicted vector. After the processing of Step S186, S188, or S191, the processing proceeds to Step S192. The processing of Step S192 is similar to the processing of Step S100 in FIG. 19, and description thereof will thus be omitted.

It should be noted that, although not shown in the figures, the predicted vector list generation processing of the predicted vector generation section 144 of the decoding apparatus 110 in the second embodiment is also performed similarly to the predicted vector list generation processing of FIG. 29.

Third Embodiment

General Outline of Third Embodiment

In a third embodiment, the picture identifying information of the current picture is registered in the head of the temporal list, not in the reference picture list.

Figure 30:
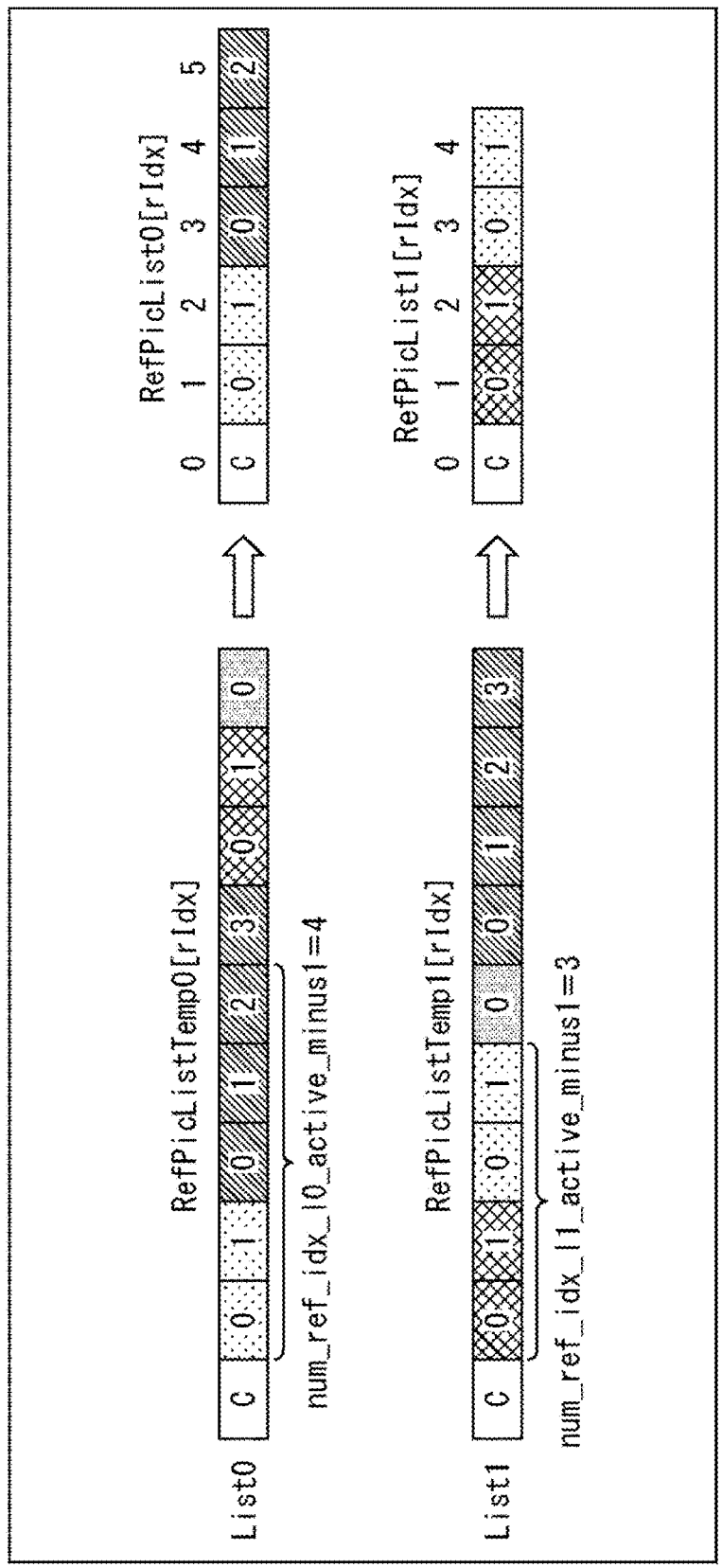
FIG. 30 is a diagram for describing reference picture list creation processing in a third embodiment.

In other words, in the third embodiment, as shown in FIG. 30, after the two temporal lists, i.e., the RefpicListTemp0 list and the RefpicListTemp1 list, are created on the basis of the individual lists of FIG. 10, the picture identifying information of the current picture is registered in the head of each of the temporal lists.

Next, the order of the pieces of the picture identifying information registered in the RefpicListTemp0 list and the RefpicListTemp1 list is changed as needed (Reference reordering). However, the order of the picture identifying information of the current picture is prohibited from being changed.

Lastly, a reference picture list RefpicList0 is created, in which the picture identifying information in the head, and the pieces of the picture identifying information in number (five in the example of FIG. 30) obtained by adding 1 to num_ref_idx_10_active_minus1, which are registered in the RefpicListTemp0 list, are registered in order from the head.

Further, a reference picture list RefpicList1 is created, in which the picture identifying information in the head, and the pieces of the picture identifying information in number (four in the example of FIG. 30) obtained by adding 1 to num_ref_idx_11_active_minus1, which are registered in the RefpicListTemp1 list, are registered in order from the head.

Configurations of an encoding apparatus and a decoding apparatus in the third embodiment are similar to those of the encoding apparatus 50 of FIG. 13 and the decoding apparatus 110 of FIG. 20, except for the reference picture list creation processing performed in the list creation section 88 and the list creation section 146. Therefore, hereinafter, the sections of the encoding apparatus 50 of FIG. 13 and the decoding apparatus 110 of FIG. 20 will be used as the sections of the encoding apparatus and the decoding apparatus in the third embodiment, and only the reference picture list creation processing will be described.

(Description on Processing of Encoding Apparatus)

Figure 31:
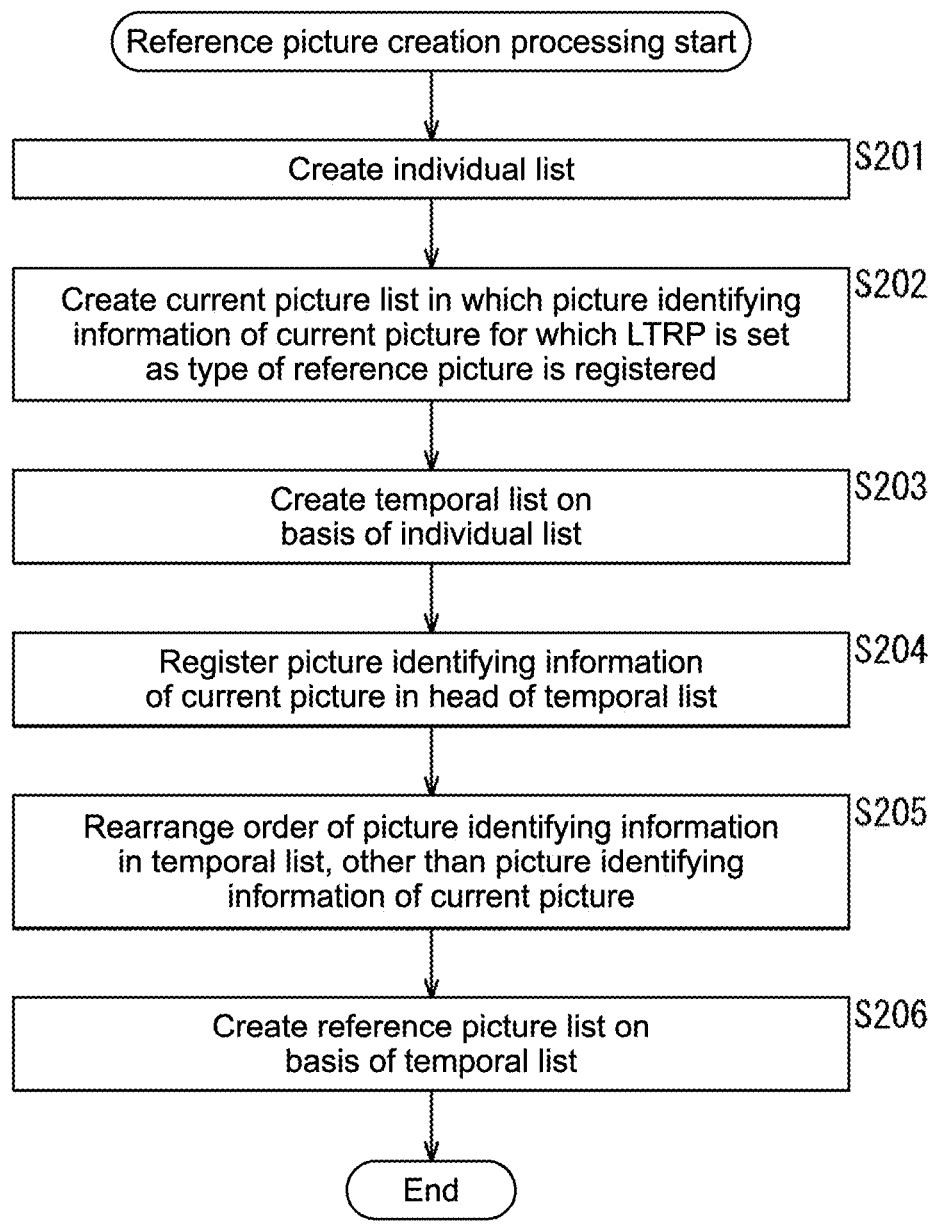
FIG. 31 is a flowchart for describing details of the reference picture list creation processing in the third embodiment.

FIG. 31 is a flowchart for describing the reference picture list creation processing of the list creation section 88 of the encoding apparatus 50 in the third embodiment.

Processing in Steps S201 to S203 of FIG. 31 are similar to the processing in Steps S71 to S73 of FIG. 18, and description thereof will thus be omitted.

In Step S204, the list creation section 88 registers the picture identifying information of the current picture, which is registered in the current picture list, in the head of the temporal list.

In Step S205, the list creation section 88 rearranges the order of the pieces of picture identifying information in the temporal lists, other than the picture identifying information of the current picture, on the basis of ref_pic_list_modification that is disposed in the slice header.

In Step S206, the list creation section 88 creates a reference picture list on the basis of each of the temporal lists. In other words, the list creation section 88 creates a reference picture list in which the picture identifying information in the head, and the pieces of the picture identifying information in number obtained by adding 1 to num_ref_idx_10_active_minus1 (num_ref_idx_11_active_minus1) disposed in the slice header, which are registered in the temporal list, are registered in order from the head.

It should be noted that, although not shown in the figures, the reference picture list creation processing of the list creation section 146 of the decoding apparatus 110 in the third embodiment is also performed similarly to the reference picture list creation processing of FIG. 31.

Fourth Embodiment (Description on Computer to which Present Disclosure is Applied)

The series of processing described above can be executed by hardware or software. In the case where the series of processing is executed by software, a program configuring the software is installed in a computer. Here, the computer includes a computer incorporated in dedicated hardware and, for example, a general-purpose personal computer that can execute various functions by installing various programs therein.

Figure 32:
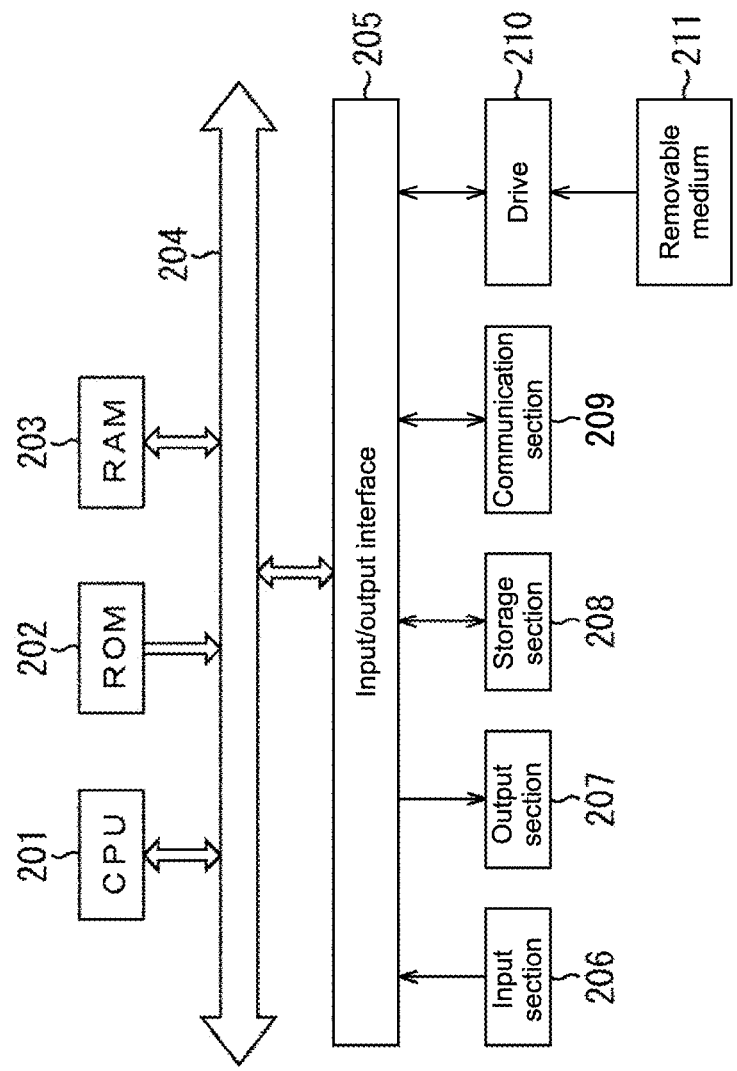
FIG. 32 is a block diagram showing a configuration example of computer hardware.

FIG. 32 is a block diagram showing a hardware configuration example of a computer that executes the series of processing described above by a program.

In the computer, a CPU (Central Processing Unit) 201, a ROM (Read Only Memory) 202, and a RAM (Random Access Memory) 203 are connected to one another via a bus 204.

Moreover, an input/output interface 205 is connected to the bus 204. An input section 206, an output section 207, a storage section 208, a communication section 209, and a drive 210 are connected to the input/output interface 205.

The input section 206 is constituted of a keyboard, a mouse, a microphone, and the like. The output section 207 is constituted of a display, a speaker, and the like. The storage section 208 is constituted of a hard disk, a nonvolatile memory, and the like. The communication section 209 is constituted of a network interface and the like. The drive 210 drives a removable medium 211 such as a magnetic disk, an optical disc, a magneto-optical disk, or a semiconductor memory.

In the computer configured as described above, the CPU 201 loads the program stored in, for example, the storage section 208 to the RAM 203 via the input/output interface 205 and the bus 204 and executes the program, to perform the series of processing described above.

The program executed by the computer (CPU 201) can be provided by, for example, being recorded on the removable medium 211 as a package medium or the like. Further, the program can be provided via a wired or wireless transmission medium such as a local area network, the Internet, and digital satellite broadcasting.

In the computer, when the removable medium 211 is mounted to the drive 210, the program can be installed in the storage section 208 via the input/output interface 205. Further, the program can be received by the communication section 209 via the wired or wireless transmission medium and installed in the storage section 208. In addition, the program can be previously installed in the ROM 202 or the storage section 208.

It should be noted that the program executed by the computer may be a program that is processed chronologically along the described order in this specification or may be a program that is processed in parallel or at a necessary timing such as when an invocation is performed.

Fifth Embodiment (Configuration Example of Television Apparatus)

Figure 33:
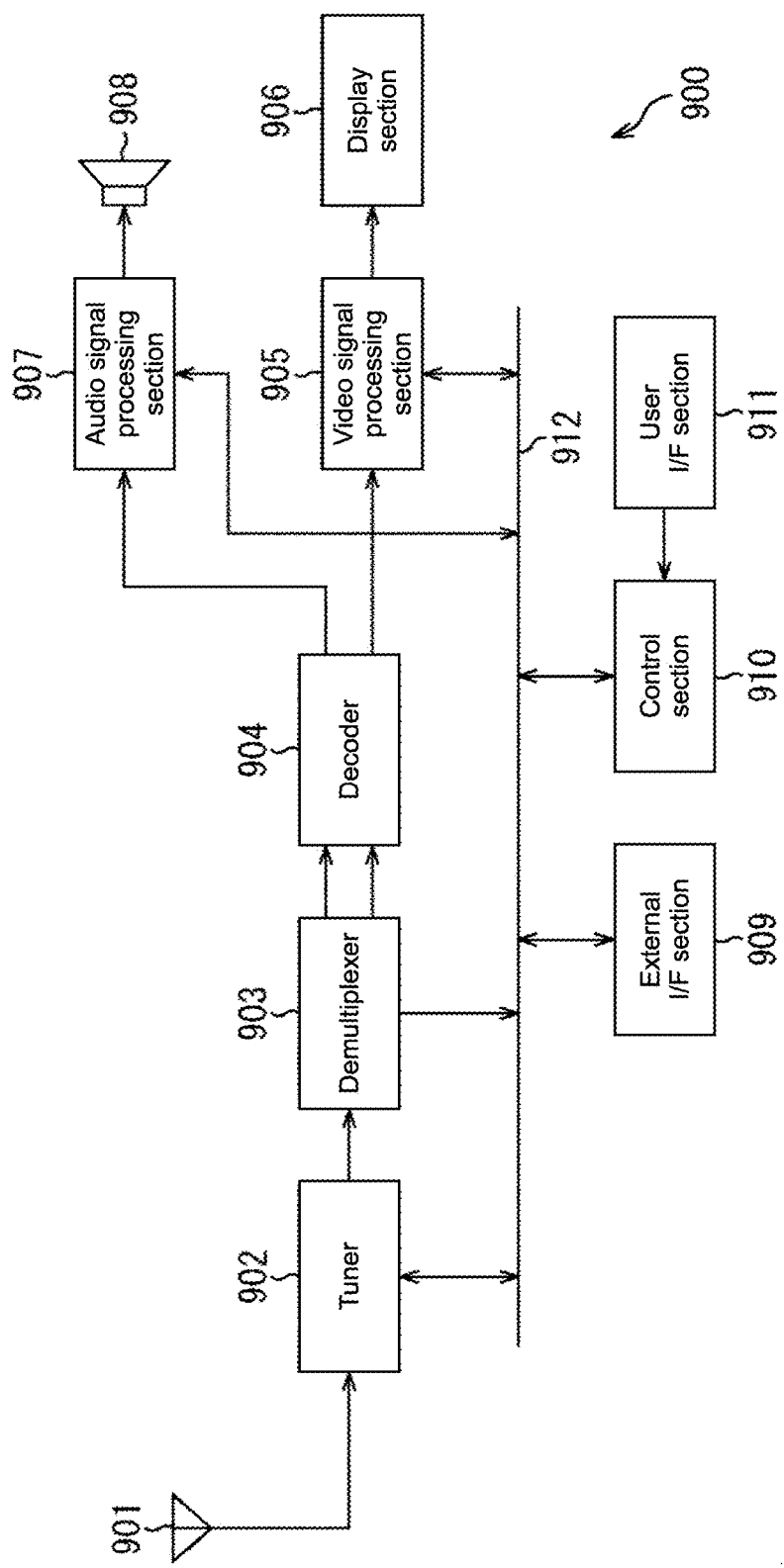
FIG. 33 is a diagram showing a schematic configuration example of a television apparatus to which the present disclosure is applied.

FIG. 33 exemplifies a schematic configuration of a television apparatus to which the present disclosure is applied. A television apparatus 900 includes an antenna 901, a tuner 902, a demultiplexer 903, a decoder 904, a video signal processing section 905, a display section 906, an audio signal processing section 907, a speaker 908, and an external interface section 909. Moreover, the television apparatus 900 includes a control section 910, a user interface section 911, and the like.

The tuner 902 selects a desired channel from broadcast wave signals received by the antenna 901 for demodulation, and outputs an encoded bit stream obtained to the demultiplexer 903.

The demultiplexer 903 extracts a video or audio packet of a program to be viewed from the encoded bit stream and outputs data of the extracted packet to the decoder 904. Further, the demultiplexer 903 supplies a packet of data such as EPG (Electronic Program Guide) to the control section 910. It should be noted that in the case where scramble is performed, the scramble is released by the demultiplexer or the like.

The decoder 904 performs packet decoding processing and outputs video data generated by the decoding processing to the video signal processing section 905 and audio data generated by the decoding processing to the audio signal processing section 907.

The video signal processing section 905 performs noise removal, video processing corresponding to user setting, or the like on the video data. The video signal processing section 905 generates video data of a program to be displayed on the display section 906, image data processed on the basis of an application supplied via a network, and the like. Further, the video signal processing section 905 generates video data for displaying a menu screen to select items etc. and superimposes such video data on the video data of the program. The video signal processing section 905 generates a drive signal on the basis of the video data thus generated and drives the display section 906.

The display section 906 drives a display device (for example, liquid crystal display element) on the basis of the drive signal from the video signal processing section 905, to display a video of the program or the like.

The audio signal processing section 907 performs predetermined processing such as noise removal on the audio data, performs D/A conversion processing or amplification processing on the processed audio data, and supplies such audio data to the speaker 908, to perform audio output.

The external interface section 909 is an interface for connection with an external device or a network, and sends and receives data such as the video data and the audio data.

The user interface section 911 is connected to the control section 910. The user interface section 911 is constituted of an operation switch, a remote control signal reception section, and the like and supplies an operation signal corresponding to a user operation to the control section 910.

The control section 910 is constituted of a CPU (Central Processing Unit), a memory, and the like. The memory stores programs executed by the CPU, various types of data necessary for the CPU to perform processing, EPG data, data acquired via the network, and the like. The programs stored in the memory are read and executed by the CPU at a predetermined timing such as activation of the television apparatus 900. The CPU executes the programs to control the sections such that the television apparatus 900 operates according to the user operation.

It should be noted that in the television apparatus 900, a bus 912 is provided to connect the tuner 902, the demultiplexer 903, the video signal processing section 905, the audio signal processing section 907, the external interface section 909, and the like to the control section 910.

In the television apparatus thus configured, the decoder 904 is provided with a function of the decoding apparatus (decoding method) of the subject application. This makes it possible to decode an encoded stream having improved coding efficiency at the time when a prediction using a correlation within a screen is performed.

Sixth Embodiment (Configuration Example of Mobile Phone)

Figure 34:
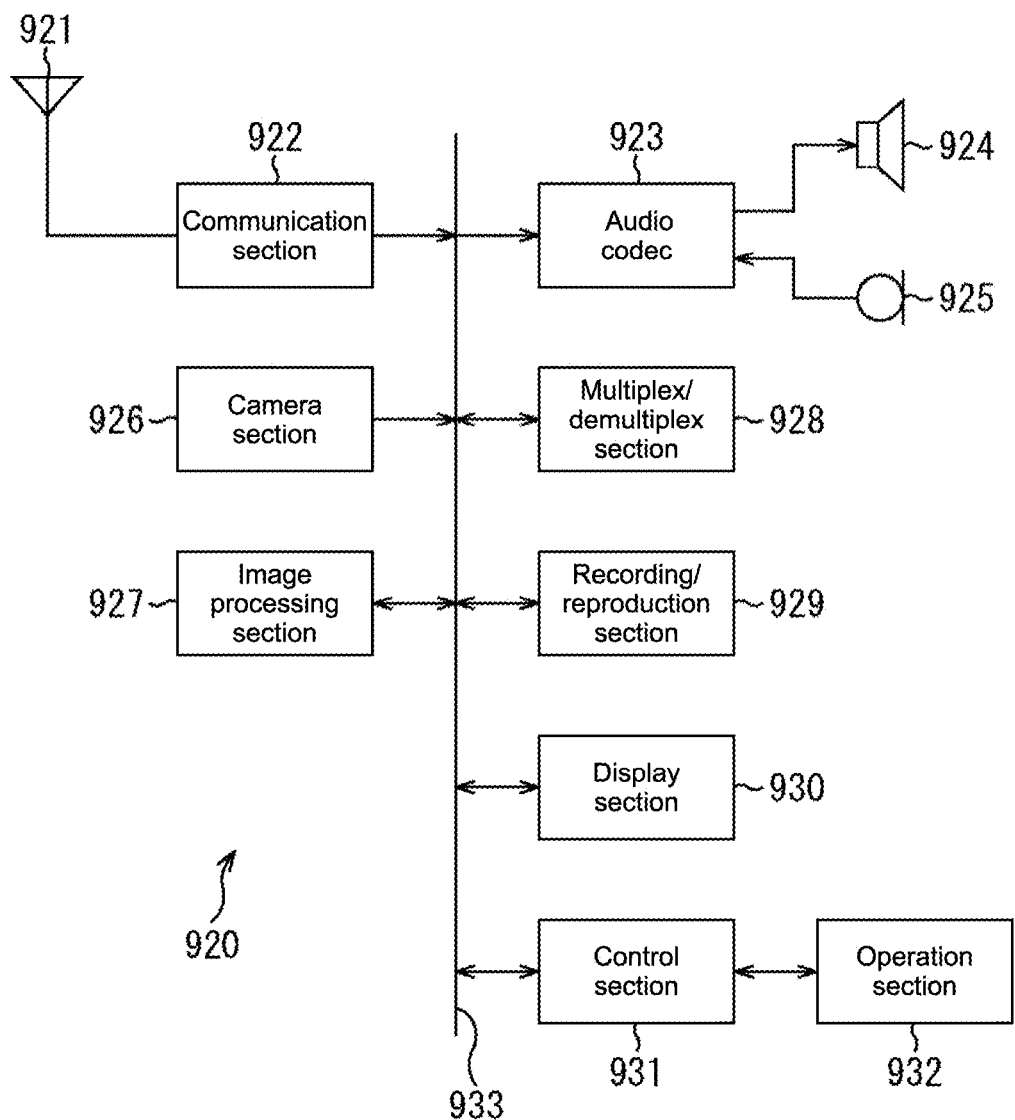
FIG. 34 is a diagram showing a schematic configuration example of a mobile phone to which the present disclosure is applied.

FIG. 34 exemplifies a schematic configuration of a mobile phone to which the present disclosure is applied. A mobile phone 920 includes a communication section 922, an audio codec 923, a camera section 926, an image processing section 927, a multiplex/demultiplex section 928, a recording/reproduction section 929, a display section 930, and a control section 931. Those components are connected to one another via a bus 933.

Further, an antenna 921 is connected to the communication section 922, and a speaker 924 and a microphone 925 are connected to the audio codec 923. Furthermore, an operation section 932 is connected to the control section 931.

The mobile phone 920 performs various operations such as sending and reception of audio signals, sending and reception of e-mail or image data, imaging, and data recording, in various modes such as a voice communication mode and a data communication mode.

In the voice communication mode, an audio signal generated in the microphone 925 is subjected to conversion into audio data or data compression in the audio codec 923 and then supplied to the communication section 922. The communication section 922 performs modulation processing, frequency conversion processing, or the like on the audio data to generate a sending signal. Further, the communication section 922 supplies the sending signal to the antenna 921 to be sent to a base station not shown in the figure. Further, the communication section 922 performs amplification, frequency conversion processing, demodulation processing, or the like on a received signal received in the antenna 921 and supplies obtained audio data to the audio codec 923. The audio codec 923 performs data decompression of the audio data or conversion into an analog audio signal, and outputs the resultant signal to the speaker 924.

Further, in the case where mail is sent in the data communication mode, the control section 931 receives character data input by an operation of the operation section 932 and displays the input characters on the display section 930. Further, the control section 931 generates mail data on the basis of a user instruction or the like in the operation section 932 and supplies the mail data to the communication section 922. The communication section 922 performs modulation processing, frequency conversion processing, or the like on the mail data and sends an obtained sending signal from the antenna 921. Further, the communication section 922 performs amplification, frequency conversion processing, demodulation processing, or the like on a received signal received in the antenna 921, to restore mail data. The mail data is supplied to the display section 930 to display mail content.

It should be noted that the mobile phone 920 also enables the recording/reproduction section 929 to store the received mail data in a storage medium. The storage medium is an arbitrary rewritable storage medium. For example, the storage medium is a semiconductor memory such as a RAM and a built-in flash memory, a hard disk, or a removable medium such as a magnetic disk, a magneto-optical disk, an optical disc, a USB (Universal Serial Bus) memory, and a memory card.

In the case where image data is sent in the data communication mode, image data generated in the camera section 926 is supplied to the image processing section 927. The image processing section 927 performs encoding processing on the image data and generates encoded data.

The multiplex/demultiplex section 928 multiplexes the encoded data generated in the image processing section 927 and audio data supplied from the audio codec 923 by a predetermined system and supplies the resultant data to the communication section 922. The communication section 922 performs modulation processing, frequency conversion processing, or the like on the multiplexed data and sends an obtained sending signal from the antenna 921. Further, the communication section 922 performs amplification, frequency conversion processing, demodulation processing, or the like on a received signal received in the antenna 921, to restore the multiplexed data. The multiplexed data is supplied to the multiplex/demultiplex section 928. The multiplex/demultiplex section 928 demultiplexes the multiplexed data and supplies encoded data to the image processing section 927 and audio data to the audio codec 923. The image processing section 927 performs decoding processing on the encoded data to generate image data. The image data is supplied to the display section 930 to display a received image. The audio codec 923 converts the audio data into an analog audio signal and supplies the analog audio signal to the speaker 924, to output a received audio.

In the mobile phone device thus configured, the image processing section 927 is provided with a function of the encoding apparatus and the decoding apparatus (encoding method and decoding method) of the subject application. This makes it possible to improve coding efficiency at the time when a prediction using a correlation within a screen is performed. Further, it is possible to decode an encoded stream having improved coding efficiency at the time when a prediction using a correlation within a screen is performed.

Seventh Embodiment (Configuration Example of Recording/Reproduction Apparatus)

Figure 35:
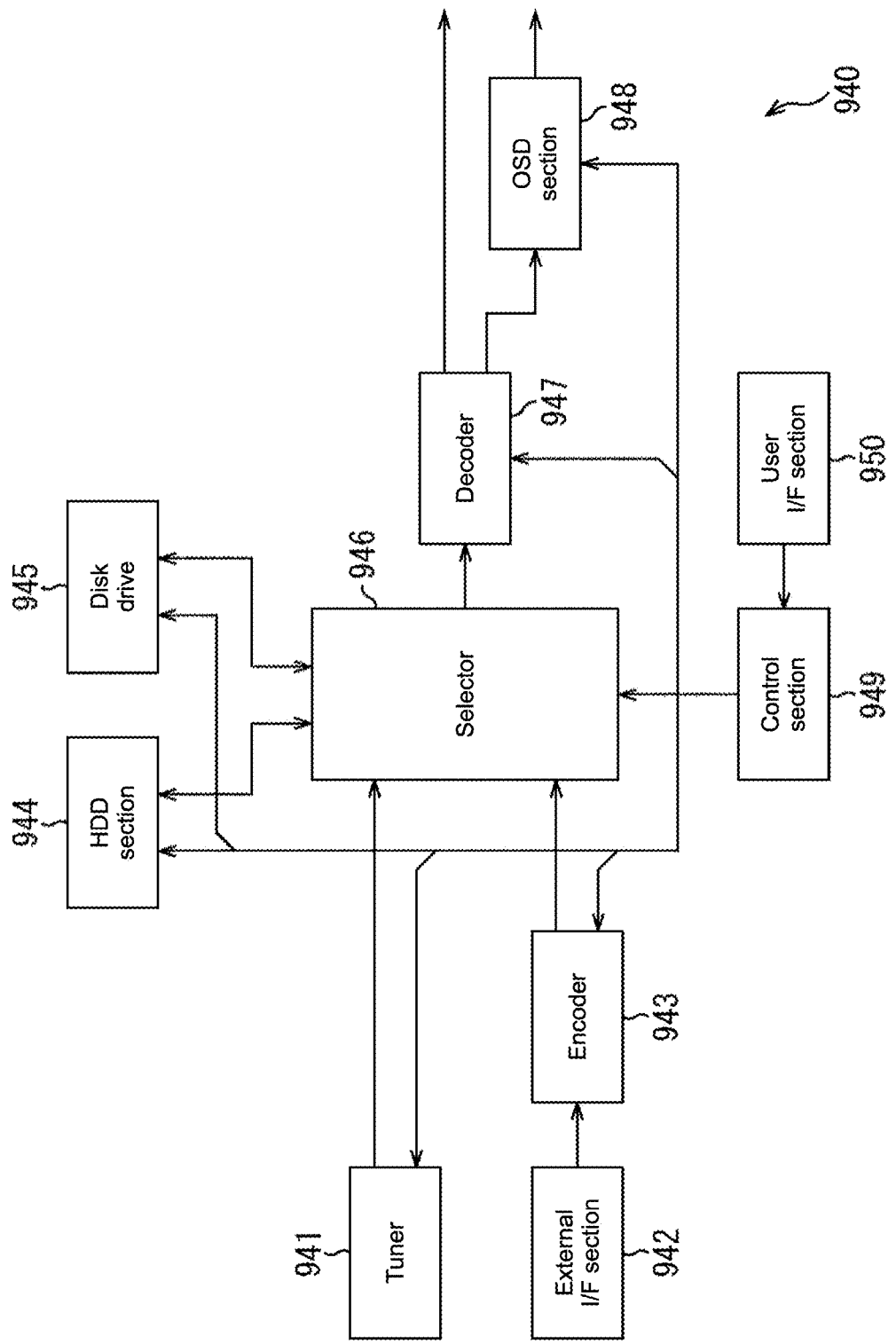
FIG. 35 is a diagram showing a schematic configuration example of a recording/reproduction apparatus to which the present disclosure is applied.

FIG. 35 exemplifies a schematic configuration of a recording/reproduction apparatus to which the present disclosure is applied. A recording/reproduction apparatus 940 records, for example, audio data and video data of a received broadcast program on a recording medium and provides the recorded data to a user at a timing corresponding to a user instruction. Further, the recording/reproduction apparatus 940 can also acquire, for example, audio data and video data from another apparatus and record those pieces of data on a recording medium. Moreover, the recording/reproduction apparatus 940 decodes and outputs the audio data and video data recorded on the recording medium, to enable a monitoring apparatus or the like to perform image display or audio output.

The recording/reproduction apparatus 940 includes a tuner 941, an external interface section 942, an encoder 943, an HDD (Hard Disk Drive) section 944, a disk drive 945, a selector 946, a decoder 947, an OSD (On-Screen Display) section 948, a control section 949, and a user interface section 950.

The tuner 941 selects a desired channel from broadcast wave signals received by an antenna not shown in the figure. The tuner 941 outputs an encoded bit stream, which is obtained by demodulation of a received signal of the desired channel, to the selector 946.

The external interface section 942 is constituted of at least any one of an IEEE1394 interface, a network interface section, a USB interface, a flash memory interface, and the like. The external interface section 942 is an interface for connection with an external device, a network, a memory card, and the like and receives data such as video data or audio data to be recorded.

When the video data or audio data supplied from the external interface section 942 is not encoded, the encoder 943 performs encoding by a predetermined system and outputs an encoded bit stream to the selector 946.

The HDD section 944 records content data such as video and audio, various programs, and other data in a built-in hard disk and reads those pieces of data from the hard disk at the time of reproduction or the like.

The disk drive 945 records and reproduces a signal with respect to a mounted optical disc. The optical disc is, for example, a DVD disc (DVD-Video, DVD-RAM, DVD-R, DVD-RW, DVD+R, DVD+RW, etc.) or a Blu-ray (registered trademark) disc.

At the time of recording of video or audio, the selector 946 selects any encoded bit stream from the tuner 941 or the encoder 943 and supplies the encoded bit stream to any of the HDD section 944 and the disk drive 945. Further, at the time of reproduction of video or audio, the selector 946 supplies an encoded bit stream output from the HDD section 944 or the disk drive 945 to the decoder 947.

The decoder 947 performs decoding processing on the encoded bit stream. The decoder 947 supplies video data generated by the decoding processing to the OSD section 948. Further, the decoder 947 outputs audio data generated by the decoding processing.

The OSD section 948 generates video data for displaying a menu screen to select items etc. and superimposes such video data on the video data output from the decoder 947 to be output.

The user interface section 950 is connected to the control section 949. The user interface section 950 is constituted of an operation switch, a remote control signal reception section, and the like and supplies an operation signal corresponding to a user operation to the control section 949.

The control section 949 is constituted of a CPU, a memory, and the like. The memory stores programs executed by the CPU and various types of data necessary for the CPU to perform processing. The programs stored in the memory are read and executed by the CPU at a predetermined timing such as activation of the recording/reproduction apparatus 940. The CPU executes the programs to control the sections such that the recording/reproduction apparatus 940 operates according to the user operation.

In the recording/reproduction apparatus thus configured, the encoder 943 is provided with a function of the encoding apparatus (encoding method) of the subject application, and the decoder 947 is provided with a function of the decoding apparatus (decoding method) of the subject application. This makes it possible to improve coding efficiency at the time when a prediction using a correlation within a screen is performed. Further, it is possible to decode an encoded stream having improved coding efficiency at the time when a prediction using a correlation within a screen is performed.

Eighth Embodiment (Configuration Example of Imaging Apparatus)

Figure 36:
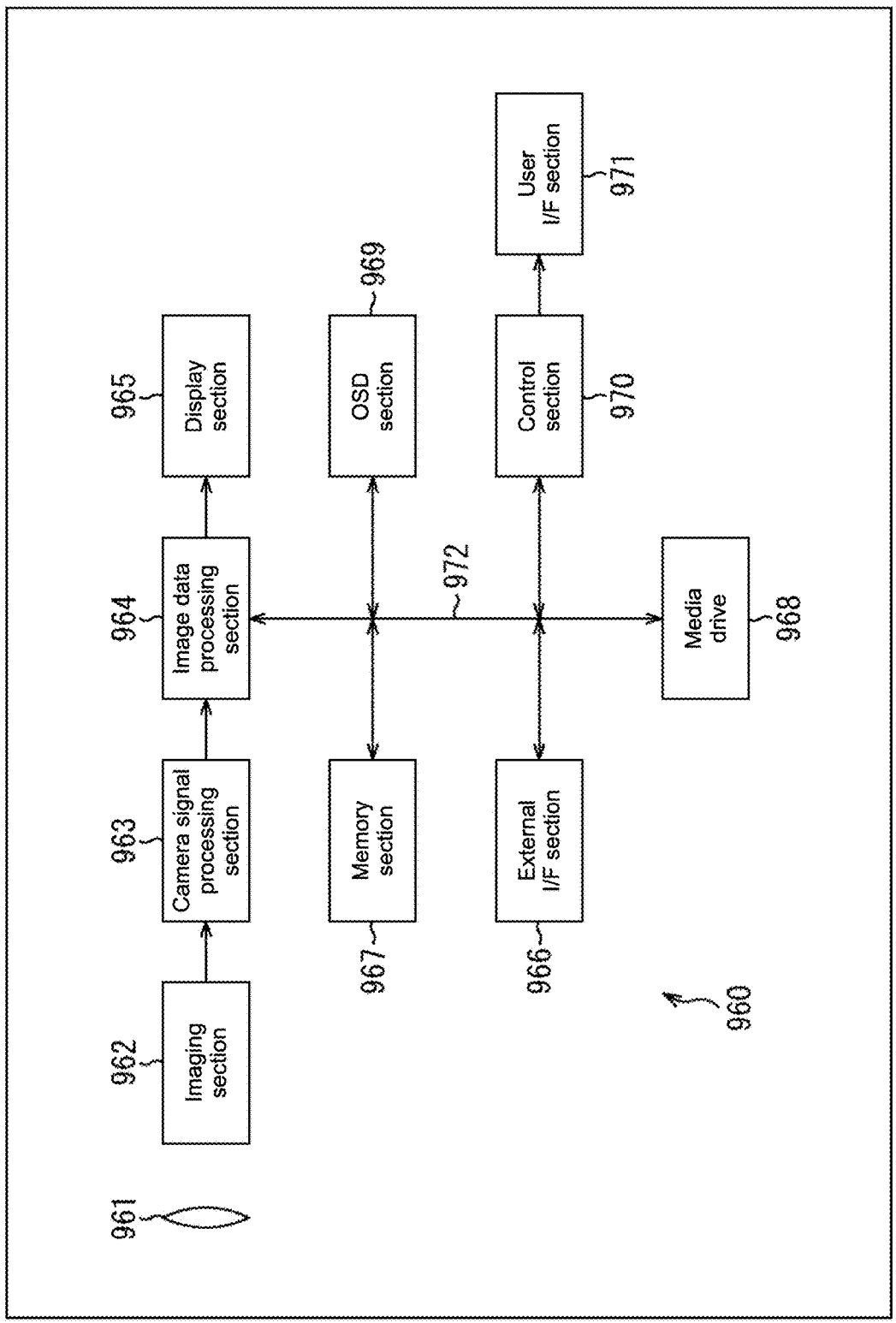
FIG. 36 is a diagram showing a schematic configuration example of an imaging apparatus to which the present disclosure is applied.

FIG. 36 exemplifies a schematic configuration of an imaging apparatus to which the present disclosure is applied. An imaging apparatus 960 images a subject and then displays an image of the subject on a display section or records such image data on a recording medium.

The imaging apparatus 960 includes an optical block 961, an imaging section 962, a camera signal processing section 963, an image data processing section 964, a display section 965, an external interface section 966, a memory section 967, a media drive 968, an OSD section 969, and a control section 970. Further, a user interface section 971 is connected to the control section 970. Moreover, the image data processing section 964, the external interface section 966, the memory section 967, the media drive 968, the OSD section 969, the control section 970, and the like are connected to one another via a bus 972.

The optical block 961 is constituted of a focus lens, a diaphragm mechanism, and the like. The optical block 961 forms an optical image of the subject on an imaging surface of the imaging section 962. The imaging section 962 is constituted of a CCD or CMOS image sensor, and generates an electrical signal corresponding to the optical image by opto-electronic conversion and supplies the electrical signal to the camera signal processing section 963.

The camera signal processing section 963 performs various types of camera signal processing, such as knee correction, gamma correction, and color correction, on the electrical signal supplied from the imaging section 962. The camera signal processing section 963 supplies image data after subjected to the camera signal processing to the image data processing section 964.

The image data processing section 964 performs encoding processing on the image data supplied from the camera signal processing section 963. The image data processing section 964 supplies encoded data generated by the encoding processing to the external interface section 966 or the media drive 968. Further, the image data processing section 964 performs decoding processing on encoded data supplied from the external interface section 966 or the media drive 968. The image data processing section 964 supplies image data generated by the decoding processing to the display section 965. Further, the image data processing section 964 performs processing of supplying the image data, which is supplied from the camera signal processing section 963, to the display section 965, or superimposes display data acquired from the OSD section 969 on the image data and supplies such display data to the display section 965.

The OSD section 969 generates display data of a menu screen constituted of symbols, characters, and graphics, icons, and the like and outputs the display data to the image data processing section 964.

The external interface section 966 is constituted of, for example, a USB input and output terminal and is connected to a printer in the case where an image is printed. Further, a drive is connected to the external interface section 966 as needed, and a removable medium such as a magnetic disk and an optical disc is appropriately mounted so as to install a computer program read therefrom as needed. Moreover, the external interface section 966 includes a network interface connected to a predetermined network such as a LAN (local area network) and the Internet. The control section 970 can read the encoded data from the media drive 968, for example, according to an instruction from the user interface section 971, and can supply the encoded data from the external interface section 966 to another apparatus connected via a network. Further, the control section 970 can acquire, via the external interface section 966, encoded data or image data supplied from another apparatus via a network, and can supply the data to the image data processing section 964.

As a recording medium driven by the media drive 968, for example, an arbitrary readable and writable removable medium such as a magnetic disk, a magneto-optical disk, an optical disc, and a semiconductor memory is used. Further, the recording medium may be of an arbitrary type as a removable medium, and may be a tape device, a disc, or a memory card. As a matter of course, the recording medium may be a non-contact IC (Integrated Circuit) card or the like.

Further, the media drive 968 and the recording medium may be integrated and constituted of a non-transportable storage medium such as a built-in hard disk drive and an SSD (Solid State Drive).

The control section 970 is constituted of a CPU. The memory section 967 stores programs executed by the control section 970, various types of data necessary for the control section 970 to perform processing, and the like. The programs stored in the memory section 967 are read and executed by the control section 970 at a predetermined timing such as activation of the imaging apparatus 960. The control section 970 executes the programs to control the sections such that the imaging apparatus 960 operates according to a user operation.

In the imaging apparatus thus configured, the image data processing section 964 is provided with a function of the encoding apparatus and the decoding apparatus (encoding method and decoding method) of the subject application. This makes it possible to improve coding efficiency at the time when a prediction using a correlation within a screen is performed. Further, it is possible to decode an encoded stream having improved coding efficiency at the time when a prediction using a correlation within a screen is performed.

Ninth Embodiment

Other Examples of Embodiment

The examples of the apparatuses, the systems, and the like to which the present disclosure is applied have been described hereinabove, but the present disclosure is not limited thereto and can be carried out as any other configurations to be mounted to an apparatus constituting the apparatuses or systems as described above, for example, a processor as a system LSI (Large Scale Integration) or the like, a module using a plurality of processors or the like, a unit using a plurality of modules or the like, a set obtained by further adding another function to the unit, or the like (i.e., configuration of a part of an apparatus).
(Configuration Example of Video Set)

An example of the case where the present disclosure is carried out as a set will be described with reference to FIG. 37. FIG. 37 shows an example of a schematic configuration of a video set to which the present disclosure is applied.

Multi-functionality of electronic apparatuses has been advanced in recent years, and in the case where a part of a configuration thereof is carried out by selling, provision, or the like in the development and manufacturing thereof, there have been frequently found not only a case where the part is carried out as a configuration having one function but also a case where the part is carried out as one set having a plurality of functions by combining a plurality of configurations having associated functions.

A video set 1300 shown in FIG. 37 has such a multi-functionalized configuration and is a combination of a device having a function on image encoding and decoding (any one or both of them) with a device having another function associated with that function.

As shown in FIG. 37, the video set 1300 includes a module group including a video module 1311, an external memory 1312, a power management module 1313, a front end module 1314, and the like, and devices having associated functions, such as a connectivity 1321, a camera 1322, and a sensor 1323.

The module is assumed as a component in which several component-wise functions associated with one another are collected to have a cohesive function. A specific physical configuration is arbitrary, but the configuration is assumed to be, for example, one obtained by disposing a plurality of processors having respective functions, electronic circuit elements such as a resistor and a capacitor, other devices, and the like on a wiring substrate or the like for integration. Further, it is also conceived that the module may be combined with another module, a processor, and the like, to be a new module.

In the case of the example of FIG. 37, the video module 1311 is a combination of configurations having functions on image processing and includes an application processor, a video processor, a broadband modem 1333, and an RF (Radio Frequency) module 1334.

The processor is one in which a configuration having a predetermined function is integrated in a semiconductor chip by an SoC (System On a Chip) and may be called, for example, a system LSI (Large Scale Integration). Such a configuration having a predetermined function may be a logic circuit (hardware configuration), a CPU, a ROM, a RAM, or the like, and a program (software configuration) executed by using those above, or may be a combination of both the configurations. For example, the processor may include a logic circuit, a CPU, a ROM, a RAM, and the like and may achieve a part of the functions by the logic circuit (hardware configuration) and the other functions by the program (software configuration) executed by the CPU.

The application processor 1331 of FIG. 37 is a processor that executes an application on image processing. The application executed by the application processor 1331 can not only perform computing processing but also control configurations inside and outside the video module 1311, e.g., the video processor 1332, as needed in order to achieve a predetermined function.

The video processor 1332 is a processor having a function on image encoding/decoding (one or both of them).

The broadband modem 1333 is a processor (or module) that performs processing on wired or wireless (or both of them) broadband communication performed via broadband connections such as the Internet and a public telephone network. For example, the broadband modem 1333 performs, for example, digital modulation on data to be sent (digital signal) for conversion into an analog signal or demodulates a received analog signal for conversion into data (digital signal). For example, the broadband modem 1333 can perform digital modulation/demodulation on arbitrary information such as image data processed by the video processor 1332, a stream in which image data is encoded, an application program, and setting data.

The RF module 1334 is a module that performs frequency conversion, modulation and demodulation, amplification, filter processing, or the like on an RF (Radio Frequency) signal that is sent and received via an antenna. For example, the RF module 1334 performs frequency conversion or the like on a baseband signal generated by the broadband modem 1333 and generates an RF signal. Further, for example, the RF module 1334 performs frequency conversion or the like on an RF signal received via the front end module 1314 and generates a baseband signal.

It should be noted that, as indicated by a dotted line 1341 in FIG. 37, the application processor 1331 and the video processor 1332 may be integrated and configured as one processor.

The external memory 1312 is a module that is provided outside the video module 1311 and includes a storage device used by the video module 1311. The storage device of the external memory 1312 may be achieved by any physical configuration. In general, since the storage device is frequently used for storing a large amount of data such as image data in units of frame, the storage device may be desirably achieved by, for example, a semiconductor memory that is relatively inexpensiveness and has a large capacity, such as a DRAM (Dynamic Random Access Memory). The power management module 1313 manages and controls power supply to the video module 1311 (configurations within the video module 1311).

The front end module 1314 is a module that provides a front end function (a circuit at a sending and reception end on the antenna side) to the RF module 1334. As shown in FIG. 37, the front end module 1314 includes, for example, an antenna section 1351, a filter 1352, and an amplification section 1353.

The antenna section 1351 includes an antenna that sends and receives a radio signal, and peripheral configurations thereof. The antenna section 1351 sends a signal supplied from the amplification section 1353 as a radio signal, and supplies a received radio signal to the filter 1352 as an electrical signal (RF signal). The filter 1352 performs filter processing or the like on the RF signal received via the antenna section 1351 and supplies the processed RF signal to the RF module 1334. The amplification section 1353 amplifies the RF signal supplied from the RF module 1334 and supplies the resultant signal to the antenna section 1351.

The connectivity 1321 is a module having a function on external connection. A physical configuration of the connectivity 1321 is arbitrary. For example, the connectivity 1321 includes a configuration having a communication function other than communication standards corresponding to the broadband modem 1333, an external input/output terminal, and the like.

For example, the connectivity 1321 may include a module having a communication function according to wireless communication standards such as Bluetooth (registered trademark), IEEE 802.11 (for example, Wi-Fi (Wireless Fidelity, registered trademark)), NFC (Near Field Communication), and IrDA (InfraRed Data Association), an antenna that sends and receives a signal according to such standards, and the like. Further, for example, the connectivity 1321 may include a module having a communication function according to wired communication standards such as USB (Universal Serial Bus) and HDMI (registered trademark) (High-Definition Multimedia Interface), and a terminal according to such standards. Moreover, for example, the connectivity 1321 may have another data (signal) transmission function or the like, such as an analog input/output terminal.

It should be noted that the connectivity 1321 may include a device as a data (signal) transmission destination. For example, the connectivity 1321 may include a drive (including not only a drive of a removable medium but also a hard disk, an SSD (Solid State Drive), a NAS (Network Attached Storage), and the like) that reads and writes data on a recording medium such as a magnetic disk, an optical disc, a magneto-optical disk, and a semiconductor memory. Further, the connectivity 1321 may include an image or audio output device (monitor, speaker, or the like).

The camera 1322 is a module having a function of imaging a subject and acquiring image data of the subject. The image data acquired by imaging of the camera 1322 is, for example, supplied to the video processor 1332 and encoded.

The sensor 1323 is a module having an arbitrary sensor function, e.g., an audio sensor, an ultrasonic sensor, an optical sensor, an illuminance sensor, an infrared sensor, an image sensor, a rotation sensor, an angular sensor, an angular velocity sensor, a velocity sensor, an acceleration sensor, an inclination sensor, a magnetic identification sensor, a shock sensor, and a temperature sensor. Data detected by the sensor 1323 is, for example, supplied to the application processor 1331 and used by an application or the like.

The configuration described above as a module may be achieved as a processor and, conversely, the configuration described as a processor may be achieved as a module.

In the video set 1300 configured as described above, the present disclosure can be applied to the video processor 1332 as will be described later. Therefore, the video set 1300 can be carried out as a set to which the present disclosure is applied.

(Configuration Example of Video Processor)

FIG. 38 shows an example of a schematic configuration of the video processor 1332 (FIG. 37) to which the present disclosure is applied.

In the case of the example of FIG. 38, the video processor 1332 has a function of receiving input of a video signal and an audio signal and encoding those signals by a predetermined system and a function of decoding the encoded video data and audio data and reproducing and outputting the video signal and the audio signal.

As shown in FIG. 38, the video processor 1332 includes a video input processing section 1401, a first image zooming section 1402, a second image zooming section 1403, a video output processing section 1404, a frame memory 1405, and a memory control section 1406. Further, the video processor 1332 includes an encoding/decoding engine 1407, video ES (Elementary Stream) buffers 1408A and 1408B, and audio ES buffers 1409A and 1409B. Moreover, the video processor 1332 includes an audio encoder 1410, an audio decoder 1411, a multiplexing section (MUX (Multiplexer)) 1412, a demultiplexing section (DMUX (Demultiplexer)) 1413, and a stream buffer 1414.

The video input processing section 1401 acquires a video signal input from, e.g., the connectivity 1321 (FIG. 37), and converts the video signal into digital image data. The first image zooming section 1402 performs format conversion, image zooming processing, or the like on the image data. The second image zooming section 1403 performs image zooming processing on the image data in accordance with a format of a destination for output via the video output processing section 1404 or perform format conversion, image zooming processing, or the like similar to the first image zooming section 1402 on the image data. The video output processing section 1404 performs format conversion, conversion into an analog signal, or the like on the image data and outputs the data, as a reproduced video signal, to the connectivity 1321 (FIG. 37), for example.

The frame memory 1405 is a memory for image data shared with the video input processing section 1401, the first image zooming section 1402, the second image zooming section 1403, the video output processing section 1404, and the encoding/decoding engine 1407. The frame memory 1405 is achieved as a semiconductor memory, e.g., a DRAM.

In response to a synchronization signal from the encoding/decoding engine 1407, the memory control section 1406 controls access for write and read with respect to the frame memory 1405 according to a schedule of access to the frame memory 1405, which is written in an access management table 1406A. The access management table 1406A is updated by the memory control section 1406 in accordance with processing executed in the encoding/decoding engine 1407, the first image zooming section 1402, the second image zooming section 1403, and the like.

The encoding/decoding engine 1407 performs encoding processing on image data and decoding processing on a video stream in which the image data is encoded data. For example, the encoding/decoding engine 1407 encodes image data read from the frame memory 1405 and sequentially writes the image data, as a video stream, in the video ES buffer 1408A. Further, for example, the encoding/decoding engine 1407 sequentially reads the video stream from the video ES buffer 1408B for decoding and sequentially writes the decoded video stream, as image data, in the frame memory 1405. In the encoding and decoding, the encoding/decoding engine 1407 uses the frame memory 1405 as a work area. Further, the encoding/decoding engine 1407 outputs a synchronization signal to the memory control section 1406 at a timing of start of processing on a macroblock basis, for example.

The video ES buffer 1408A buffers the video stream generated by the encoding/decoding engine 1407 and supplies the video stream to the multiplexing section (MUX) 1412. The video ES buffer 1408B buffers the video stream supplied from the demultiplexing section (DMUX) 1413 and supplies the video stream to the encoding/decoding engine 1407.

The audio ES buffer 1409A buffers an audio stream generated by the audio encoder 1410 and supplies the audio stream to the multiplexing section (MUX) 1412. The audio ES buffer 1409B buffers the audio stream supplied from the demultiplexing section (DMUX) 1413 and supplies the audio stream to the audio decoder 1411.

The audio encoder 1410 performs, e.g., digital conversion on an audio signal input from, e.g., the connectivity 1321 (FIG. 37) and encodes the resultant signal by a predetermined system such as an MPEG audio system and an AC3 (AudioCode number 3) system. The audio encoder 1410 sequentially writes an audio stream, which is data in which the audio signal is encoded, in the audio ES buffer 1409A. The audio decoder 1411 decodes the audio stream supplied from the audio ES buffer 1409B, performs conversion into an analog signal, for example, and supplies the analog signal, as a reproduced audio signal, to the connectivity 1321 (FIG. 37), for example.

The multiplexing section (MUX) 1412 multiplexes the video stream and the audio stream. The multiplexing method (i.e., the format of a bit stream generated by multiplexing) is arbitrary. Further, at the time of multiplexing, the multiplexing section (MUX) 1412 can also add predetermined header information or the like to the bit stream. In other words, the multiplexing section (MUX) 1412 can convert the format of the stream by the multiplexing. For example, the multiplexing section (MUX) 1412 multiplexes the video stream and the audio stream to convert those streams into a transport stream, which is a bit stream having a format for transfer. Further, for example, the multiplexing section (MUX) 1412 multiplexes the video stream and the audio stream to convert those streams into data (file data) having a file format for recording.

The demultiplexing section (DMUX) 1413 demultiplexes the bit stream, in which the video stream and the audio stream are multiplexed, by a method corresponding to the multiplexing by the multiplexing section (MUX) 1412. In other words, the demultiplexing section (DMUX) 1413 extracts the video stream and the audio stream from the bit stream read from the stream buffer 1414 (separates the video stream and the audio stream from each other). In other words, the demultiplexing section (DMUX) 1413 can convert the format of the stream by the demultiplexing (inverse conversion of the conversion by the multiplexing section (MUX) 1412). For example, the demultiplexing section (DMUX) 1413 can acquire the transport stream supplied from, e.g., the connectivity 1321 or the broadband modem 1333 (each of which is shown in FIG. 37) via the stream buffer 1414 and demultiplex the transport stream, to convert the transport stream into the video stream and the audio stream. Further, for example, the demultiplexing section (DMUX) 1413 can acquire the file data, which is read from various recording media by, e.g., the connectivity 1321 (FIG. 37), via the stream buffer 1414 and demultiplex the file data, to convert the file data into the video stream and the audio stream.

The stream buffer 1414 buffers the bit stream. For example, the stream buffer 1414 buffers the transport stream supplied from the multiplexing section (MUX) 1412 and supplies the transport stream to, e.g., the connectivity 1321 or the broadband modem 1333 (each of which is shown in FIG. 37) at a predetermined timing or on the basis of a request from the outside or the like.

Further, for example, the stream buffer 1414 buffers the file data supplied from the multiplexing section (MUX) 1412, supplies the file data to, e.g., the connectivity 1321 (FIG. 37) at a predetermined timing or on the basis of a request from the outside or the like, and records the file data on various recording media.

Moreover, the stream buffer 1414 buffers the transport stream acquired via, e.g., the connectivity 1321 or the broadband modem 1333 (each of which is shown in FIG. 37) and supplies the transport stream to the demultiplexing section (DMUX) 1413 at a predetermined timing or on the basis of a request from the outside or the like.

Further, the stream buffer 1414 buffers the file data read from various recording media in, e.g., the connectivity 1321 (FIG. 37) and supplies the file data to the demultiplexing section (DMUX) 1413 at a predetermined timing or on the basis of a request from the outside or the like.

Next, an operation example of the video processor 1332 having such a configuration will be described. For example, a video signal that is input to the video processor 1332 from the connectivity 1321 (FIG. 37) or the like is converted into digital image data of a predetermined system such as a 4:2:2Y/Cb/Cr system in the video input processing section 1401, and then sequentially written in the frame memory 1405. The digital image data is read by the first image zooming section 1402 or the second image zooming section 1403, subjected to format conversion into a predetermined system such as a 4:2:0Y/Cb/Cr system and zooming processing, and written in the frame memory 1405 again. The image data is encoded by the encoding/decoding engine 1407 and written as a video stream in the video ES buffer 1408A.

Further, an audio signal that is input from the connectivity 1321 (FIG. 37) or the like to the video processor 1332 is encoded by the audio encoder 1410 and written, as an audio stream, in the audio ES buffer 1409A.

The video stream of the video ES buffer 1408A and the audio stream of the audio ES buffer 1409A are read and multiplexed by the multiplexing section (MUX) 1412, and converted into a transport stream, file data, or the like. The transport stream generated by the multiplexing section (MUX) 1412 is buffered by the stream buffer 1414, and then output to an external network via, e.g., the connectivity 1321 or the broadband modem 1333 (each of which is shown in FIG. 37). Further, the file data generated by the multiplexing section (MUX) 1412 is buffered by the stream buffer 1414, and then output to the connectivity 1321 (FIG. 37) or the like and recorded on various recording media.

Further, the transport stream, which is input from the external network to the video processor 1332 via, e.g., the connectivity 1321 or the broadband modem 1333 (each of which is shown in FIG. 37), is buffered in the stream buffer 1414 and then demultiplexed by the demultiplexing section (DMUX) 1413. Further, the file data, which is read from various recording media in, e.g., the connectivity 1321 (FIG. 37) and input to the video processor 1332, is buffered in the stream buffer 1414 and then demultiplexed by the demultiplexing section (DMUX) 1413. In other words, the transport stream or the file data input to the video processor 1332 is separated to be a video stream and an audio stream by the demultiplexing section (DMUX) 1413.

The audio stream is supplied to the audio decoder 1411 via the audio ES buffer 1409B and decoded, to reproduce an audio signal. Further, the video stream is written in the video ES buffer 1408B, and then sequentially read by the encoding/decoding engine 1407, decoded, and written in the frame memory 1405. The decoded image data is subjected to zooming processing by the second image zooming section 1403 and written in the frame memory 1405. The decoded image data is then read by the video output processing section 1404, subjected to format conversion of a predetermined system such as a 4:2:2Y/Cb/Cr system, and converted into an analog signal, to reproduce and output a video signal.

In the case where the present disclosure is applied to the video processor 1332 configured as described above, the present disclosure according to each of the embodiments described above only needs to be applied to the encoding/decoding engine 1407. In other words, for example, the encoding/decoding engine 1407 only needs to have a function of the encoding apparatus or the decoding apparatus according to the first to third embodiments. This enables the video processor 1332 to obtain an effect similar to that described above with reference to FIGS. 1 to 31.

It should be noted that in the encoding/decoding engine 1407 the present disclosure (i.e., the function of the encoding apparatus or the decoding apparatus according to each of the embodiments described above) may be achieved by hardware such as a logic circuit, may be achieved by software such as an embedded program, or may be achieved by both of them.

(Another Configuration Example of Video Processor)

FIG. 39 shows another example of a schematic configuration of the video processor 1332 (FIG. 37) to which the present disclosure is applied. In the case of the example of FIG. 39, the video processor 1332 has a function of encoding/decoding video data by a predetermined system.

More specifically, as shown in FIG. 39, the video processor 1332 includes a control section 1511, a display interface 1512, a display engine 1513, an image processing engine 1514, and an internal memory 1515. Further, the video processor 1332 includes a codec engine 1516, a memory interface 1517, a multiplexing/demultiplexing section (MUX DMUX) 1518, a network interface 1519, and a video interface 1520.

The control section 1511 controls operations of respective processing sections within the video processor 1332, such as the display interface 1512, the display engine 1513, the image processing engine 1514, and the codec engine 1516.

As shown in FIG. 39, the control section 1511 includes, for example, a main CPU 1531, a sub CPU 1532, and a system controller 1533. The main CPU 1531 executes a program for controlling the operations of the respective processing sections within the video processor 1332, or the like. The main CPU 1531 generates a control signal according to that program or the like and supplies the control signal to the processing sections (i.e., controls the operations of the respective processing sections). The sub CPU 1532 plays an auxiliary role for the main CPU 1531. For example, the sub CPU 1532 executes a child process, a subroutine, or the like of the program executed by the main CPU 1531 or the like. The system controller 1533 controls operations of the main CPU 1531 and the sub CPU 1532, such as specifying a program executed by the main CPU 1531 and the sub CPU 1532.

The display interface 1512 outputs image data to, e.g., the connectivity 1321 (FIG. 37) or the like under the control of the control section 1511. For example, the display interface 1512 converts the image data of digital data into an analog signal and outputs the analog signal as a reproduced video signal or the image data of digital data without change, to a monitoring apparatus of the connectivity 1321 (FIG. 37) or the like.

The display engine 1513 performs, under the control of the control section 1511, various types of conversion processing such as format conversion, size conversion, and color gamut conversion on the image data so as to be matched with hardware specifications of a monitoring apparatus or the like that displays an image of the image data.

The image processing engine 1514 performs predetermined image processing such as filter processing for, for example, image quality improvement, on the image data under the control of the control section 1511.

The internal memory 1515 is a memory that is provided inside the video processor 1332 and shared with the display engine 1513, the image processing engine 1514, and the codec engine 1516. The internal memory 1515 is used for, for example, giving and receiving data between the display engine 1513, the image processing engine 1514, and the codec engine 1516. For example, the internal memory 1515 stores data supplied from the display engine 1513, the image processing engine 1514, or the codec engine 1516 and supplies the data to the display engine 1513, the image processing engine 1514, or the codec engine 1516 as needed (for example, in response to a request). The internal memory 1515 may be achieved by any storage device. In general, since the internal memory 1515 is frequently used for storing a small amount of data such as image data in units of block and parameters, the internal memory 1515 may be desirably achieved by a semiconductor memory that has a relatively (compared with, for example, the external memory 1312) small capacity but has a high speed response, such as an SRAM (Static Random Access Memory).

The codec engine 1516 performs processing on encoding or decoding of the image data. An encoding/decoding system corresponding to the codec engine 1516 is arbitrary, and the number thereof may be one or more than one. For example, the codec engine 1516 may have codec functions of a plurality of encoding/decoding systems and perform encoding of image data or decoding of encoded data by a function selected from the above functions.

In the example shown in FIG. 39, the codec engine 1516 includes, as functional blocks of processing on the codec, for example, an MPEG-2 Video 1541, an AVC/H. 264 1542, an HEVC/H.265 1543, an HEVC/H.265 (Scalable) 1544, an HEVC/H. 265 (Multi-view) 1545, and an MPEG-DASH 1551.

The MPEG-2 Video 1541 is a functional block for encoding and decoding the image data by an MPEG-2 system. The AVC/H.264 1542 is a functional block for encoding and decoding the image data by an AVC system. The HEVC/H. 265 1543 is a functional block for encoding and decoding the image data by an HEVC. The HEVC/H. 265 (Scalable) 1544 is a functional block for scalable encoding and scalable decoding of the image data by the HEVC. The HEVC/H. 265 (Multi-view) 1545 is a functional block for multi-view encoding and multi-view decoding of the image data by the HEVC.

The MPEG-DASH 1551 is a functional block for sending and receiving the image data by an MPEG-DASH (MPEG-Dynamic Adaptive Streaming over HTTP) system. The MPEG-DASH is a video streaming technique using an HTTP (HyperText Transfer Protocol), and one of the features thereof is to select and transmit an appropriate one piece of encoded data in units of segment from pieces of the encoded data previously prepared that are different in resolutions or the like. The MPEG-DASH 1551 performs generation of a stream according to standards, transmission and control of the stream, and the like and uses the above-mentioned MPEG-2 Video 1541 to the HEVC/H.265 (Multi-view) 1545 for encoding/decoding of the image data.

The memory interface 1517 is an interface for the external memory 1312. Data supplied from the image processing engine 1514 or the codec engine 1516 is supplied to the external memory 1312 via the memory interface 1517. Further, data read from the external memory 1312 is supplied to the video processor 1332 (the image processing engine 1514 or the codec engine 1516) via the memory interface 1517.

The multiplexing/demultiplexing section (MUX DMUX) 1518 multiplexes or demultiplexes various types of data on images, such as a bit stream of encoded data, image data, and a video signal. The multiplexing/demultiplexing method is arbitrary. For example, at the time of multiplexing, the multiplexing/demultiplexing section (MUX DMUX) 1518 can not only collect pieces of data into one but also add predetermined header information or the like to that data. Further, at the time of demultiplexing, the multiplexing/demultiplexing section (MUX DMUX) 1518 can not only divide on piece of data into pieces of data but also add predetermined header information or the like to the divided pieces of data. In other words, the multiplexing/demultiplexing section (MUX DMUX) 1518 can convert a data format by multiplexing/demultiplexing. For example, by multiplexing a bit stream, the multiplexing/demultiplexing section (MUX DMUX) 1518 can convert the bit stream into a transport stream, which is a bit stream having a format for transfer, or data (file data) having a file format for recording. As a matter of course, inverse conversion thereof can also be performed by demultiplexing.

The network interface 1519 is an interface for, for example, the broadband modem 1333, the connectivity 1321 (each of which is shown in FIG. 37), or the like. The video interface 1520 is an interface for, for example, the connectivity 1321, the camera 1322 (each of which is shown in FIG. 37), or the like.

Next, an operation example of the video processor 1332 as described above will be described. For example, when a transport stream is received from an external network via the connectivity 1321, the broadband modem 1333 (each of which is shown in FIG. 37), or the like, the transport stream is supplied to the multiplexing/demultiplexing section (MUX DMUX) 1518 via the network interface 1519 and demultiplexed, and then decoded by the codec engine 1516. Image data obtained by the decoding of the codec engine 1516 is, for example, subjected to predetermined image processing by the image processing engine 1514, subjected to predetermined conversion by the display engine 1513, and supplied to, e.g., the connectivity 1321 (FIG. 37) or the like via the display interface 1512, so that an image thereof is displayed on a monitor. Further, for example, image data obtained by the decoding of the codec engine 1516 is encoded again by the codec engine 1516, multiplexed and converted into file data by the multiplexing/demultiplexing section (MUX DMUX) 1518, output to, e.g., the connectivity 1321 (FIG. 37) or the like via the video interface 1520, and recorded on various recording media.

Moreover, for example, file data of encoded data, in which image data is encoded and which is read from a recording medium not shown in the figure by the connectivity 1321 (FIG. 37) or the like, is supplied to the multiplexing/demultiplexing section (MUX DMUX) 1518 via the video interface 1520 and demultiplexed, and then decoded by the codec engine 1516. Image data obtained by the decoding of the codec engine 1516 is subjected to predetermined image processing by the image processing engine 1514, subjected to predetermined conversion by the display engine 1513, and supplied to, e.g., the connectivity 1321 (FIG. 37) or the like via the display interface 1512, so that an image thereof is displayed on a monitor. Further, for example, image data obtained by the decoding of the codec engine 1516 is encoded again by the codec engine 1516, multiplexed and converted into a transport stream by the multiplexing/demultiplexing section (MUX DMUX) 1518, supplied to, e.g., the connectivity 1321, the broadband modem 1333 (each of which is shown in FIG. 37), or the like via the network interface 1519, and transmitted to another apparatus not shown in the figure.

It should be noted that giving and receiving of image data or other data between the processing sections of the video processor 1332 is performed by using, for example, the internal memory 1515 or the external memory 1312. Further, the power management module 1313 controls power supply to the control section 1511, for example.

In the case where the present disclosure is applied to the video processor 1332 configured as described above, the present disclosure according to each of the embodiments described above only needs to be applied to the codec engine 1516. In other words, for example, the codec engine 1516 only needs to include a functional block that achieves the encoding apparatus or the decoding apparatus according to the first to third embodiments. With the codec engine 1516 thus configured, the video processor 1332 can obtain an effect similar to that described above with reference to FIGS. 1 to 31.

It should be noted that in the codec engine 1516 the present disclosure (i.e., the function of the encoding apparatus or the decoding apparatus according to each of the embodiments described above) may be achieved by hardware such as a logic circuit, may be achieved by software such as an embedded program, or may be achieved by both of them.

The two examples of the configuration of the video processor 1332 have been described above, but the configuration of the video processor 1332 is arbitrary and may be other than the two examples described above. Further, the video processor 1332 may be configured as one semiconductor chip, but may be configured as a plurality of semiconductor chips. For example, the video processor 1332 may be a three-dimensional stacked LSI that stacks a plurality of semiconductors. Further, the video processor 1332 may be achieved by a plurality of LSIs.

(Example of Application to Apparatus)

The video set 1300 can be incorporated into various apparatuses that process image data. For example, the video set 1300 can be incorporated into the television apparatus 900 (FIG. 33), the mobile phone 920 (FIG. 34), the recording/reproduction apparatus 940 (FIG. 35), the imaging apparatus 960 (FIG. 36), or the like. By incorporating the video set 1300 therein, the apparatus can obtain an effect similar to that described above with reference to FIGS. 1 to 31.

It should be noted that if a part of each configuration of the video set 1300 described above includes the video processor 1332, the part can be carried out as a configuration to which the present disclosure is applied. For example, only the video processor 1332 can be carried out as a video processor to which the present disclosure is applied. Further, for example, as described above, the processor indicated by the dotted line 1341, the video module 1311, or the like can be carried out as a processor, a module, or the like to which the present disclosure is applied. Moreover, for example, it is also possible to combine the video module 1311, the external memory 1312, the power management module 1313, and the front end module 1314 to be carried out as a video unit 1361 to which the present disclosure is applied. In the case of any configuration, it is possible to obtain an effect similar to that described above with reference to FIGS. 1 to 31.

In other words, similarly to the case of the video set 1300, any configuration including the video processor 1332 can be incorporated in various apparatuses that process image data. For example, the video processor 1332, the processor indicated by the dotted line 1341, the video module 1311, or the video unit 1361 can be incorporated in the television apparatus 900 (FIG. 33), the mobile phone 920 (FIG. 34), the recording/reproduction apparatus 940 (FIG. 35), the imaging apparatus 960 (FIG. 36), or the like. By incorporating any configuration to which the present disclosure is applied, such an apparatus can obtain an effect similar to that described above with reference to FIGS. 1 to 31, similarly to the case of the video set 1300.

It should be noted that the example in which various types of information are multiplexed into encoded data and transmitted from the encoding side to the decoding side has been described in this specification. However, the technique of transmitting those pieces of information is not limited to such an example. For example, those pieces of information may be transmitted or recorded as individual pieces of data associated with encoded data, without being multiplexed into the encoded data. Here, the term "associated" means that an image included in a bit stream (which may be a part of an image, such as slice and block) and information corresponding to that image can be linked to each other at the time of decoding. In other words, the information may be transmitted through a transmission path different from that for the encoded data. Further, the information may be recorded on a recording medium (or another recording area of the same recording medium) different from that for the encoded data. Moreover, the information and the encoded data may be associated with each other in arbitrary units of, e.g., a plurality of frames, one frame, or a part of a frame.

The present disclosure can be applied to an encoding apparatus or a decoding apparatus that is used when, as in MPEG, H.26x, or the like, a bit stream compressed by orthogonal transformation such as discrete cosine transform and motion compensation is received via a network medium such as satellite broadcasting, a cable TV, the Internet, and a mobile phone or is processed on a storage medium such as an optical disc, a magnetic disk, and a flash memory.

Further, in this specification, the system means an aggregation of a plurality of constituent elements (apparatus, module (component), and the like), regardless of whether all constituent elements are included in the same casing. Therefore, a plurality of apparatuses accommodated in separate casings and connected to one another via a network is a system, and one apparatus including a plurality of modules in one casing is also a system.

Moreover, the effects described in this specification are merely exemplary ones and are not restrictive ones, and any other effects may be produced.

Further, the embodiments of the present disclosure are not limited to the embodiments described above and can be variously modified without departing from the gist of the present disclosure.

For example, in the first and second embodiments, the position of the picture identifying information of the current picture registered in the reference picture list may not be fixed. Further, in the first and third embodiments, the picture type of the current picture set in the reference picture list may be STRP.

Further, in the second embodiment, as in the third embodiment, the picture identifying information of the current picture may be registered not in the reference picture list but in the temporal list.

Moreover, in the third embodiment, as in the second embodiment, by a change of the method of generating a predicted vector list in the case where the type of the reference picture of the current picture is Intra BC, coding efficiency in the case where Intra BC and inter coding are communalized may be improved.

Further, for example, the present disclosure can have a configuration of cloud computing in which a plurality of apparatuses share one function and cooperate to perform processing via a network.

Further, the steps described in the flowcharts described above can be executed by one apparatus or shared and executed by a plurality of apparatuses.

Moreover, in the case where one step includes a plurality of processing steps, the plurality of processing steps in one step can be executed by one apparatus or shared and executed by a plurality of apparatuses.

The present disclosure can also have the following configurations.

(1) An image processing apparatus, including:
 a predicted vector generation section that sets, at a time of encoding of a current motion vector of a current block for a prediction using a correlation within a screen, in a case where a type of a reference picture of the current block and a type of a reference picture of a candidate block corresponding to a candidate of a reference motion vector are different from each other, the candidate block to not available and generates a predicted vector of the current motion vector by using the reference motion vector, the reference motion vector being referred to when the predicted vector of the current motion vector is generated; and
a difference vector generation section that generates a difference vector between the current motion vector and the predicted vector generated by the predicted vector generation section.

(2) The image processing apparatus according to (1), further including
a setting section that sets the type of the reference picture of the current block to a long-term reference picture.

(3) The image processing apparatus according to (1), in which
the predicted vector generation section determines that the type of the reference picture of the current block and the type of the reference picture of the candidate block are different from each other in a case where a picture of the candidate block and the reference picture of the candidate block are different from each other.

(4) The image processing apparatus according to any one of (1) to (3), further including
a list creation section that registers a picture of the current block in a predetermined position of a list of candidates of the reference picture of the current block.

(5) The image processing apparatus according to (4), in which
the predetermined position is a head.

(6) The image processing apparatus according to (4) or (5), in which
the list creation section rearranges order of the candidates of the reference picture in the list, before registering the picture of the current block.

(7) The image processing apparatus according to (4) or (5), in which
the list creation section rearranges order of the candidates of the reference picture other than the picture of the current block in the list, after registering the picture of the current block.

(8) An image processing method for an image processing apparatus, the image processing method including:
a predicted vector generation step of setting, at a time of encoding of a current motion vector of a current block for a prediction using a correlation within a screen, in a case where a type of a reference picture of the current block and a type of a reference picture of a candidate block corresponding to a candidate of a reference motion vector are different from each other, the candidate block to not available and generates a predicted vector of the current motion vector by using the reference motion vector, the reference motion vector being referred to when the predicted vector of the current motion vector is generated; and
a difference vector generation step of generating a difference vector between the current motion vector and the predicted vector generated by processing of the predicted vector generation step.

(9) An image processing apparatus, including:
a predicted vector generation section that sets, at a time of decoding of a current motion vector of a current block for a prediction using a correlation within a screen, in a case where a type of a reference picture of the current block and a type of a reference picture of a candidate block corresponding to a candidate of a reference motion vector are different from each other, the candidate block to not available and generates a predicted vector of the current motion vector by using the reference motion vector, the reference motion vector being referred to when the predicted vector of the current motion vector is generated; and
a motion vector generation section that adds a difference vector between the current motion vector and the predicted vector to the predicted vector generated by the predicted vector generation section and generates the current motion vector.

(10) The image processing apparatus according to (9), further including
a setting section that sets the type of the reference picture of the current block to a long-term reference picture.

(11) The image processing apparatus according to (9), in which
the predicted vector generation section determines that the type of the reference picture of the current block and the type of the reference picture of the candidate block are different from each other in a case where a picture of the candidate block and the reference picture of the candidate block are different from each other.

(12) The image processing apparatus according to any one of (9) to (11), further including
a list creation section that registers a picture of the current block in a predetermined position of a list of candidates of the reference picture of the current block.

(13) The image processing apparatus according to (12), in which
the predetermined position is a head.

(14) The image processing apparatus according to (12) or (13), in which
the list creation section rearranges order of the candidates of the reference picture in the list, before registering the picture of the current block.

(15) The image processing apparatus according to (12) or (13), in which
the list creation section rearranges order of the candidates of the reference picture other than the picture of the current block in the list, after registering the picture of the current block.

(16) An image processing method for an image processing apparatus, the image processing method including:
a predicted vector generation step of setting, at a time of decoding of a current motion vector of a current block for a prediction using a correlation within a screen, in a case where a type of a reference picture of the current block and a type of a reference picture of a candidate block corresponding to a candidate of a reference motion vector are different from each other, the candidate block to not available and generates a predicted vector of the current motion vector by using the reference motion vector, the reference motion vector being referred to when the predicted vector of the current motion vector is generated; and
a motion vector generation step of adding a difference vector between the current motion vector and the predicted vector to the predicted vector generated by processing of the predicted vector generation step and generating the current motion vector.

REFERENCE SIGNS LIST

50 encoding apparatus
88 list creation section 90 predicted vector generation section
91 difference vector generation section
110 decoding apparatus
144 predicted vector generation section
145 motion vector generation section
146 list creation section

The invention claimed is:

1. An image processing apparatus, comprising:
circuitry configured to
exclude, in a case where a type of a reference picture of a current block and a type of a reference picture of a candidate block corresponding to a candidate of a reference motion vector are different from each other and neither the type of the reference picture of the current block nor the type of the reference picture of the candidate block is Short-Term Reference Picture (STRP), a motion vector of the candidate block from candidates of the reference motion vector,
generate, in a case where a type of the reference picture of the current block and the type of the reference picture of the candidate block are each STRP, a predicted vector of a current motion vector by performing scaling on the reference motion vector on a basis of a difference in picture order count (POC) between the reference picture of the current block and the reference picture of the candidate block,
generate, in a case where the type of the reference picture of the current block and the type of the reference picture of the candidate block are each Intra Block Copy (Intra BC), the predicted vector of the current motion vector by setting the reference motion vector to the predicted vector without scaling,
generate, in a case where the type of the reference picture of the current block and the type of the reference picture of the candidate block are each Long-Term Reference Picture (LTRP), the predicted vector of the current motion vector by setting the reference motion vector to the predicted vector without scaling,
register a picture of the current block in a predetermined position of a list of candidates of the reference picture of the current block, and
add a difference vector between the current motion vector and the predicted vector to the predicted vector and generate the current motion vector.

2. The image processing apparatus according to claim 1, wherein
the circuitry is further configured to determine that the type of the reference picture of the current block and the type of the reference picture of the candidate block are different from each other in a case where a picture of the candidate block and the reference picture of the candidate block are different from each other.

3. The image processing apparatus according to claim 2, wherein the predetermined position is a head of the list of candidates.

4. The image processing apparatus according to claim 1, wherein the predetermined position is a head of the list of candidates.

5. The image processing apparatus according to claim 1, wherein
the circuitry is further configured to rearrange order of the candidates of the reference picture in the list, before registering the picture of the current block.

6. The image processing apparatus according to claim 2, wherein
the circuitry is further configured to rearrange order of the candidates of the reference picture in the list, before registering the picture of the current block.

7. The image processing apparatus according to claim 3, wherein
the circuitry is further configured to rearrange order of the candidates of the reference picture in the list, before registering the picture of the current block.

8. The image processing apparatus according to claim 4, wherein
the circuitry is further configured to rearrange order of the candidates of the reference picture in the list, before registering the picture of the current block.

9. The image processing apparatus according to claim 1, wherein
the circuitry is further configured to rearrange order of the candidates of the reference picture other than the picture of the current block in the list, after registering the picture of the current block.

10. The image processing apparatus according to claim 2, wherein
the circuitry is further configured to rearrange order of the candidates of the reference picture other than the picture of the current block in the list, after registering the picture of the current block.

11. The image processing apparatus according to claim 3, wherein
the circuitry is further configured to rearrange order of the candidates of the reference picture other than the picture of the current block in the list, after registering the picture of the current block.

12. An image processing method comprising:
excluding, in a case where a type of a reference picture of a current block and a type of a reference picture of a candidate block corresponding to a candidate of a reference motion vector are different from each other and neither the type of the reference picture of the current block nor the type of the reference picture of the candidate block is Short-Term Reference Picture (STRP), a motion vector of the candidate block from candidates of the reference motion vector;
generating, in a case where a type of the reference picture of the current block and the type of the reference picture of the candidate block are each STRP, a predicted vector of a current motion vector by performing scaling on the reference motion vector on a basis of a difference in picture order count (POC) between the reference picture of the current block and the reference picture of the candidate block;
generating, in a case where the type of the reference picture of the current block and the type of the reference picture of the candidate block are each Intra Block Copy (Intra BC), the predicted vector of the current motion vector by setting the reference motion vector to the predicted vector without scaling;
generating, in a case where the type of the reference picture of the current block and the type of the reference picture of the candidate block are each Long-Term Reference Picture (LTRP), the predicted vector of the current motion vector by setting the reference motion vector to the predicted vector without scaling;
registering a picture of the current block in a predetermined position of a list of candidates of the reference picture of the current block;

adding a difference vector between the current motion vector and the predicted vector to the predicted vector; and generating the current motion vector using the predicted vector and the list.

\* \* \* \* \*